(12) United States Patent
Zhou

(10) Patent No.: US 10,296,556 B2
(45) Date of Patent: *May 21, 2019

(54) SYSTEM AND METHOD FOR EFFICIENT SPARSE MATRIX PROCESSING

(71) Applicant: Palo Alto Research Center Incorporated, Palo Alto, CA (US)

(72) Inventor: Rong Zhou, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/698,547

(22) Filed: Sep. 7, 2017

(65) Prior Publication Data

US 2017/0371839 A1    Dec. 28, 2017

Related U.S. Application Data

(63) Continuation of application No. 14/580,110, filed on Dec. 22, 2014, now Pat. No. 9,760,538.

(51) Int. Cl.
*G06F 17/16*    (2006.01)

(52) U.S. Cl.
CPC .................. *G06F 17/16* (2013.01)

(58) Field of Classification Search
None
See application file for complete search history.

(56) References Cited

U.S. PATENT DOCUMENTS

| | | | |
|---|---|---|---|
| 9,760,538 B2 * | 9/2017 | Zhou | G06F 17/16 |
| 10,067,910 B2 * | 9/2018 | Zhou | G06F 17/16 |
| 2007/0198621 A1 | 8/2007 | Lumsdaine et al. | |
| 2008/0126467 A1 | 5/2008 | Ghuloum | |
| 2011/0307685 A1 | 12/2011 | Song | |
| 2014/0108481 A1 | 4/2014 | Davis et al. | |
| 2016/0179750 A1 * | 6/2016 | Zhou | G06F 17/16 708/203 |

(Continued)

OTHER PUBLICATIONS

Ashari Arash et al., "Fast Sparse Matrix-Vector Multiplication on GPUs for Graph Applications," SC14: International Conference for High Performance Computing, Networking, Storage and Analysis, IEEE, Nov. 16, 2014, pp. 781-792.

(Continued)

*Primary Examiner* — David H Malzahn
(74) *Attorney, Agent, or Firm* — Leonid Kisselev

(57) ABSTRACT

A system and method for efficient sparse matrix processing are provided in one embodiment. A compressed representation of a sparse matrix, the sparse matrix including one or more non-zero entries in one or more of a plurality of portions of the matrix, is obtained by at least one server including one or more streaming multiprocessors, each of the streaming multiprocessors including one or more graphics processing unit (GPU) processor cores. Each of the portions are assigned into one of a plurality of partitions based on a number of the non-zero entries in that portion. For each of the partitions, a predefined number of the GPU processor cores are assigned for processing each of the portions assigned to that partition based on the numbers of the non-zero entries in the portions assigned to that partition. For each of the partitions, each of the portions associated with that partition are processed.

20 Claims, 26 Drawing Sheets

(56) References Cited

U.S. PATENT DOCUMENTS

2016/0259826 A1    9/2016  Acar et al.
2017/0371839 A1*  12/2017  Zhou ................. G06F 17/16
2018/0004709 A1*   1/2018  Zhou ................. G06F 8/443
2018/0189239 A1*   7/2018  Nurvitadhi ........... G06F 9/3001

OTHER PUBLICATIONS

Kwak, Haewoon, Changhyun Lee, Hosung Park, and Sue Moon. "What is Twitter, a social network or a news media?." In Proceedings of the 19th international conference on World wide web, pp. 591-600. Association for Computing Machinery, 2010.

Gonzalez, Joseph E., Yucheng Low, Haijie Gu, Danny Bickson, and Carlos Guestrin. "PowerGraph: Distributed Graph-Parallel Computation on Natural Graphs." In 10th Unenix Symposium on Operating Systems Design and Implementation, vol. 12, No. 1, p. 2. 2012.

* cited by examiner

SYSTEM AND METHOD FOR EFFICIENT SPARSE MATRIX PROCESSING

CROSS-REFERENCE TO RELATED APPLICATION

This non-provisional patent application is a continuation of U.S. Pat. No. 9,760,538, issued Sep. 12, 2017, the priority of which is claimed and the disclosure of which is incorporated by reference.

FIELD

This application relates in general to processing matrix data, and in particular, to a system and method for efficient sparse matrix processing.

BACKGROUND

Sparse matrixes are matrices in which a majority of elements are zero. Operations using such matrices have a variety of applications and are usually the most computationally-intensive part of such an application. For example, sparse matrix-vector multiplication (SpMV) and sparse matrix transpose vector multiplication (SpMTV), basic operations in sparse linear algebra (SLA), are used for performing ranking algorithms, such as the PageRank® algorithm used by Google®, Inc. to rank webpages when providing search results. SpMV and SpMTV are the most computationally intensive part of such applications and the speed with which the matrixes can be used is limited by SpMV and SpMTV.

While attempts have been made to improve the speed of sparse matrix processing, such efforts still leave significant room for improvement. For example, to increase speed, matrixes have been encoded in a compressed format, which includes multiple arrays of information about values and position in the matrix of the non-zero entries and omit information about the zero entries. For instance, a compressed sparse matrix row format includes an array with values of the non-zero entries, columns in which the non-zero entries are located, and an array holding the index in the first array of a first non-zero entry in each row. Compressed sparse column format includes similar arrays. Such arrays are best stored in a cache of a processor performing the computations to allow fast access to the array data. However, in case of larger matrices, even the compressed format arrays may not fit into the cache, requiring a processor to access different arrays representing the matrix in main memory to perform a single step of the computation. In such an arrangement, modern computer processors, including central processing units (CPUs) and graphics processing units (GPUs), are likely to experience cache misses during the computation, a failure by the processor to retrieve required data from the cache. To finish the computation after a cache miss requires the processor to retrieve the missing data from the main memory, which can be much slower.

Further, additional concerns are present when GPUs are used to perform matrix computations such as SpMV and SpMTV. GPUs are better designed and optimized for dense computations, such as the processing of dense matrices, matrices in which most elements are non-zero entries. Such hardware commonly runs a single kernel function for processing matrix data. As a result, the hardware cannot respond to the huge variation in the number of non-zero entries in different portions of the matrix, such as in different rows or columns. For example, kernels that assign a single thread to process a single row or column of the matrix can suffer from load imbalance, with the total processing time depending on the thread assigned to process the densest row or column. On the other hand, kernels that assign multiple threads to process a single row or column suffer from a waste of hardware resources when the number of assigned threads is less than the number of non-zero entries in the row or column, with some of the assigned threads not being involved in the processing.

Therefore, there is a need to represent a sparse matrix in a way that decreases a likelihood of cache misses and allows for responding to the variation in the number of non-zero entries in different parts of the matrix.

SUMMARY

Speed with which sparse matrices are processed can be increased by using improved compressed representations of the matrices. Structured compressed representations reduce the number of cache misses experienced during matrix processing by decreasing the number of times the cache has to be accessed randomly. Further, representations of the matrix that divide and regroup rows and columns of the matrix based on their number of non-zero entries allows to assign the most appropriate kernel function for processing of these portions of a matrix, overcoming the limitations of the GPU-based hardware. As a result, the speed of processing can be increased without disturbing the original structure of the matrix.

One embodiment provides a system and method for efficient sparse matrix processing. A compressed representation of a sparse matrix, the sparse matrix including one or more non-zero entries in one or more of a plurality of portions of the matrix, is obtained by at least one server including one or more streaming multiprocessors, each of the streaming multiprocessors including one or more graphics processing unit (GPU) processor cores. Each of the portions are assigned by the at least one server into one of a plurality of partitions based on a number of the non-zero entries in that portion. For each of the partitions, a predefined number of the GPU processor cores in one or more of the streaming multiprocessors are assigned by the at least one server for processing each of the portions assigned to that partition based on the numbers of the non-zero entries in the portions assigned to that partition. For each of the partitions, each of the portions associated with that partition are processed by the assigned predefined number of the GPU processor cores.

For GPU-based hardware, partitioned (structured) CSR/CSC encoding is preferred over the non-partitioned ones, because the GPU typically assumes a single-instruction-multiple-threads execution model that is much less flexible than the CPU. This model makes GPUs more vulnerable to load imbalance issues than CPUs. Partitioned sparse matrix encodings such as PSCSR and PSCSC can effectively reduce load imbalance on the GPU by grouping together rows or columns with similar computational characteristics based on their number of non-zeros.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention.

Accordingly, the drawings and detailed description are to be regarded as illustrative in nature and not as restrictive.

DETAILED DESCRIPTION

As mentioned above, sparse matrices can be encoded in the compressed sparse row (CSR) format. Let A be an m×n sparse matrix with e non-zero entries. Let $A_v$, $A_c$, and $A_r$ be three one-dimensional arrays of length e, e, and (m+1), respectively. In CSR format, A is encoded as $\langle A_v, A_c, A_r \rangle$, in which:

Value array $A_v$ holds the values of all the non-zero entries in A in row-major order Column array $A_c$ holds the columns of all the non-zero entries in A in row-major order, Row-index array $A_r$ holds the index in $A_v$ of the first non-zero entry of each row in A, with the last entry in the $A_r$ array being the total number of entries in the $A_v$ array.

For example, the following 4×4 matrix $$A = \begin{pmatrix} 0 & 0 & 0 & 1 \\ 0.5 & 0 & 0 & 0.5 \\ 0.5 & 0.5 & 0 & 0 \\ 0 & 0 & 1 & 0 \end{pmatrix}$$

can be encoded in CSR as $\langle A_v=[1, 0.5, 0.5, 0.5, 0.5, 1], A_c=[3, 0, 3, 0, 1, 2], A_r=[0, 1, 3, 5, 6]\rangle$.

In this and other examples described below, the rows and the columns are indexed, with the indexes serving as their ids. The indices start at zero, increasing for columns going from left to right, and for rows going from top to bottom of the matrix. Thus, the matrix A above has ids of rows and columns going from 0 to 3.

Figure 1:
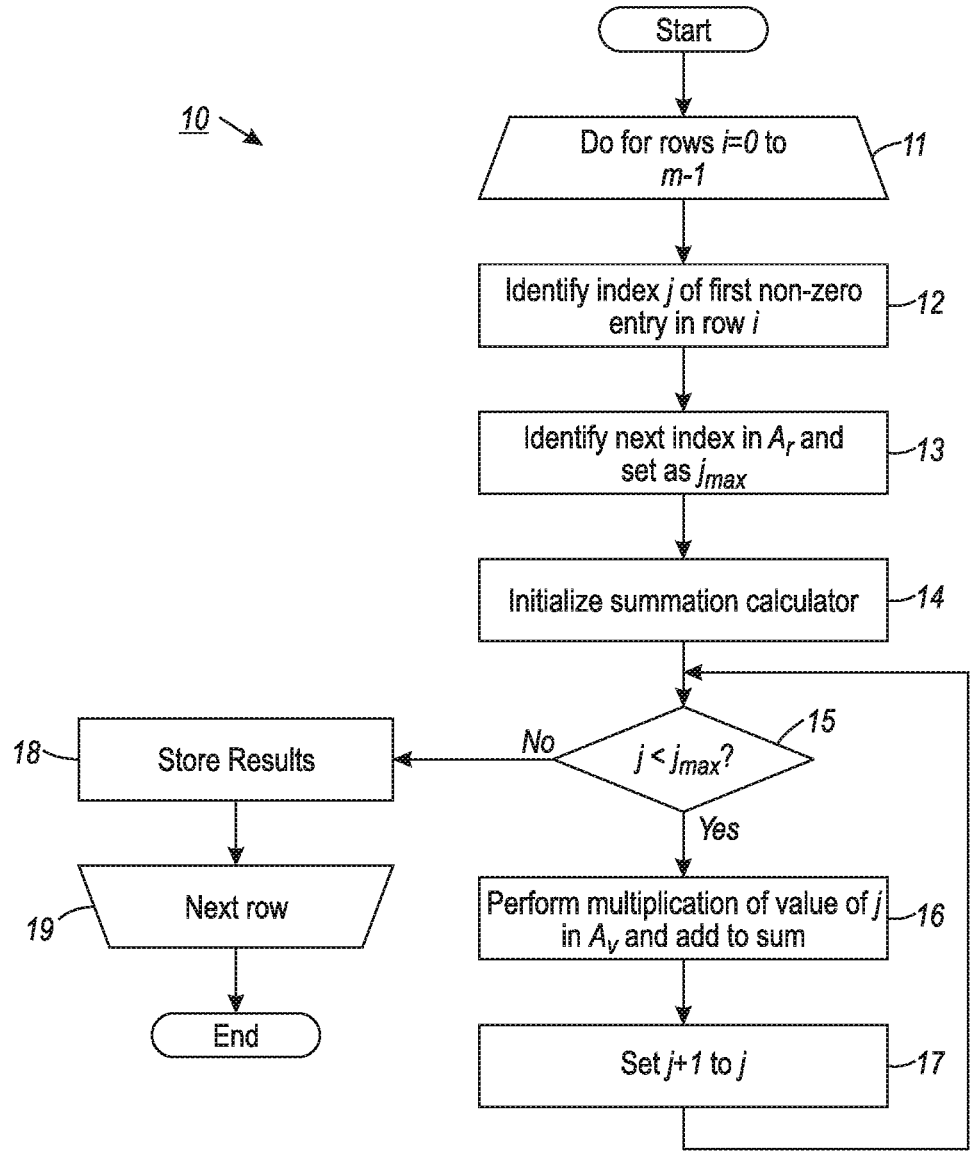
FIG. 1 is a flow diagram showing a method for performing SpMV on a matrix encoded in compressed sparse row format encoding, in accordance with one embodiment (prior art).

Let x and y be two dense vectors of size n and m, respectively. The task of SpMV is to compute y=Ax, where A is a sparse matrix. FIG. 1 is a flow diagram showing a method 10 for performing SpMV on a matrix encoded in compressed sparse row format encoding, in accordance with one embodiment (prior art). An iterative processing loop (steps 11-19) of processing rows with id i=0 to m−1, all rows of the matrix, is started (step 11). An entry for the i-th row in the $A_r$ array is located, identifying the index in the $A_v$ array of the first non-zero entry for that row in the matrix; the identified index is set as a variable j (step 12). The next (i+1) entry in the $A_r$ array is located and set as a variable $j_{max}$ (step 13). Unless the i-th row is the last row in the matrix, the next entry in the $A_r$ array is the index in the $A_v$ array of the first non-zero entry in (i+1)th row; if the i-th row is the last row in the matrix, the next entry in the $A_r$ array is the total number of entries in the $A_v$ array. A summation calculator (also referred to as summation accumulator in the pseudocode below), a function for summing together results of multiplication of the values of the non-zero arrays described in step 16 below, is initialized by setting the value of the sum at zero (step 14). If j is less than $j_{max}$ (step 15), a computation according to the formula:

$$sum \leftarrow sum + A_v[j] \times x[A_c[j]]$$

is performed (step 16). In the computation, the value in the $A_v$ array with the index j is multiplied by the element of x whose index is the number in the $A_c$ array with the j-th index. The result of multiplication is added to the sum of results of multiplication performed during previous iterations of the step 16; during the first iteration of step 16 in the method, the sum is zero, as set in step 14 above. Upon the completion of the calculation, 1 is added to the value of j and the result of the addition is set as j (step 17), moving the processing to the entry in the next column in that row. The method returns to step 15 described above, repeating steps 15-17 until of the non-zero values in the i-th row are processed. If j is not less than $j_{max}$ (step 15), the sum resulting from addition of results multiplication during the iterations in the loop 15-17 is stored in the dense vector y (step 18). The iterative processing loop moves to the next row (step 19), with the processing continuing through the loop (steps 11-19) until all of the rows are processed, upon which the method 10 ends.

The method 10 of FIG. 1 can also be expressed using the following pseudocode:

```
for i = 0 to m - 1        /* loop over m rows of sparse matrix A */
    j ← A_r[i]            /* j: index in A_v of first non-zero entry in i-th row */
    j_max ← A_r[i+1]      /* j_max: index in A_v of first non-zero entry in (i+1)-th row */
    sum ← 0               /* initialize the summation accumulator */
    while (j < j_max)     /* test if end of row has been reached */
        sum ← sum + A_v[j] × x[A_c[j]]   /* compute y_i = Σ_j A_{i,j} × x_j */
        j ← j + 1         /* move on to next non-zero column in i-th row */
    end while
    y[i] ← sum            /* store result in y */
end for
```

The most computationally intensive part of SpMV is due to the summation line, described in step 16 above:

$$sum \leftarrow sum + A_v[j] \times x[A_c[j]]$$

in which the following three arrays are accessed: $A_v$, $A_c$, and x, with indices j, j, and $A_c[j]$, respectively. Note that both $A_v$ and $A_c$ have e elements, which are typically much larger than the sizes of $A_r$ and x in SpMV. The implication of this size difference on modern processors, including both CPUs and GPUs, is that the above summation line is most likely to cause 2 or 3 cache misses, depending on the size of these arrays. Of the three arrays, x (the array that stores the input dense vector) is usually the smallest, and thus it has the best chance of fitting in the L2 cache of the processors. Of course, if matrix A is small enough, then everything fits, which is the trivial case. For non-trivial SpMV problems, however, one should not assume that either $A_v$ or $A_c$ fits in L2. In other words, accessing both $A_v$ and $A_c$ may trigger two separate cache misses, which can have a negative impact on the performance of SpMV. Cache misses can significantly reduce the speed of SpMV, which often exhibits little memory reference locality.

Sparse matrices can also be encoded in the compressed sparse column (CSC) format, which is often seen as CSR "transposed". Let A be an m×n sparse matrix with e non-zero entries. Let $A'_v$, $A'_c$ and $A'_r$ be three one-dimensional arrays of length e, e, and (n+1), respectively. In CSC format, A is encoded as $\langle A'_v, A'_r, A'_c \rangle$, in which:

Value array $A'_v$ holds the values of all the non-zero entries in A in column-major order Row array $A'_r$ holds the rows of all the non-zero entries in A in column-major order.

Column-index array $A'_c$ holds the index in $A'_v$ of the first non-zero entry of each column in A, with the last entry in the $A'_c$ array being the total number of entries in the $A'_v$ array.

The same 4×4 matrix $$A = \begin{pmatrix} 0 & 0 & 0 & 1 \\ 0.5 & 0 & 0 & 0.5 \\ 0.5 & 0.5 & 0 & 0 \\ 0 & 0 & 1 & 0 \end{pmatrix}$$

shown earlier can be encoded in CSC as:

$\langle A'_v=[0.5, 0.5, 0.5, 1, 1, 0.5], A'_r=[1, 2, 2, 3, 0, 1], A'_c=[0, 2, 3, 4, 6] \rangle$.

Figure 2:
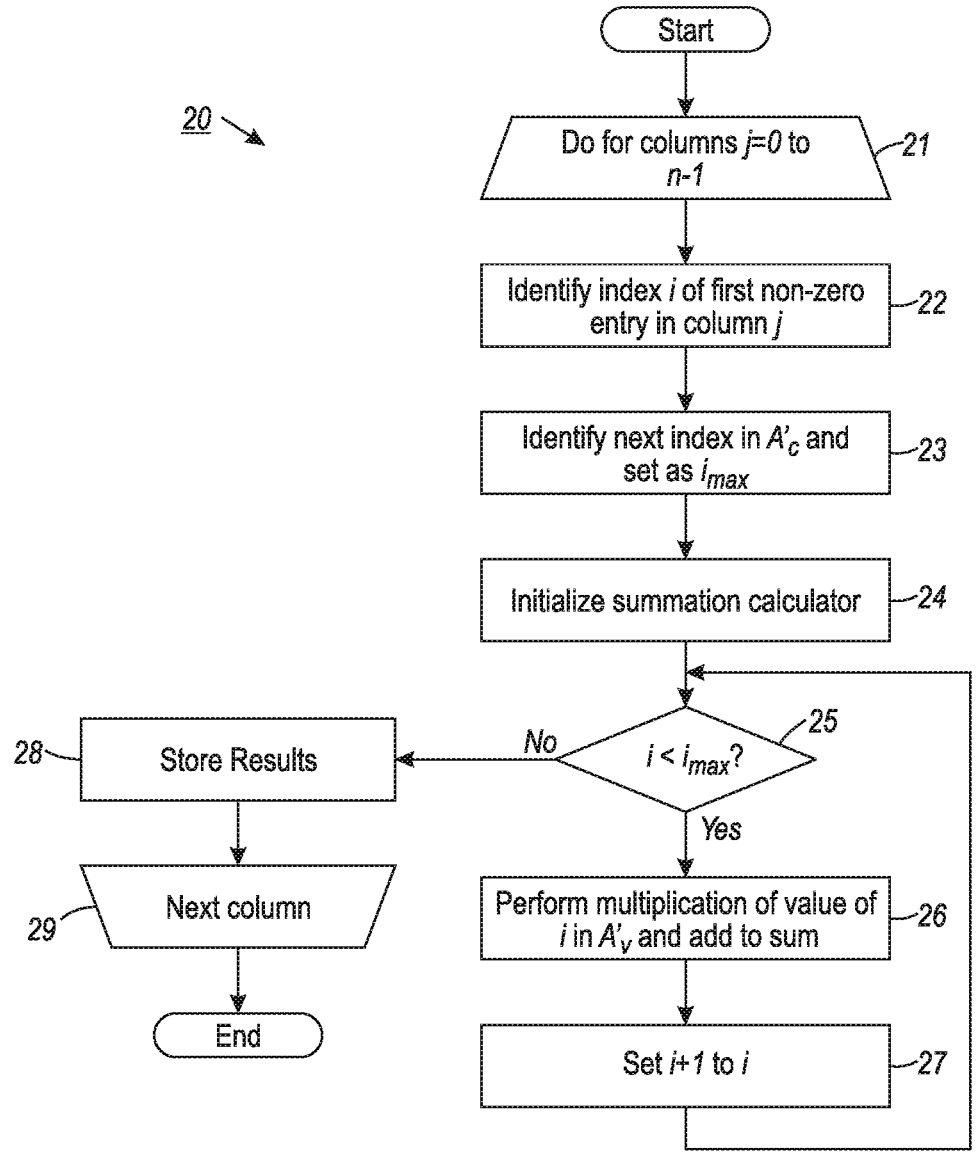
FIG. 2 is a flow diagram showing a method for performing SpMTV on a matrix encoded in compressed sparse column format encoding, in accordance with one embodiment (prior art).

Let x' and y' be two dense vectors of size m and n, respectively. The task of SpMTV is to compute $y'=A^T x'$, where A is the original, untransposed sparse matrix. FIG. 2 is a flow diagram showing a method 20 for performing SpMTV on a matrix encoded in compressed sparse column format encoding in accordance with one embodiment (prior art). An iterative processing loop (steps 21-29) of processing columns with id j=0 to n−1, all columns of the matrix, is started (step 21). An entry for the j-th column in the $A'_c$ array is located, identifying the index in the $A'_v$ array of the first non-zero entry for that column in the matrix; the identified index is set as a variable i (step 22). The next (j+1) entry in the $A'_c$ array is located and set as a variable $i_{max}$ (step 23). Unless the j-th column is the last column in the matrix, the next entry in the $A'_c$ array is the index in the $A'_v$ array of the first non-zero entry in the (j+1)-th column; if the j-th column is the last column in the matrix, the next entry in the $A'_c$ array is the total number of entries in the $A'_v$ array. A summation calculator, a function for summing together results of multiplication of the values of the non-zero arrays described in step 26 below, is initialized by setting the value of the sum at zero (step 24). If i is less than $i_{max}$ (step 25), a computation according to the formula:

$$sum \leftarrow sum + A'_v[i] \times x'[A'_r[i]]$$

is performed (step 26). In the computation, the value in the $A'_v$ array with the index i is multiplied by the element of x' whose index is the number in the A'r array with the i-th index. The result of multiplication is added to the sum of results of multiplication performed during previous iterations of step 26; during the first iteration of step 26 in the method, the sum is zero, as set in step 24 above. Upon the completion of the calculation, 1 is added to the value of i and the result of the addition is set as i (step 27), moving the processing to the entry in the next row in that column. The method 20 returns to step 25 described above, repeating steps 25-27 until of the non-zero values in the j-th column are processed. If i is not less than $i_{max}$ (step 25), the sum resulting from addition of results multiplication during the iterations in the loop 25-27 is stored in the dense vector y' (step 28). The iterative processing loop moves to the next column (step 29), continuing until all of the columns are processed through the loop (21-29), after which the method 20 ends. The method 20 of FIG. 2 can also be expressed using the following pseudocode:

```
for j = 0 to n − 1       /* loop over n columns of sparse matrix A */
    i ← A'_c[j]          /* i: index in A'_v of first non-zero entry in j-th column */
    i_max ← A'_c[j+1]    /* i_max: index in A'_v of first non-zero entry in (j+1)-th column */
    sum ← 0              /* initialize the summation accumulator */
    while (i < i_max)    /* test if end of column has been reached */
        sum ← sum + A'_v[i] × x'[A'_r[i]]   /* compute y'_j = Σ_i A_{i,j} × x'_i */
        i ← i + 1        /* move on to next non-zero row in j-th column */
    end while
    y'[j] ← sum          /* store result in y'*/
end for
```

The summation line sum←sum+A'$_v$[i]×x'[A'$_r$[i]] above accesses three arrays A'$_v$, A'$_r$, and x' with indices i, i, and A'$_r$[i], respectively. Similar to the CSR case, the accessing of the three arrays could trigger three cache misses in a single iteration of the steps 25-27 of the method 20 of FIG. 2.

Figure 3:
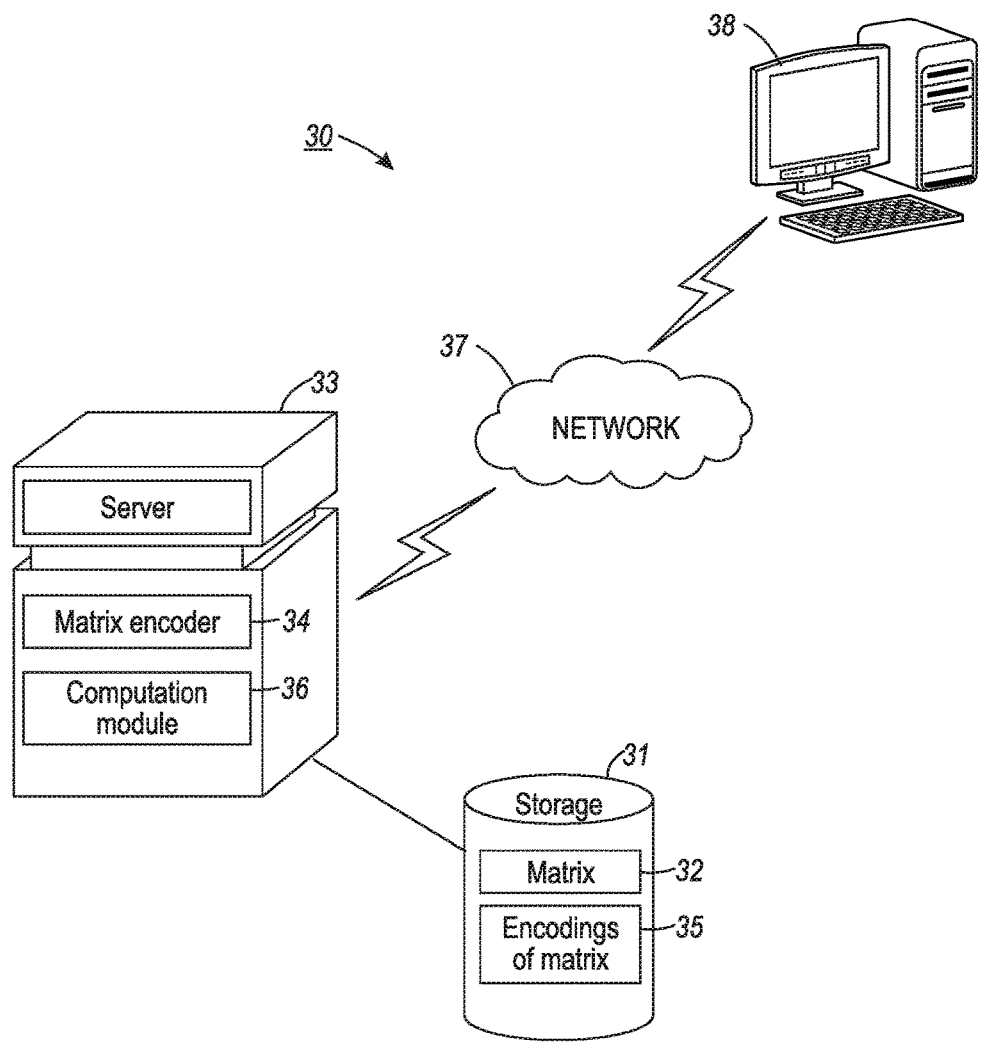
FIG. 3 is a block diagram showing a computer-implemented system for efficient representation and processing of sparse matrices, in accordance with one embodiment.

The amount of cache misses and the speed of processing of sparse matrices in general can be reduced by using improved encodings of sparse matrices. FIG. 3 is a block diagram showing a computer-implemented system 30 for efficient representation and processing of sparse matrices, in accordance with one embodiment. The system 30 includes a computer storage 31, such as a database, that stores one or more sparse matrices 32. The storage is connected to one or more servers 33 that execute a matrix encoder 34 that that prepares compressed representations 35 of the matrices 32. Each of the representations includes one or more arrays storing information about non-zero entries in the matrix. In the description below, the terms "representation" and "encoding" are used interchangeably. The representations 35 can be stored in the storage 31. Each of the compressed representations 35 is an encoding of a matrix 32 in a compressed format, which does not explicitly include zero entries in the matrix 32. For example, such representations 35 can include encodings in the CSR and in CSC formats described above. The matrix encoder 34 can also encode more efficient representations 35 of the matrix that reduce the number of cache misses during processing and thus are more cache friendly.

One of these more efficient encodings can be called structured CSR (SCSR) encoding. In the CSR encoding described above, $A_v$ and $A_c$ have the same number of elements in them, although their space requirements may differ if elements in $A_v$ do not have the same byte size as elements in $A_c$. The value ($A_v$) and the column ($A_c$) arrays having exactly the same number of elements is not a coincidence because they describe different aspects of the same set of non-zero entries in the sparse matrix. As a result, they must have the same number of elements, in any CSR encoding.

Instead of storing the values and columns of the same non-zero entries in two separate arrays, the structured CSR encoding scheme puts the values and the columns in a single, unified array, which includes (value, column) pairs such that the i-th element stores not only the value but also the column of the i-th non-zero entry in the sparse matrix. In other words, arrays $A_v$ and $A_c$ in the CSR encoding are joined with one another to form a composite array $A_{vc}$ which we hereafter refer to as the value-column array. The row-index array $A_r$ stores the index in $A_{vc}$ of the first non-zero entry of each row in A, with the last entry in the $A_r$ array being the total number of composite entries in the $A_{vc}$ array. Thus, the structured CSR encoding includes two arrays: A= $\langle A_{vc}, A_r \rangle$. The name of the SCSR encoding reflects that each element in the value-column array $A_{vc}$ is a structure (i.e., a composite data type) instead of being a rudimentary type such as a float or an integer.

The example matrix $$A = \begin{pmatrix} 0 & 0 & 0 & 1 \\ 0.5 & 0 & 0 & 0.5 \\ 0.5 & 0.5 & 0 & 0 \\ 0 & 0 & 1 & 0 \end{pmatrix}$$

shown above can be encoded in structured CSR as: A=$\langle A_{vc}$, $A_r \rangle$, where $A_{vc}$=[$\langle 1, 3 \rangle$, $\langle 0.5, 0 \rangle$, $\langle 0.5, 3 \rangle$, $\langle 0.5, 0 \rangle$, $\langle 0.5, 1 \rangle$, $\langle 1, 2 \rangle$] and $A_r$=[0, 1, 3, 5, 6].

Similarly, the encoder 34 can create a structured CSC (SCSC) encoding that reduces the number the number of cache misses during processing, such as SpMTV, as compared to CSC. In structured CSC, the value array A'$_v$ and row array A'$_r$ of CSC are merged into a single composite array A'$_{vr}$ that can be called the value-row array. Each element of the value-row array A'$_{vr}$ is a $\langle$value, row$\rangle$ pair that stores both the value and the row of a non-zero matrix entry, based on a column-major ordering starting from the left-most column of the matrix. The column-index array A'$_c$ holds the index in A'$_{vr}$ of the first non-zero entry of each column in A, with the last entry in the A'$_c$ array being the total number of composite entries in the A'$_{vr}$ array.

For example, the same matrix $$A = \begin{pmatrix} 0 & 0 & 0 & 1 \\ 0.5 & 0 & 0 & 0.5 \\ 0.5 & 0.5 & 0 & 0 \\ 0 & 0 & 1 & 0 \end{pmatrix}$$

shown earlier can be encoded in structured CSC as: A=$\langle$A'$_{vr}$, A'$_c \rangle$, where A'$_{vr}$=[$\langle 0.5, 1 \rangle$, $\langle 0.5, 2 \rangle$, $\langle 0.5, 2 \rangle$, $\langle 1, 3 \rangle$, $\langle 1, 0 \rangle$, $\langle 0.5, 1 \rangle$] and A'$_c$=[0, 2, 3, 4, 6].

Figure 4:
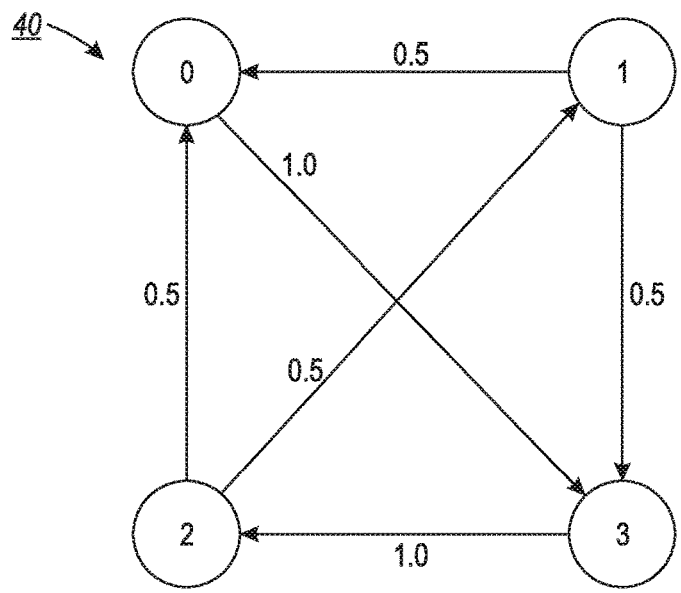
FIG. 4 is a graph showing, by way of example, an adjacency matrix.

The server 33 further includes a computing module 36, which processes the matrix 32 by performing computations on the compressed representations 35 of the matrix 32. Thus, the computing module 36 can perform SpMV and SpMTV on the structured CSC and structured CSR encoding of the matrix 32, as further described below with reference to FIGS. 7 and 8. Also, the computing module 36 can apply the results of SpMV and SpMTV towards many applications. For example, one application of the results of SpMV and SpMTV can be in performing a ranking algorithm, such as the PageRank® algorithm, as further described with reference to FIG. 23. The connection between graphs for the PageRank algorithm and sparse matrices is briefly reviewed below. That a graph can be represented as an adjacency matrix, which is typically sparse and thus often encoded in CSR/CSC format, is well-known. FIG. 4 is a graph 40 showing, by way of example, an adjacency matrix. For example, matrix $$A = \begin{pmatrix} 0 & 0 & 0 & 1 \\ 0.5 & 0 & 0 & 0.5 \\ 0.5 & 0.5 & 0 & 0 \\ 0 & 0 & 1 & 0 \end{pmatrix}$$

can be seen as a matrix representation of the graph 40 in FIG. 4. The graph above has 4 vertices and 6 weighted edges: ⟨0, 3, 1.0⟩, ⟨1, 0, 0.5⟩, ⟨1, 3, 0.5⟩, ⟨2, 0, 0.5⟩, ⟨2, 1, 0.5⟩, ⟨3, 2, 1.0⟩, where an edge of the form ⟨u, v, w⟩ indicates a link from vertex u to v with weight w, such that u is the source vertex of the edge and v the destination vertex of the edge. If these six edges are viewed as the non-zero entries of a sparse matrix in the form of (row, column, value) triples, then that they are exactly the non-zero entries in A can be verified. Thus, there is a one-to-one correspondence between weighted graphs and sparse matrices. The graph 40 has an interesting property: the weight of an edge is the reciprocal of the number of out-going links of its source vertex. Such a graph models the transition probabilities between vertices, which can be used to compute PageRank® algorithm as described further below with reference to FIG. 23. Other algorithms can also be run by the computing module 36, as further described below.

The structured CSC and structured CSR allow to increase the speed of processing of a matrix 32 using any type of hardware. Returning to FIG. 3, the encoder 34 is also capable of creating other types of compressed representations 35 that are particularly suited for increasing the speed of matrix processing in a server 33 that uses a GPU for the processing. For GPU-based sparse matrix processing, such as SpMV or SpMTV, the server 33 needs a SpMV processing kernel, a function implemented by processing threads running on one or more GPUs in the server, that implements the processing algorithms on the GPU such as those described below. However, as mentioned above, experiments show that a single kernel is far from being optimal, because the single kernel often fails to respond to the huge variations in the number of non-zero entries a sparse matrix row can have.

The server 33 is capable of running in parallel groupings of threads. For example, the server 33 can include multiple GPU threads grouped into units called warps. For example, the parallel threads of GPUs manufactured by Nvidia® Corporation of Santa Clara, Calif., are grouped into units of 32 called warps such that all threads in the same warp share a single streaming multiprocessor (SM) and assume the single instruction multiple threads (SIMT) execution model. If the threads run on the GPUs manufactured by Advanced Micro Devices®, Inc. of Sunnyvale Calif., the equivalent concept to warps is a called wavefront, which currently includes 64 threads executed on a group of 64 GPU cores. As a result, different threads in the same warp (or wavefront) cannot execute different instructions concurrently, although they are always allowed to process different data in parallel. For the purposes of this application, the term "warp" and "wavefront" are used interchangeably below to refer to a collection of GPU cores that share a single streaming multiprocessor and that run in parallel 32 or 64 multiple processing threads executing the same instructions. In a further embodiment, other thread numbers are possible in a warp. Further, larger groupings of threads are possible through groupings of the warps. Each such grouping is called a thread block and each block of threads includes more threads than a warp (more than 32 or 64 depending on the embodiment). The number of threads in each block is referred to as block size (or BLOCKSIZE in the description below) while the number of threads in a warp is referred to as warp size (or WARPSIZE in the description below). The encoder 34 allows to overcome the limitations of the hardware of the server 33 by creating encodings of the matrices 32 that allow the server 33 to run different kernels for portions of a matrix 32 with different numbers of non-zero entries. The encoder 34 creates a partitioned compressed representation of the matrix 32, with the partitioned compressed representation including multiple partitions. Each of the partitions is a listing of a group of portions of the matrix 32, such as rows or columns, that have a number of non-zero entries within a certain range. For example, one partition can have portions of the matrix 32 that have between 1 and 31 non-zero entries, the second partition can have portions of the matrix 32 that have between 32 and 1024 non-zero entries, while the third partition can have entries portions of the matrix that have more than 1024 non-zero entries. Other ranges of non-zero entries and other numbers of partitions are possible. The encoder 34 defines the partitioned compressed representation as follows. While the description below refers to portions of the matrix 32 being partitioned as being rows, columns of the matrix can be partitioned into same way mutatis mutandis.

Let k be an index of the partitions, starting at zero, with partitions with rows with fewer non-zero entries having a lower index than partitions with more non-zero entries. Thus, the partitions with rows having between 32 and 1024 non-zero entries would have a lower index k than the partition having more than 1024 non-zero entries. Let p be the total number of partitions, and let $A_s$ be an integer array of (p+1) elements, called the row partition separator array, specifying the minimum and maximum number of non-zero entries of a row allowed in each partition, as follows:

$A_s[0]=1$ $A_s[k]<A_s[k+1]$, for $k=0,1,2,\ldots,p-1$.

$A_s[p]=\infty$

In one embodiment, the values of $A_s[0]$ and $A_s[p]$ are not stored in the storage, as they are the maximum and minimum numbers of non-zero entries that a row of the matrix 32 could have; in a further embodiment, the values are stored in the storage 31.

The partitions are order-preserving. Let $e_{i\_}$ be the number of non-zero entries in row i of the sparse matrix. The set of rows in the k-th row-based partition, denoted as $R_k$, can be written as $R_k=\{i|A_s[k]\le e_{i\_}<A_s[k+1]\}$. Since not changing the content of the original matrix 32 is often desirable, a one-dimensional order-preserving permutation array, also called a mapping array below ($A_m$ or $A'_m$), is added to store the mapping from the partition-based row id, called the rank of the row, or rank of the column, back to the original row or column id respectively. Each of the ranks is an index in the mapping array of a portion of the matrix. For example, if a row has an id of 3 and a rank of 0, the value 3 would be the first value listed in the mapping array. Unlike ordinary permutation arrays, the order-preserving permutation array is required to keep the relative ordering of the rows assigned to the same partition as follows. Let $r_i$ and $r_j$ be the ranks of rows i and j in the permutation array. Let $p_i$ and $p_j$ be the partitions to which these two rows i and j belong. The ranks $r_i$ and $r_j$ are order preserving, if and only if the following constraints are satisfied:

$\forall p_i < p_j$, $r_i < r_j$—if the index of partition j is greater than index of partition i, rank of a row in partition j must be greater than rank of row in partition i $\forall p_i > p_j$, $r_i > r_j$—if the index of partition i is greater than index of partition j, rank of a row in partition i must be greater than rank of row in partition j.

$\forall p_i = p_j \land i \neq j$, $r_i < r_j \Leftrightarrow i < j$ (or equivalently, $r_i > r_j \Leftrightarrow i > j$)

The last constraint above is designed to respect the relative ordering of same-partition rows in the original matrix 32, such that rows with smaller ids will be accessed before rows with larger ids in the same partition. The constraint improves the cache performance of SLA algorithms such as SpMV, because the constraint reduces the randomness in accessing $A_r$ in both structured and unstructured CSR encodings. As a beneficial side effect, enforcing the order-preserving constraint also reduces the time complexity of the partitioning algorithm, because one only needs a single, cache-friendly, linear scan of the row-index array $A_r$ to fully partition a CSR matrix; whereas an algorithm based on sorting would incur on average O(m log m) comparisons that may result in quite a few cache misses, where m is the number of rows. Experiments show that not only order-preserving partitions can be computed much faster, they also lead to significantly faster SpMV than sorting-based partitions, which are usually not order-preserving.

Figure 9:
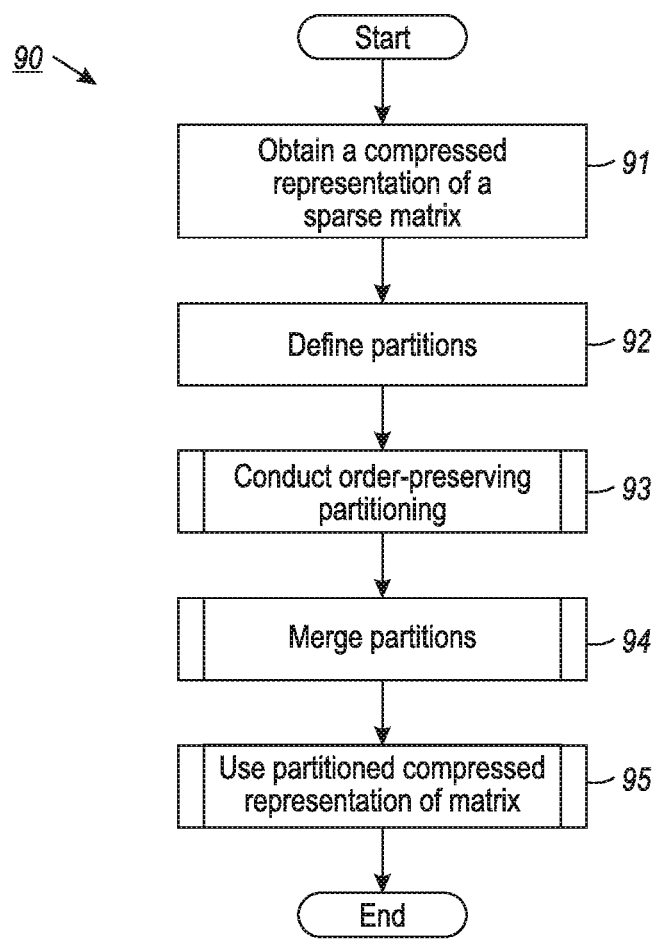
FIG. 9 is a flow diagram showing a computer-implemented method for efficient sparse matrix partitioning and processing, in accordance with one embodiment.

The order-preserving partitioned compressed representation of the matrix 32 can be created by the encoder 34 as described below beginning with a reference to FIG. 9 based on various preexisting compressed representations of the matrix 32, such as CSC, CSR, structured CSC and structured CSR. The partitioned compressed representations based on different compressed representations will differ from each other. For example, a sparse matrix A can be represented as $A = \langle A_{vc}, A_r, A_m, A_o, A_p, A_s \rangle$ for structured CSR, where $A_{vc}$ and $A_r$ are the same as before, $A_m$ is the row-partition mapping array, $A_o$ is the row-partition offset array, which includes the ranks of the first portions of each of the partitions and the total number of entries in the mapping array, $A_p$ is the number of row-based partitions, and $A_s$ is the row-partition separator array (optional if partitioning is completed). Structured CSR with row-based partitions are referred to as partitioned structured CSR (PSCSR) from this point on. Since unstructured CSR matrices can be partitioned using the routine described below with reference to FIG. 9 as well, the resulting encoding is called partitioned CSR (PCSR) in which the sparse matrix A is encoded as $\langle A_v, A_c, A_r, A_m, A_o, A_p, A_s \rangle$.

Similarly, a sparse matrix A can be represented as $A = \langle A'_{vr}, A'_c, A'_m, A'_o, A'_p, A'_s \rangle$ for structured CSC, where $A'_{vr}$ and $A'_c$ are the same as before, $A'_m$ is the column-partition mapping array, $A'_o$ is the column-partition offset array, $A'_p$ is the number of column-based partitions, and $A'_s$ is the column-partition separator array (optional if partitioning is completed). Structured CSC with column-based partitions is referred to as partitioned structured CSC (PSCSC) from this point on. Since unstructured CSC matrices can be partitioned using the same algorithm as well, the resulting encoding is called partitioned CSC (PCSC) in which the sparse matrix A is encoded as $\langle A'_v, A'_r, A'_c, A'_m, A'_o, A'_p, A'_s \rangle$.

For example, consider the same example matrix $$A = \begin{pmatrix} 0 & 0 & 0 & 1 \\ 0.5 & 0 & 0 & 0.5 \\ 0.5 & 0.5 & 0 & 0 \\ 0 & 0 & 1 & 0 \end{pmatrix}$$

shown earlier. If one wants to create two partitions for A such that:
1. the first partition contains only rows with a single non-zero entry
2. the second partition contains rows with multiple non-zero entries then $A_p = A'_p = 2$ and $A_s = A'_s = [1, 2, \infty]$. Other arrays are as follows:
$A_m = [0, 3, 1, 2]$ and $A_o = [0, 2, 4]$, for PCSR and PSCSR
$A'_m = [1, 2, 0, 3]$ and $A'_o = [0, 2, 4]$, for PCSC and PSCSC Whether creating the partitioned compressed representations is practicable given the hardware resources of the system 30 can be determined using the formula discussed below in relation to Table 1. The partitioned compressed encoding representation can be processed by the computing module 36, such as described below beginning with reference to FIG. 9, regardless of whether the server 33 includes one or more GPUs or only one or more CPUs. However, the creation of partitions that list portions of the matrix 32 with certain numbers of non-zero entries allows the computing module 36 to apply the most appropriate processing kernel when processing those portions when the server 33 includes GPUs. While many processing kernels are possible, the computing module can apply at least the following three kernels:

1. One-thread-one-row (1T1R) kernel, which assigns a single processing thread to process a row or a column.
2. One-warp-one-row (1W1R) kernel, which assigns all threads in a unit called a warp to process a row or a column.

By themselves, none of the kernels are ideal for all portions of a matrix 32. As mentioned above, the 1T1R kernels (which can also be referred to as $f_{1T1R}$ kernels below) suffer from load imbalance, since the total runtime depends on the slowest thread, which corresponds to the row (or column) with the most number of non-zero entries. The 1W1R kernels (which can also be referred to as $f_{1W1R}$ kernels below) suffer from a waste of hardware resource when the number of non-zero entries in a row (or column) is less than 32 (or 64), the warp (or wavefront) size. Note that a single sparse matrix may have both rows with few and rows with many non-zero entries. Thus, committing to either type of kernels rarely solves the problem. Furthermore, the experiments show that there is benefit in having more threads than those in a single warp to work on the same row. This prompts a need to add a third type:

3. One-block-one-row (1B1R) kernel, which assigns a block of threads (>32 or 64) to process a row or a column.

Like the 1W1R kernel, the 1B1R kernel (which can also be referred to as $f_{1B1R}$ kernel below) can also suffer from a waste of hardware resource when the number of threads is greater than the number of non-zero entries in that portion of the matrix. However, by correlating each kernel with a particular partition of the matrix, the computing module can use the best kernel for processing a particular row or column, as further described below with reference to FIG. 15.

Still other types of kernel functions are possible.

To mix the $f_{1T1R}$, $f_{1W1R}$, and $f_{1B1R}$, or other kernels efficiently, the SpMV algorithm needs to quickly distinguish among the rows that each kernel is good at. For fast row classification, a sparse matrix partitioning algorithm is described below beginning with reference to FIG. 9, which groups together the matrix rows that are best processed by the same kernel. More precisely, the partitioning algorithm takes as input the minimum and maximum number of non-zero entries for the rows in each partition and produces a mapping that can be used to determine the partition each row or column belongs to, as further described below beginning with reference to FIG. 9. In a further embodiment, the kernel functions can be assigned to the partitions based on factors other than the number of non-zero entries in the partitions.

The one or more servers 33 are connected to a network 37, which can be a local network or an internetwork such as the Internet or a cellular network, and through the network can communicate with at least one user device 38. While the user device 38 is shown as desktop computer, the user device 38 can also include laptop computers, smartphones, media players, and tablets. Still other kinds of user devices 38 are possible. The user device 38 can communicate with the server 33 through the network 15, receive commands from performing computations, and output the results of the computations back to the user device.

SpMV and SpMTV are just two of the many SLA operations that can be built on top of (PS)CSR and (PS)CSC encodings. In general, any algorithm that deals with sparse matrices may benefit from partitioned (P) and/or structured (S) CSR/CSC encodings, especially if the algorithm must access at the same time both the value and the position of a non-zero entry in the matrix. Other SLA operations, such as sparse matrix-matrix multiplication (SpMM) have a similar access pattern, and thus can benefit from the same encodings introduced here.

Figure 5:
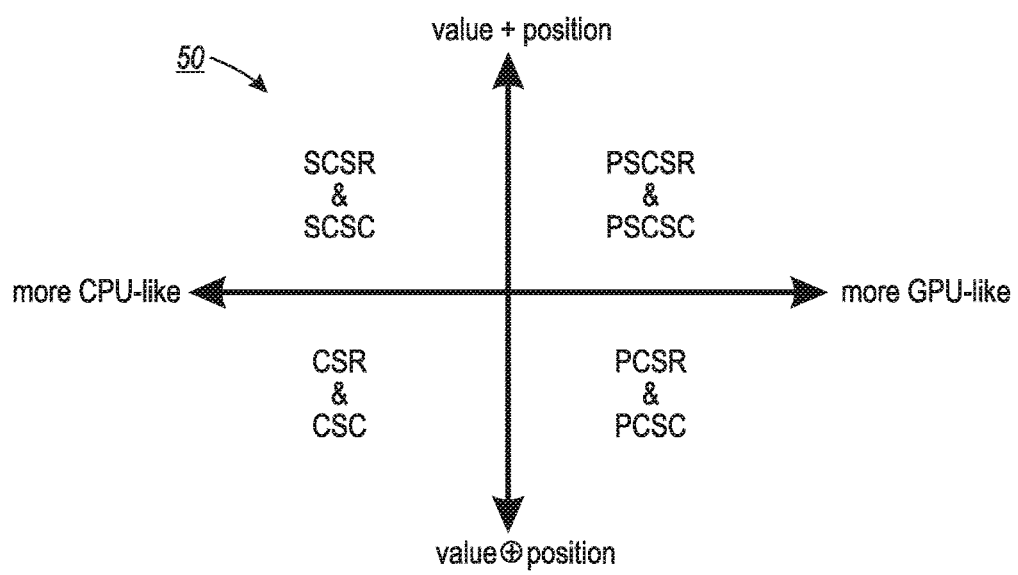
FIG. 5 is a graph summarizing the strengths of various encodings for various hardware set-ups of the system of FIG. 3.

There are, however, tasks for which the conventional CSR/CSC encoding can work well even without structuring and for which the system 30 can use the conventional CSR/CSC encodings. For example, computing the Frobenius norm of a sparse matrix A, which is defined as $$\|A\|_F = \sqrt{\sum_i \sum_j |a_{ij}|^2}$$

doesn't require the algorithm to access the positions of non-zero entries, and thus mixing their values and positions in the same array may not always help. Another example is to test whether or not a sparse matrix is diagonal, which only requires accessing the positions of non-zero entries, but not their values. In general, any algorithm that only needs to access either the values or the positions (but not both) of non-zero matrix entries may not benefit from structured CSR/CSC. Note that both examples above already have excellent memory reference locality, which typically results in few cache misses or none, if data pre-fetching is enabled. In other words, there is not much for structured CSR/CSC to lose over their unstructured counterparts, even in the worst case, and generally structured CSR/CSC encodings perform as well unstructured CSR/CSC encodings in these scenarios. Nevertheless, as structured CSR/CSC are generally likely the most efficient and robust data structure for encoding sparse matrices on the CPU and are of most use in the majority of situations, there is little reason (except for legacy code) to use conventional CSR/CSC. FIG. 5 is a graph 50 summarizing the strengths of various encodings for various hardware set-ups of the system 30 of FIG. 3. The graph 50 illustrates that in the majority of scenarios, the encodings described above are superior to conventional, unstructured, CSR/CSC encodings. The graph 50 includes two orthogonal dimensions: (1) hardware flexibility as the x-axis and (2) memory access pattern as the y-axis. For the y-axis, the graph 50 distinguishes between memory-access patterns that require simultaneous access to both the value and the position of a non-zero matrix entry (labeled as 'value+position' on the top) versus patterns that only require access to either the value or the position (but not both) of a non-zero entry (labeled as 'value⊕position' on the bottom, where the symbol '⊕' denotes the exclusive or relationship).

The graph 50 shows that three out of the four quadrants prefer the sparse-matrix encodings introduced in this application and that the only scenario to prefer the conventional unstructured CSR/CSC format is when the memory-access pattern is either value-only or position-only for the non-zero entries and the hardware is more CPU-like. As explained earlier, the performance gain achievable by the conventional CSR/CSC format is quite limited, if at all. On the other hand, its performance loss in the other three quadrants, especially in the top-right corner, can be substantial, justifying the use of the encodings discussed above for all situations.

Returning to FIG. 3, one or more servers 33 can include components conventionally found in programmable computing devices, such as one or more CPUs and GPU and SM, memory, input/output ports, network interfaces, and non-volatile storage, although other components are possible. The servers 33 can each include one or more modules for carrying out the embodiments disclosed herein. The modules can be implemented as a computer program or procedure written as source code in a conventional programming language and that is presented for execution by the central processing unit as object or byte code. Alternatively, the modules could also be implemented in hardware, either as integrated circuitry or burned into read-only memory components, and each of the servers 33 can act as a specialized computer. For instance, when the modules are implemented as hardware, that particular hardware is specialized to perform the partitioning and other computers without the hardware cannot be used for that purpose. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 6:
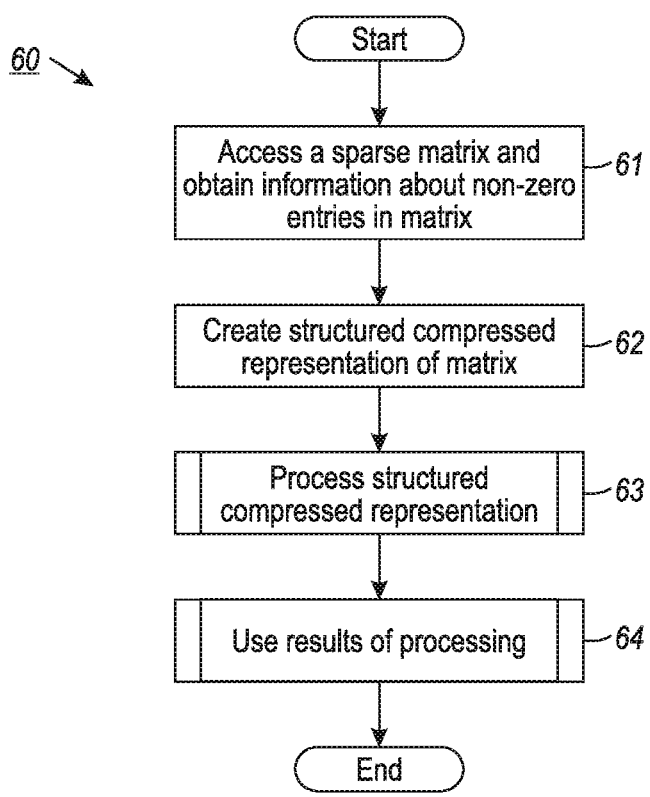
FIG. 6 is a flow diagram showing a computer-implemented method for structured sparse matrix representation acquisition, in accordance with one embodiment.

As mentioned above, structured CSR and structured CSC allow to reduce the number of cache misses during matrix processing, such as SpMV. FIG. 6 is a flow diagram showing a computer-implemented method 60 for structured matrix representation acquisition, in accordance with one embodiment. The method 60 can be implemented on the system 30 of FIG. 3, though other implementations are possible. Initially, a sparse matrix is accessed and information about the non-zero entries in portions of the matrix, the rows and columns, is obtained (step 61). A structured compressed representation of the matrix, either structured CSC or structured CSR, of the matrix is created by encoding information about the non-zero entries into a composite array ($A_{vc}$ or $A'_{vr}$) and an index array ($A_r$ or $A'_c$) as described above (step 62). The structured compressed representation is processed (step 63), such as by performing SpMV, as described below with reference to FIG. 7, or SpMTV, as described below with reference to FIG. 8, though other kinds of processing are also possible. The results of the processing are applied (step 64), such as by performing the PageRank® or another ranking algorithm, although other kinds of applications of the processing the results are also possible. The method 60 is concluded.

Figure 7:
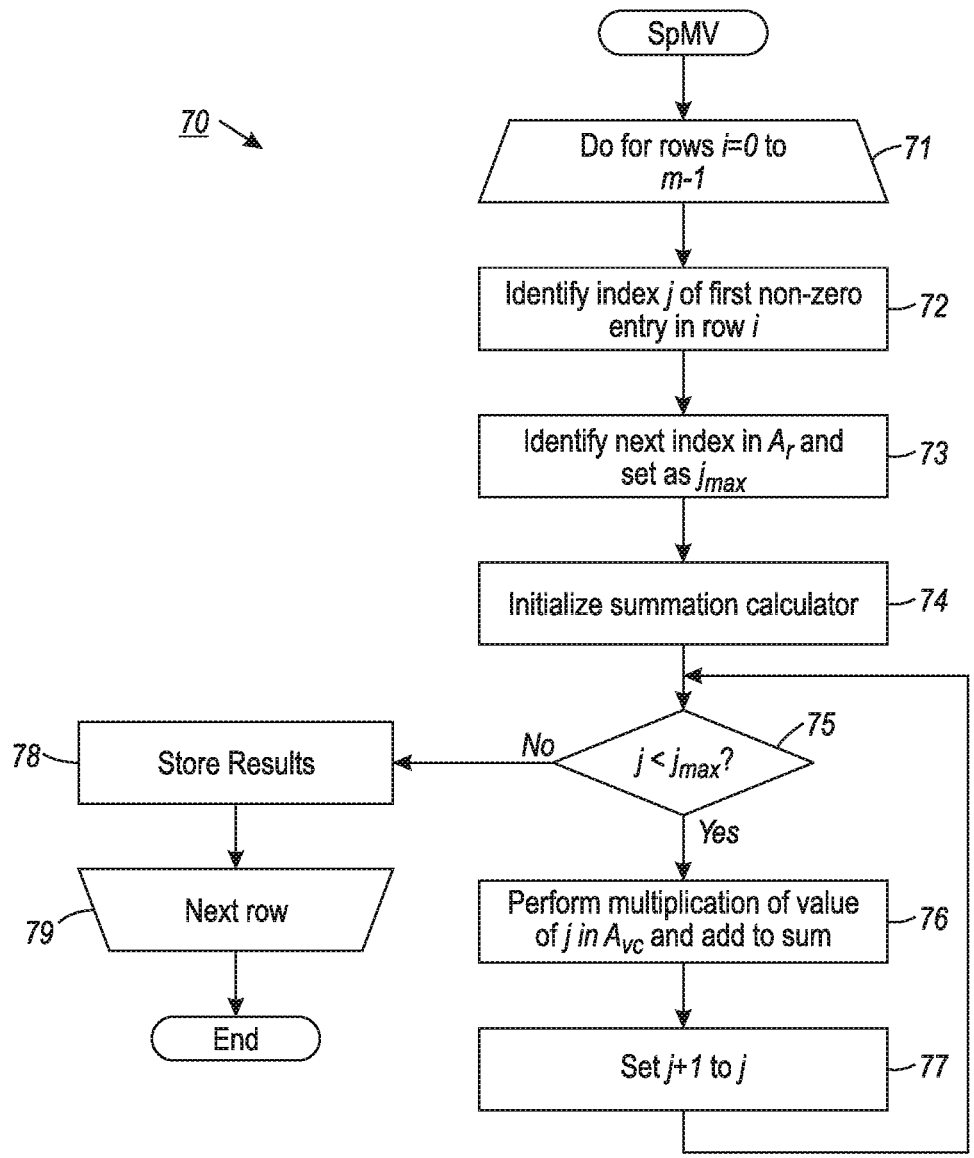
FIG. 7 is a routine for performing SpMV on a matrix encoded using structured CSR encoding for use in the method of FIG. 6, in accordance with one embodiment.

SpMV performed on structured compressed representation of the matrix reduces the probability of cache misses. FIG. 7 is a routine 70 for performing SpMV on a matrix encoded using structured CSR encoding for use in the method 60 of FIG. 6. Let $a_{vc} \in A_{vc}$ be an element of the value-column array. Since $a_{vc}$ is a structure, the dot operator can be used, as in popular programming languages such as C++ and Java, to access the array members: $a_{vc}\cdot v$ returns the 'value' field and $a_{vc}\cdot c$ returns the 'column' field of $a_{vc}$, which are used in the computation in step 76 described below. Other ways to access the value and the column fields are possible. To illustrate the routine 70 and subsequent SpMV routines described below, the same m×n matrix used in the examples above, and two dense vectors x and y of size n and m, respectively, are used.

An iterative processing loop (steps 71-79) of processing rows with id i=0 to m−1, all rows of the matrix, is started (step 71). An entry for the i-th row in the $A_r$ array is located, identifying the index in the $A_{vc}$ array of the first non-zero entry for that row in the matrix; the identified index is set as a variable j (step 72). The next (i+1) entry in the $A_r$ array is located and set as a variable $j_{max}$ (step 73). Unless the i-th row is the last row in the matrix, the next entry in the $A_r$ array is the index in the $A_{vc}$ array of the first non-zero entry in (i+1)-th row; if the i-th row is the last row in the matrix, the next entry in the $A_r$ array is the total number of entries in the $A_{vc}$ array. A summation calculator, a function for summing together results of multiplication of the values of the non-zero arrays described in step 76 below, is initialized by setting the value of the sum at zero (step 74). If j is less than $j_{max}$ (step 75), a computation according to the formula:

sum←sum+$A_{vc}[j]\cdot v \times x[A_{vc}[j]\cdot c]$ is performed (step 76). In the computation, the value stored in the element of the $A_{vc}$ array with the index j is multiplied by the element of x whose index is the index of the column stored in the $A_{vc}$ element with the j-th index. The result of multiplication is added to the sum of results of multiplication performed during previous iterations of the step 76; during the first iteration of step 76 in the routine, the sum is zero, as set in step 74 above. Upon the completion of the calculation, 1 is added to the value of j and the result of the addition is set as j (step 77), moving the processing to the entry in the next column in that row. The method returns to step 75 described above, repeating steps 75-77 until of the non-zero values in the i-th row are processed. If j is not less than $j_{max}$ (step 75), the sum resulting from addition of results multiplication during the iterations in the loop 75-77 is stored in the dense vector y (step 78). The iterative processing loop moves to the next row (step 79), with the processing of the rows through the loop (steps 71-79) continuing until all of the rows have been processed through the loop (steps 71-79), after which the routine 70 ends. The routine 70 can also be expressed using the following pseudocode, with the text box showing the difference from pseudocode shown above with reference to FIG. 1:

```
for i = 0 to m − 1          /* loop over m rows of sparse matrix A */
    j ← A_r[i]              /* j: index in A_vc of first non-zero entry in i-th row */
    j_max ← A_r[i + 1]      /* j_max: index in A_vc of first non-zero entry in (i + 1)-th row */
    sum ← 0                 /* initialize the summation accumulator */
    while (j < j_max)       /* test if end of row has been reached */
        sum ←  sum + A_vc[j].v × x[A_vc[j].c]    /* compute y_i = Σ_j A_{i,j} × x_j */
        j ← j + 1           /* move on to next non-zero column in i-th row */
    end while
    y[i] ← sum              /* store result in y */
end for
```

Figure 8:
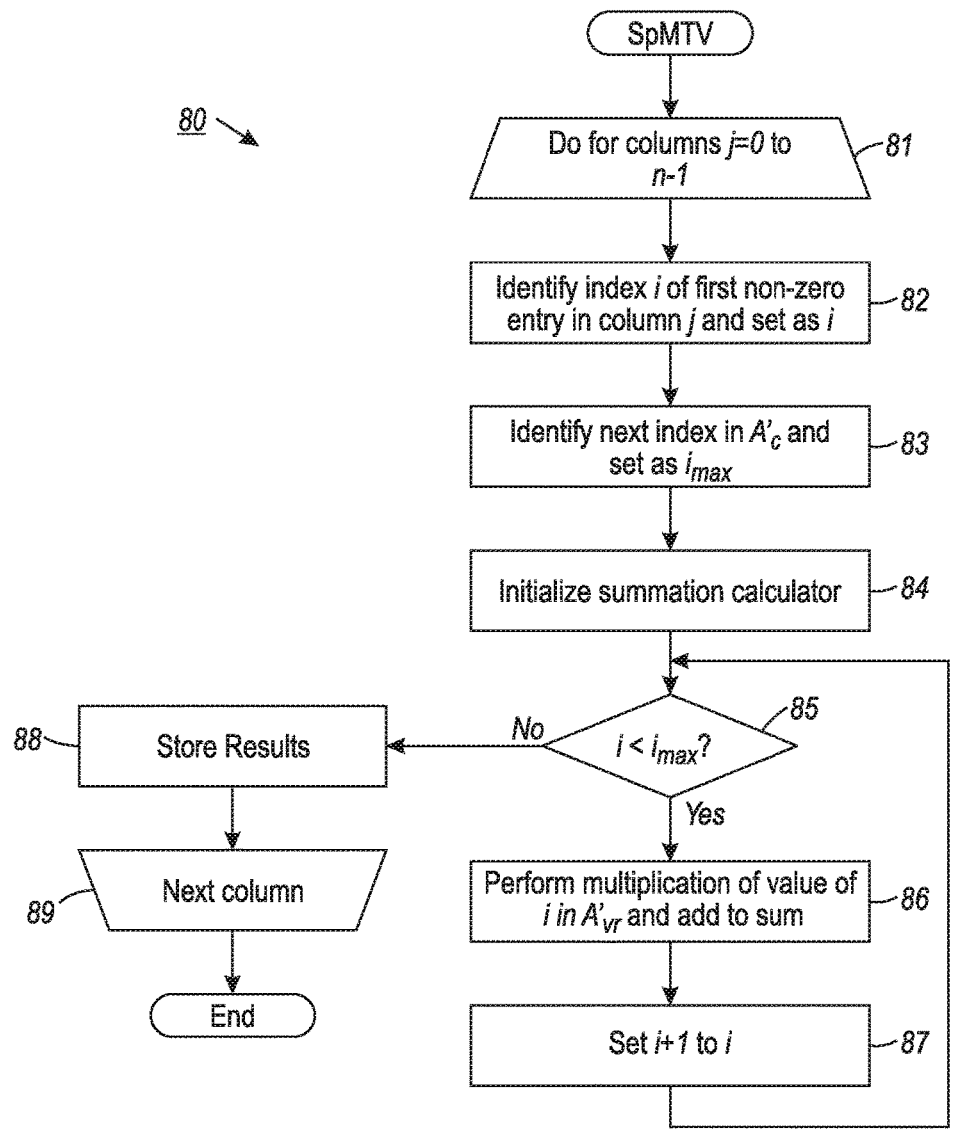
FIG. 8 is a routine for performing SpMTV on a matrix encoded using structured CSC encoding for use in the method of FIG. 6, in accordance with one embodiment.

Similarly to SpMV performed on the structured CSR, performing SpMTV on the structured CSC reduces the likelihood of encountering cache misses than when the processing is performed on unstructured CSC. FIG. 8 is a routine 80 for performing SpMTV on a matrix encoded using structured CSC encoding for use in the method 60 of FIG. 6. Let $a'_{vr} \in A'_{vr}$ be an element of the value-row array. Since $a'_{vr}$ is a structure, the dot operator can be used, as in popular programming languages such as C++ and Java, to access the array members: $a'_{vr}\cdot v$ returns the 'value' field and $a'_{vr}\cdot r$ returns the 'row' field of $a'_{vr}$, which are used in the computation in step 86 described below. Other ways to access the value and the row fields are possible. To illustrate the routine 80 and other SpMTV routines below, the same m×n matrix as in the examples above and two dense vectors x' and y' of size m and n, respectively, are used.

An iterative processing loop (steps 81-89) of processing columns with id j=0 to n−1, all columns of the matrix, is started (step 81). An entry for a j-th column in the $A'_c$ array is located, identifying the index in the $A'_{vr}$ array of the first non-zero entry for that column in the matrix; the identified index is set as a variable i (step 82). The next (j+1) entry in the $A'_c$ array is located and set as a variable $i_{max}$ (step 83). Unless the j-th column is the last column in the matrix, the next entry in the $A'_c$ array is the index in the $A'_{vr}$ array of the first non-zero entry in the (j+1)-th column; if the j-th column is the last column in the matrix, the next entry in the $A'_c$ array is the total number of entries in the $A'_{vr}$ array. A summation calculator, a function for summing together results of multiplication of the values of the non-zero arrays described in step 86 below, is initialized by setting the value of the sum at zero (step 84). If i is less than $i_{max}$ (step 85), a computation according to the formula:

sum←sum+$A'_{vr}[i]\cdot v \times x'[A'_{vr}[i]\cdot r]$ is performed (step 86). In the computation, the value stored in the element of the $A'_{vr}$ array with the index i is multiplied by the element of x' whose index is the index of the row stored in the $A'_{vr}$ element with the i-th index. The result of multiplication is added to the sum of results of multiplication performed during previous iterations of step 86; during the first iteration of step 86 in the method, the sum is zero, as set in step 84 above. Upon the completion of the calculation, 1 is added to the value of i and the result of the addition is set as i (step 87), moving the processing to the entry in the next row in that column. The routine 80 returns to step 85 described above, repeating steps 85-87 until of the non-zero values in the j-th column are processed. If i is not less than $i_{max}$ (step 85), the sum resulting from addition of results multiplication during the iterations of the loop 85-87 is stored in the dense vector y' (step 88). The iterative processing loop moves to the next column (step 89), with the processing of the columns through the loop (steps 81-89) continuing until all of the columns have been processed through the loop (steps 81-89), after which the routine 80 terminates. The routine 80 of FIG. 8 can also be expressed using the following pseudocode, with the text box showing the difference from the pseudocode shown above with reference to FIG. 2:

```
for j = 0 to n - 1         /* loop over n columns of sparse matrix A */
    i ← A_c'[j]            /* i: index in A_vr' of first non-zero entry in j-th column */
    i_max ← A_c'[j + 1]    /* i_max: index in A_vr' of first non-zero entry in (j + 1)-th column */
    sum ← 0                /* initialize the summation accumulator */
    while (i < i_max)      /* test if end of column has been reached */
        sum ← sum + A_vr'[i].v × x'[A_vr'[i].r]    /* compute y_j' = Σ_i A_{i,j} × x_i' */
        i ← i + 1          /* move on to next non-zero row in j-th column */
    end while
    y'[j] ← sum            /* store result in y' */
end for
```

While structured encodings are useful for both GPU and exclusively-CPU based hardware, further gains in processing speed can be gained by performing order-preserving partitioning of compressed encodings for GPU-based hardware. Whether creating the partitioned compressed representations is practicable given the hardware resources of a hardware system can be determined using the formula discussed below in relation to Table 1. FIG. 9 is a flow diagram showing a computer-implemented method 90 for efficient sparse matrix partitioning and processing, in accordance with one embodiment. The method 90 can be implemented using the system described above with reference to FIG. 3, though other implementations are possible. A compressed representation of a sparse matrix is obtained (step 91). Such compressed representation can be a CSC encoding, a CSR encoding, a structured CSC encoding, or structured CSR encoding. The representation can be accessed from the storage 32 by the server 33 or obtained from another source. The server 33 defines partitions for portions of the matrix represented in the compressed representation (step 92). In particular, the server 33 defines the numbers of partitions to be created ($A_p$ and $A'_p$) and the values in the $A_s$ array described above with reference to FIG. 3, specifying the ranges of non-zero entries that portions of the matrix in the partition can have. Once the partitions are defined, the order-preserving partitioning of the compressed representation is performed, as further described below with reference to FIG. 10 (step 93). The created partitions are merged together, forming the mapping array ($A_m$ or $A'_m$) described above, as further described with reference to FIG. 10, and defining the offset array ($A_o$ and $A'_o$) based on the mapping array, thus completing the order-preserving partition compressed representation of the matrix (step 94). The partitioned compressed representation of the matrix can then be used for processing, such as SpMV and SpMTV, with the results of such processing being in turn applied, such as in the PageRank® Algorithm, as described below with reference to FIGS. 17-23 (step 95), ending the method 90.

Figure 10:
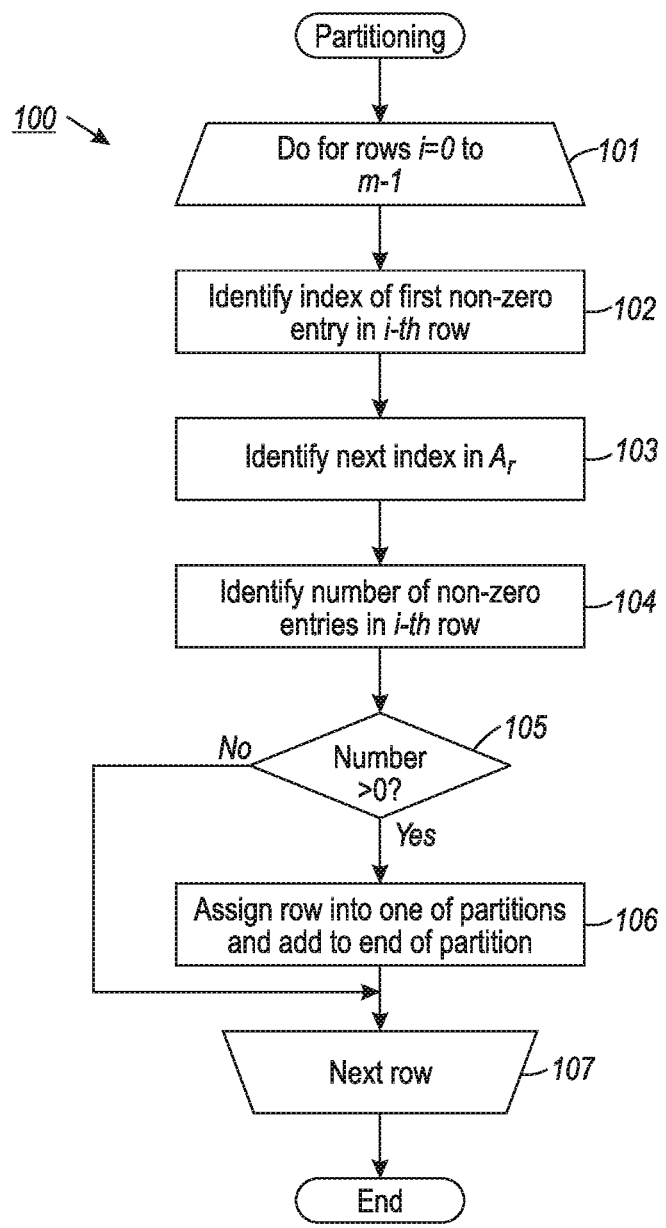
FIG. 10 is a flow diagram showing a routine for performing order-preserving partitioning of rows of a matrix represented in a compressed representation for use in the method of FIG. 9, in accordance with one embodiment.

Partitioning allows to group together portions of the matrix that have similar numbers of non-zero entries while preserving their order. FIG. 10 is a flow diagram showing a routine 100 for performing order-preserving partitioning of rows of a matrix represented in a compressed representation for use in the method 90 of FIG. 9, in accordance with one embodiment. The compressed representation can be both CSR and structured CSR. An iterative processing loop (steps 101-107) of processing rows with id i=0 to m−1, all rows of the matrix, is started (step 101). An entry for the i-th row in the $A_r$ array is located, identifying the index in the $A_v$ or $A_{vc}$ array, depending on whether the initial compressed representation was CSR or structured CSR, of the first non-zero entry for that row in the matrix; the identified index is set as a variable j (step 102). The next (i+1) entry in the $A_r$ array is located and set as a variable $j_{max}$ (step 103). Unless the i-th row is the last row in the matrix, the next entry in the $A_r$ array is the index in the $A_{vc}$ (or $A_v$) array of the first non-zero entry in (i+1)-th row; if the i-th row is the last row in the matrix, the next entry in the $A_r$ array is the total number of entries in the $A_{vc}$ (or $A_v$) array. The number of non-zero entries in the i-th a row is determined by subtracting j from $j_{max}$ (step 104); the number of the non-zero entries can be denoted as $e_{i\_}$. If $e_{i\_}$ is greater than zero (step 105), the row i is assigned into one of the defined partitions based on the value of $e_{i\_}$ and based on the maximum and minimum numbers of non-zero entries permissible in the partitions and the row id of row i is added to the end of the list of rows in the partition k (step 106). Thus, the partition with index k to which the row i belongs is found such that $A_s[k] \le e_{i\_} < A_s[k+1]$. In one embodiment, the partition k can be found using a function denoted as lower_bound($A_s$, b), which returns the index of the first element of an ascending array $A_s$ that is no less than b, with $e_{i\_}$ being set as b. Other ways to find the partition are possible. The iterative processing loop moves to the next row (step 107), with the processing of the rows through the loop (steps 101-107) continuing until all of the rows have been processed. If $e_{i\_}$ is not greater than zero (step 105), the routine 100 moves directly to step 107. After all of the rows of the matrix have been processed through the loop (steps 101-107), the routine 100 ends. The routine 100 shown with reference to FIG. 9 can also be expressed using the following pseudocode:

```
for i = 0 to m - 1        /* loop over m rows of sparse matrix A */
    j ← A_r[i]            /* j: index of first non-zero entry in i-th row */
    j_max ← A_r[i+1]      /* j_max: index of first non-zero entry in (i+1)-th row */
    e_{i-} ← j_max - j    /* e_{i-}: the number of non-zero entries in i-th row */
    if (e_{i-} > 0) then
        k ← lower_bound(A_s,    /* find partition k s.t. A_s[k] ≤ e_{i-} <
            e_{i-})                 A_s[k+1] */
        partition[k].push_back(i)  /* add row id i to end of partition k
                                      (i.e., R_k) */
    end if
end for
```

Figure 11:
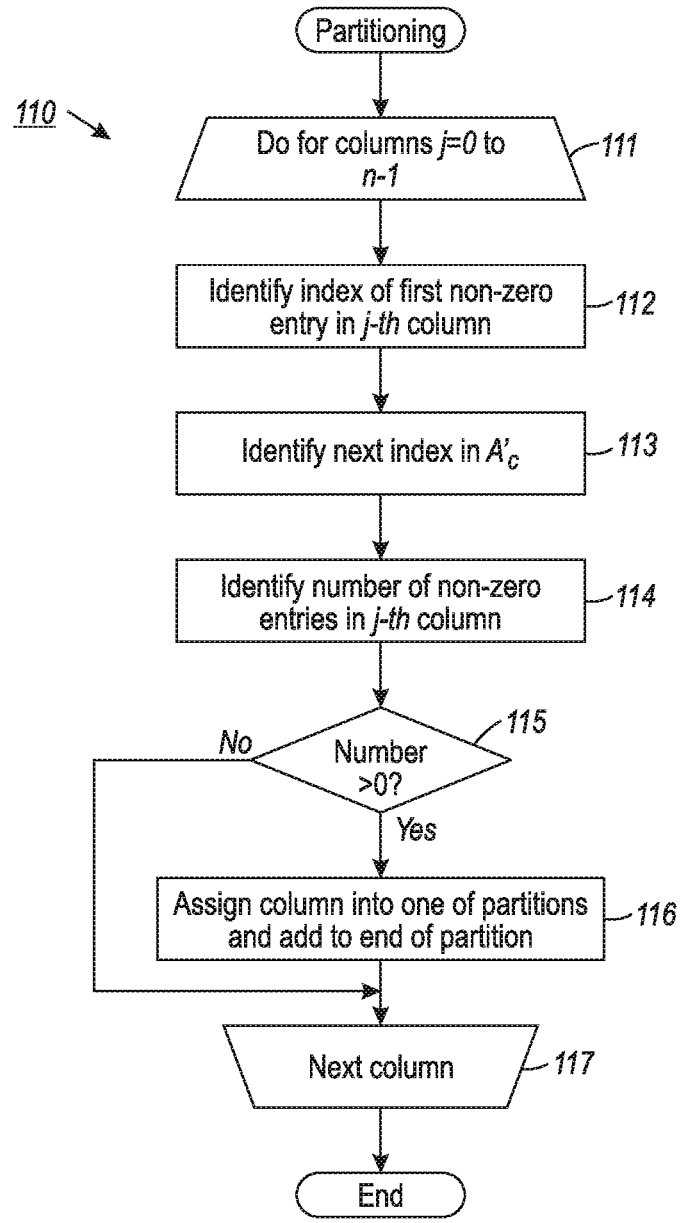
FIG. 11 is a flow diagram showing a routine for performing order-preserving partitioning of columns of a matrix represented in a compressed representation for use in the method of FIG. 9, in accordance to one embodiment.

Similarly, an order-preserving matrix partitioning algorithm for CSC or structured CSC can be designed. Let $e_{-j}$ be the number of non-zero entries in column j of the sparse matrix. The set of columns in the k-th column-based partition, denoted as $C_k$, can be written as $C_k = \{j | A'_s[k] \le e_{-j} < A'_s[k+1]\}$. The partitioning algorithm respects the relative ordering of same-partition columns in the original CSC matrix, which improves the cache performance of both structured and unstructured CSC encodings, because respecting the relative ordering reduces the randomness in accessing the column-index array $A'_c$. FIG. 11 is a flow diagram showing a routine 110 for performing order-preserving partitioning of columns of a matrix represented in a compressed representation for use in the method 90 of FIG. 9, in accordance to one embodiment. The compressed representation can be both CSC and structured CSC.

An iterative processing loop (steps 111-117) of processing columns with id j=0 to n−1, all columns of the matrix, is started (step 111). An entry for a j-th column in the $A'_c$ array is located, identifying the index in the $A'_{vr}$ or $A'_v$ array, depending on whether the original compressed encoding is structured CSC or CSC, for the first non-zero entry for that column in the matrix; the identified index is set as a variable i (step 112). The next (j+1) entry in the $A'_c$ array is located and set as a variable $i_{max}$ (step 113). Unless the j-th column is the last column in the matrix, the next entry in the $A'_c$ array is the index in the $A'_{vr}$ (or $A'_v$) array of the first non-zero entry in the (j+1)-th column; if the j-th column is the last column in the matrix, the next entry in the $A'_c$ array is the total number of entries in the $A'_{vr}$ (or $A'_v$) array. The number of non-zero entries in the j-th column, $e_{-j}$, is determined by subtracting i from $i_{max}$ (step 114). If $e_{-j}$ greater than zero (step 115), the column j is assigned into one of the defined partitions based on the value of $e_{-j}$ and based on the maximum and minimum numbers of non-zero entries permissible in the partitions, and the column id of column j is added to the end of the list of columns in the partition k (116). Thus, the partition with index k to which the column j belongs is found such that $A'_s[k] \le e_{-j} < A'_s[k+1]$. In one embodiment, the partition k can be found using a function denoted as lower_bound($A'_s$, b), which returns the index of the first element of an ascending array $A'_s$ that is no less than b, with $e_{-j}$ being set as b. Other ways to find the partition are possible. The iterative processing loop moves to the next column (step 117), with the processing of the columns through the loop (steps 111-117) continuing until all of the columns have been processed. If $e_{-j}$ is not greater than zero (step 115), the routine 110 moves directly to step 117. After all of the columns of the matrix have been processed, the routine 110 ends. The routine 110 shown with reference to FIG. 11 can also be expressed using the following pseudocode:

```
for j = 0 to n - 1          /* loop over n columns of sparse matrix A */
    i ← A'_c[j]             /* i: index of first non-zero entry in j-th column */
    i_max ← A'_c[j+1]       /* i_max: index of first non-zero entry in (j+1)-th column */
    e_{-j} ← i_max - i      /* e_{-j}: the number of non-zero entries in j-th column */
    if (e_{-j} > 0) then
        k ← lower_bound(A'_s,   /* find partition k s.t. A'_s[k] ≤ e_{-j} <
            e_{-j})                 A'_s[k+1] */
        partition[k].push_back(j)   /* add column id j to end of partition k
                                       (i.e., C_k) */
    end if
end for
```

Figure 12:
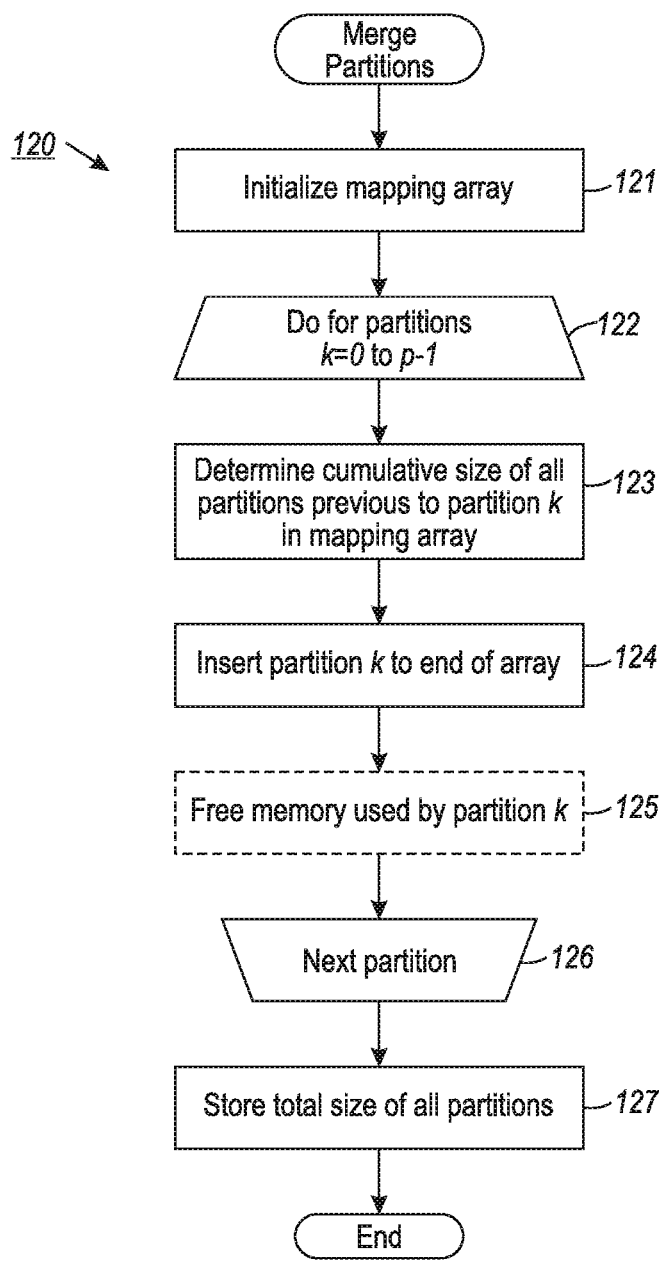
FIG. 12 is a flow diagram showing a routine for merging partitions into a mapping array for use in the method of FIG. 9, in accordance with one embodiment.

Once the partitions are created, the partitions can be merged into the mapping array. FIG. 12 is a flow diagram showing a routine 120 for merging partitions into a mapping array for use in the method 90 of FIG. 9, in accordance with one embodiment. Initially, the mapping array ($A_m$ or $A'_m$, depending on the original compressed representation) is initialized by setting the size of the array, the number of portions of the matrix in the array, to zero (step 121). An iterative processing loop (steps 122-126) of processing partitions with index k=0 to p−1, all created partitions, is started (step 122). For a partition k, the cumulative size of all partitions with an index that is less than k is calculated; if k is 0, the cumulative size is also 0 (step 123). As the partitions with the index less than k precede the partition k in the array, the cumulative size of the preceding partitions show where the end of the mapping array is; upon determining the cumulative size, the partition k is inserted to the end of the mapping array (step 124). Optionally, any memory in the storage 31 occupied by the partition k is freed up (125). The routine 120 moves to the next partition (step 126), the processing of the partitions through the loop (steps 122-126) continuing until all of the partitions have been processed. Upon processing of all the created partitions, the cumulative size of all the partitions is calculated and set as $A_{o[p]}$, ending the routine 120. The routine 120 of FIG. 12 can also be shown using the following pseudocode:

```
    A_m.size ← 0              /* A_m: (order-preserving permutation) mapping
array */
    for k = 0 to p - 1        /* loop over p partitions */
        A_o[k] ← A_m.size( )  /* A_o[k]: cumulative size of all previous partitions
< k */
        A_m.insert(partition[k])  /* insert partition k to end of A_m */
        delete partition[k]       /* free memory used by partition k (optional) */
    end for
    A_o[p] ← A_m.size( )      /* A_o[p]: total size of all partitions */
```

Upon return of the routine 120 shown with reference to FIG. 12, $A_o[k]$ stores the rank of the first row (or column) of partition k, and the rank of the last row (or column) of partition k is given by $A_o[k+1]-1$, for k=0, 1, . . . , p-1. The last element of the array offset, $A_o[p]$, always equals to the number of elements in the permutation array, which is the number of rows (or columns) for CSR (or CSC).

Figure 13:
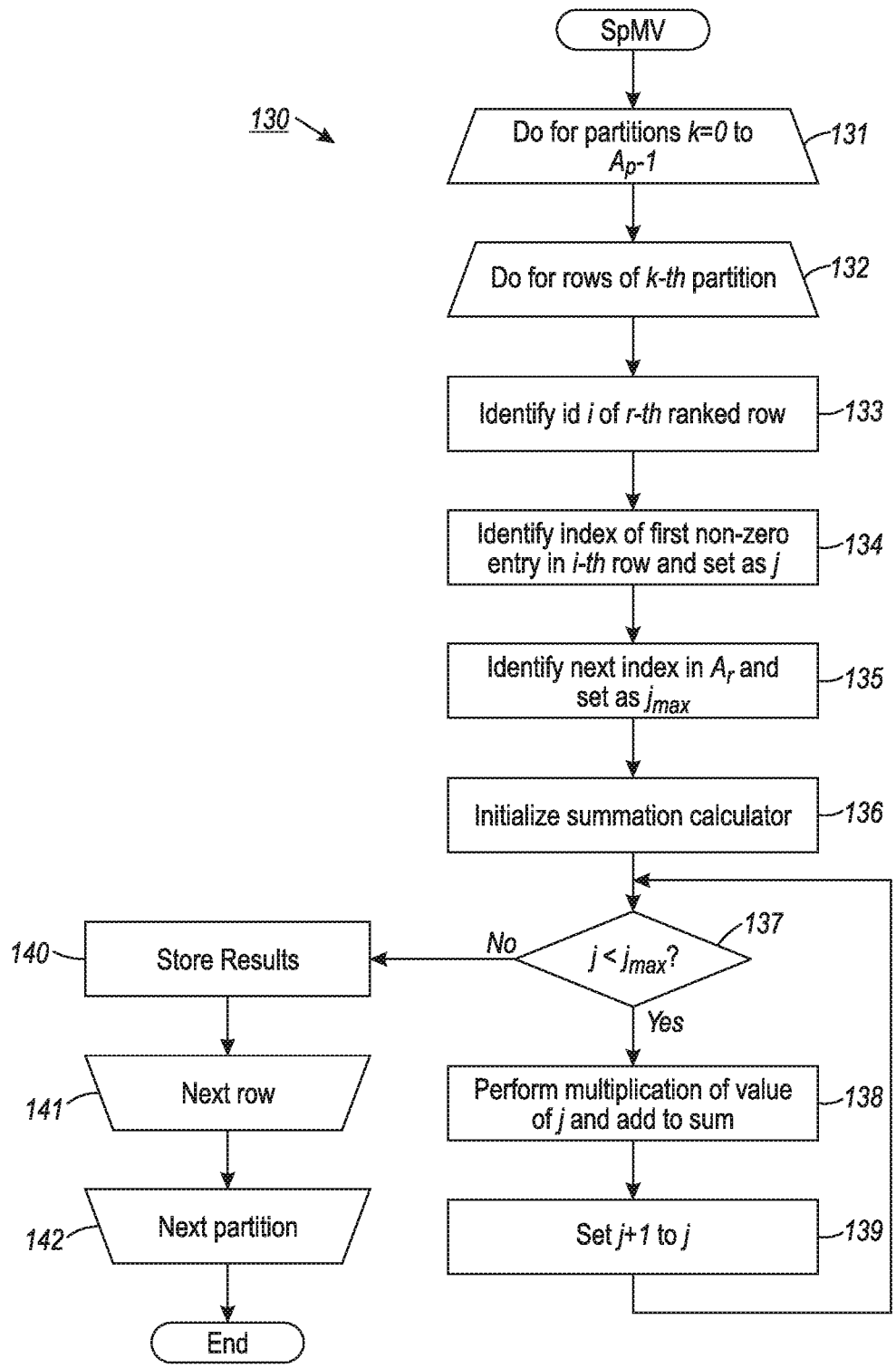
FIG. 13 is a flow diagram showing a routine for performing SpMV on a matrix encoded in a partitioned compressed representation for use in the method of FIG. 9, in accordance with one embodiment.

The partitioned compressed representation of the matrix can be used for processing by the servers 33 that include both CPUs and GPUs as well as those that include only CPUs. FIG. 13 is a flow diagram showing a routine 130 for performing SpMV on a matrix encoded using partitioned compressed representation for use in the method 90 of FIG. 9, in accordance with one embodiment. The routine can be applied to both PSCSR and PCSR representations. The routine 130 can be used by servers that include both CPUs and GPUs as well as those that include only CPUs. An outer iterative processing loop (steps 131-142) of processing partitions with index k=0 to $A_p-1$, all created partitions, is started (step 131). An inner iterative processing loop (steps 132-141) of processing all of the rows in the k-th partition is began, with ranks of the rows in the mapping array being $r=A_o[k]$ to $A_o[k+1]-1$ (step 132). The id of the r-th ranked row is identified and set as i (step 133). An entry for the i-th row in the $A_r$ array is located, identifying the index in the $A_v$ or $A_{vc}$ array, depending on whether the initial compressed representation is CSR or structured CSR, of the first non-zero entry for that row in the matrix; the identified index is set as a variable j (step 134). The next (i+1) entry in the $A_r$ array is located and set as a variable $j_{max}$ (step 135). Unless the i-th row is the last row in the matrix, the next entry in the $A_r$ array is the index in the $A_{vc}$ (or $A_v$) array of the first non-zero entry in (i+1)-th row; if the i-th row is the last row in the matrix, the next entry in the $A_r$ array is the total number of entries in the $A_{vc}$ (or $A_v$) array. A summation calculator, a function for summing together results of multiplication of the values of the non-zero arrays described in step 138 below, is initialized by setting the value of the sum at zero (step 136). If j is less than $j_{max}$ (step 137), multiplication and addition computations are performed on the value of j, with the operation depending on whether the encoding on which SpMV is performed is PSCSR or PCSR (step 138). If the encoding is PSCSR, the computation is performed according to the equation:

$$\text{sum} \leftarrow \text{sum} + A_{vc}[j] \cdot v \times x[A_{vc}[j] \cdot c]$$

In the computation, the value stored in the element of the $A_{vc}$ array with the index j is multiplied by the element of x whose index is the index of the column stored in the $A_{vc}$ element with the j-th index and the result of multiplication is added to the sum of results of multiplication performed during previous iterations of the step 138. Alternatively, if the encoding is PCSR, the computation is performed according to the formula:

$$\text{sum} \leftarrow \text{sum} + A_v[j] \times x[A_c[j]],$$

where the value in the $A_v$ array with the index j is multiplied by the element of x whose index is the number in the $A_c$ array with the j-th index and the result of the result of multiplication is added to the sum of results of multiplication performed during previous iterations of the step 138. Upon the completion of the calculation based on either formula, 1 is added to the value of j and the result of the addition is set as j (step 139), moving the processing to the entry in the next column in that row. The routine 130 returns to step 137 described above, repeating steps 137-139 until of the non-zero values in the i-th row are processed. If j is not less than $j_{max}$ (step 137), the sum resulting from addition of results multiplication during the iterations in the loop 137-139 is stored in the dense vector y (step 140). The iterative processing loop moves to the next row (step 141), with the processing of the rows through the inner loop (steps 132-141) continuing until all of the rows of the partition have been processed through the steps 132-141. Once all of the rows of the k-th partition are processed, the routine 130 moves to the next partition (step 142), with the processing of the partitions through the outer processing loop (steps 131-142) continuing until all of the partitions have been processed. Once all of the partitions have been processed in steps 131-142, the routine 130 ends. The routine 130 can also be expressed using the following pseudocode, which covers performing SpMV on PSCSR encoding:

```
for k = 0 to A_p - 1                          /* loop over A_p row-based partitions */
    for r = A_o[k] to A_o[k+1] - 1            /* loop over rows in k-th partition */
        i ← A_m[r]                            /* i: id of r-th ranked row */
        j ← A_r[i]                            /* j: index in A_vc of first non-ze ro entry in i-th
row */
        j_max ← A_r[i+1]                      /* j_max: index in A_vc of first non-zero entry in
(i+1)-th row */
        sum ← 0                               /* initialize the summation accumulator */
        while (j < j_max)                     /* test if end of row has been reached */
            sum ← sum + A_vc[j].v × x[A_vc[j].c]   /* compute y_i = Σ_j A_{i,j} × x_j */
            j ← j + 1                         /* move on to next non-zero column in i-th row
*/
        end while
```

```
        y[i] ← sum              /* store result in y */
    end for
end for
```

The routine 130 can also be expressed using the pseudocode for performing SpMV on the PCSR encoding mutatis mutandis.

Figure 14:
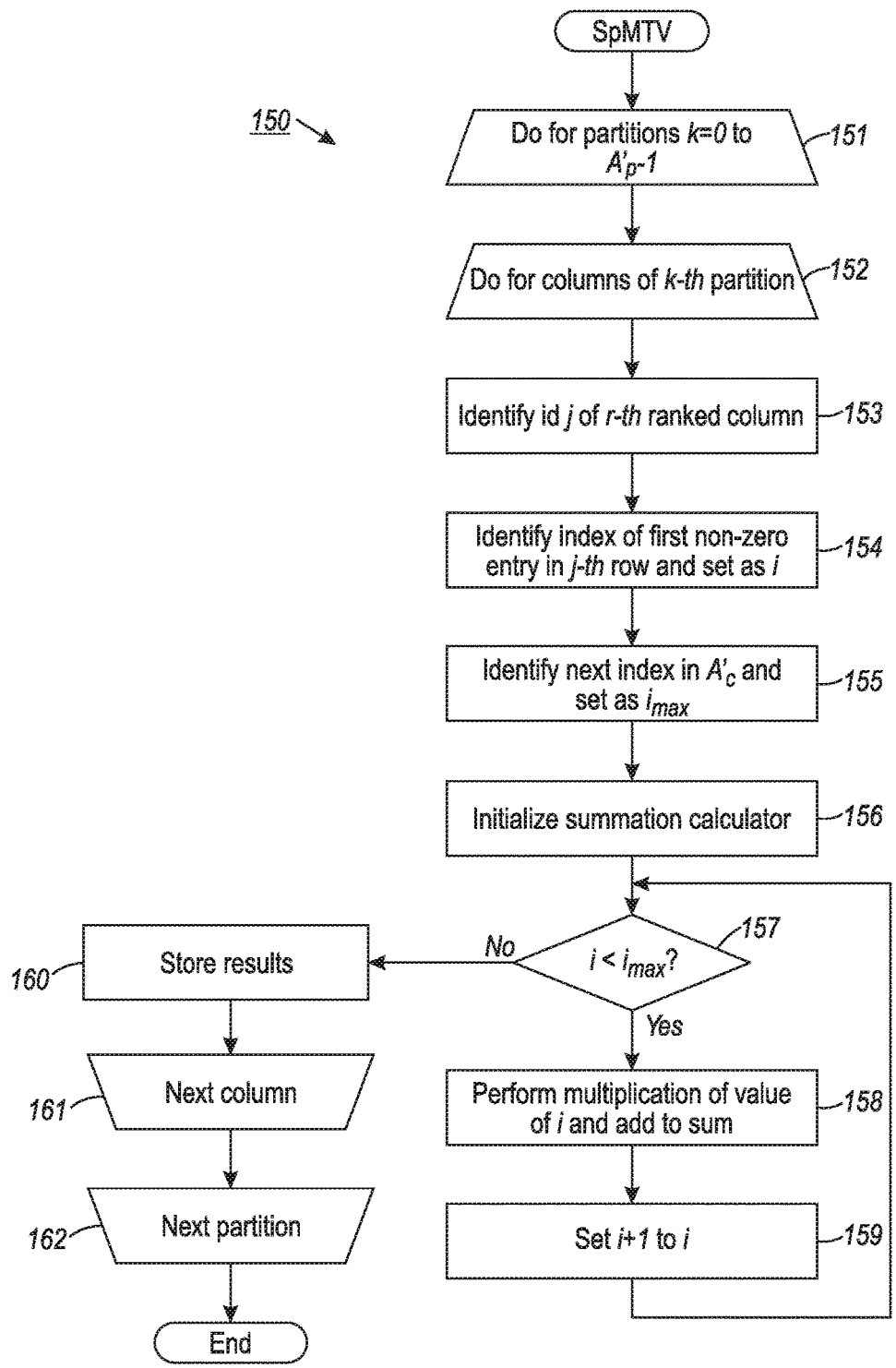
FIG. 14 is a flow diagram showing a routine for performing SpMTV on a matrix encoded in a partitioned compressed representation for use in the method of FIG. 9, in accordance with one embodiment.

SpMTV can be performed on partitioned compressed representations using servers that include both that include both CPUs and GPUs as well as those that include only CPUs. FIG. 14 is a flow diagram showing a routine 150 for performing SpMTV on a partitioned compressed representation of the matrix for use in the method 90 of FIG. 9. The routine can be applied to both PSCSC and PCSC representations. The routine 150 can be used servers that include both CPUs and GPUs as well as those that include only CPUs. An outer iterative processing loop (steps 151-162) of processing partitions with index k=0 to $A'_p-1$, all created partitions, is started (step 151). An inner iterative processing loop (steps 152-161) of processing all of the columns in the k-th partition is began, with ranks of the columns in the mapping array processed being r=$A'_o$[k] to $A'_o$[k+1]−1 (step 152). The id of the r-th ranked column is identified and set as j (step 153). An entry for the j-th column in the $A'_c$ array is located, identifying the index in the $A'_v$ or $A'_{vr}$ array, depending on whether the compressed representation was CSC or structured CSC, of the first non-zero entry for that column in the matrix; the identified index is set as a variable i (step 154). The next (j+1) entry in the $A'_c$ array is located and set as a variable $i_{max}$ (step 155). Unless the j-th column is the last column in the matrix, the next entry in the $A'_c$ array is the index in the $A'_{vr}$ (or $A'_v$) array of the first non-zero entry in (j+1)-th column; if the j-th column is the last column in the matrix, the next entry in the $A'_c$ array is the total number of entries in the $A'_{vr}$ (or $A'_v$) array. A summation calculator, a function for summing together results of multiplication of the values of the non-zero arrays described in step 158 below, is initialized by setting the value of the sum at zero (step 156). If i is less than $i_{max}$ (step 157), multiplication and addition computations are performed on the value of i, with the operation depending on whether the encoding on which SpMTV is performed is PSCSC or PCSC (step 158). If the encoding is PSCSC, the computation is performed according to the equation:

$$sum \leftarrow sum + A'_{vr}[i].v \times x'[A'_{vr}[i].r],$$

where the value stored in the element of the $A'_{vr}$ array with the index i is multiplied by the element of x' whose index is the index of the row stored in the $A'_{vr}$ element with the i-th index and the result of multiplication is added to the sum of results of multiplication performed during previous iterations of the step 158. Alternatively, if the encoding is PCSR, the computation is performed according to the formula:

$$sum \leftarrow sum + A'_v[i] \times x'[A'_r[i]],$$

where the value in the $A'_v$ array with the index i is multiplied by the element of x' whose index is the number in the $A'_r$ array with the i-th index and the result of multiplication is added to the sum of results of multiplication performed during previous iterations of the step 158. Upon the completion of the calculation based on either formula, 1 is added to the value of i and the result of the addition is set as i (step 159), moving the processing to the entry in the next row in that column. The routine 150 returns to step 157 described above, repeating steps 158-159 until of the non-zero values in the j-th column are processed. If i is not less than $i_{max}$ (step 157), the sum resulting from addition of results multiplication during the iterations in the loop 157-159 is stored in the dense vector y' (step 160). The iterative processing loop moves to the next column (step 161), the processing of the columns through the inner processing loop (steps 152-161) continuing until all of the columns have been processed through the steps 152-161. Once all of the columns of the k-th partition are processed, the routine 150 moves to the next partition (step 162), with the processing of the partitions through the outer processing loop (steps 151-162) continuing until all of the partitions have been processed. Once all of the partitions have been processed in steps 151-162, the routine 150 ends. The routine 150 can also be expressed using the following pseudocode, which covers performing SPTMV on the PSCSR encoding:

```
for k = 0 to A'_p − 1                           /* loop over A'_p column-based partitions */
    for r = A'_o[k] to A'_o[k+1] − 1            /* loop over columns in k-th partition */
        j ← A'_m[r]                              /* j: id of r-th ranked column */
        i ← A'_c[j]                              /* i: index in A'_vr of first non-zero entry in j-th column */
        i_max ← A'_c[j+1]                        /* i_max: index in A'_vr of first non-zero entry in (j+1)-th column */
        sum ← 0                                  /* initialize the summation accumulator */
        while (i < i_max)                        /* test if end of column has been reached */
            sum ← sum + A'_vr[i].v × x'[A'_vr[i].r]   /* compute y'_j = Σ_i A_ij × x'_i */
            i ← i + 1                            /* move on to next non-zero row in j-th column */
        end while
        y'[j] ← sum                              /* store result in y'*/
    end for
end for
```

Figure 15:
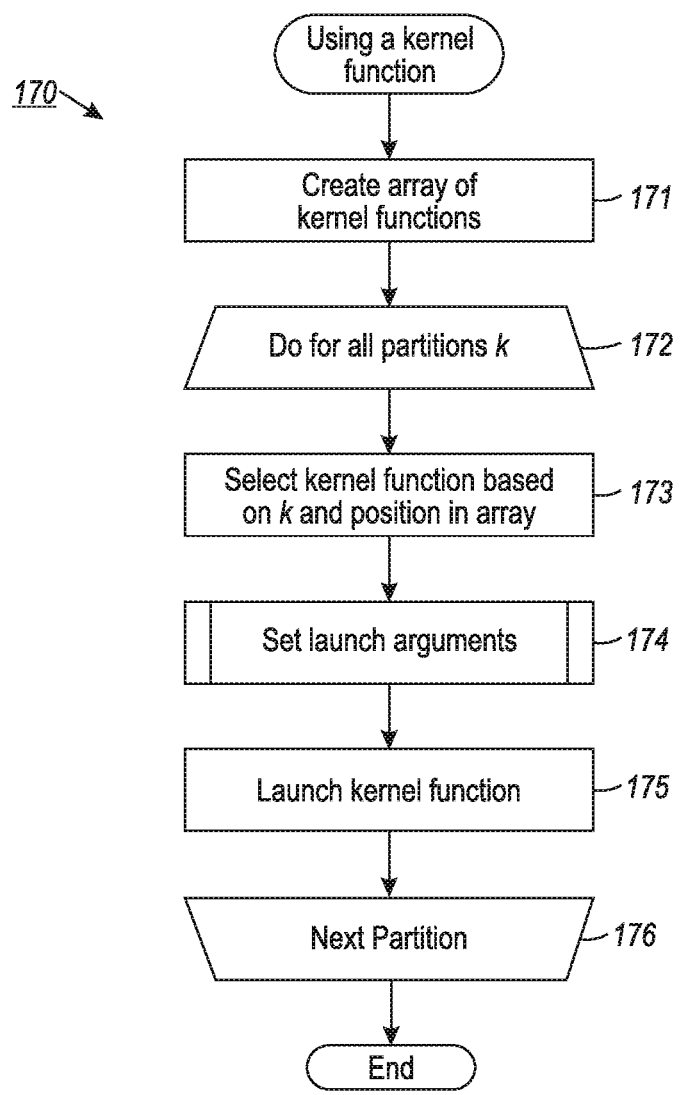
FIG. 15 is a routine for starting a kernel function for partitioned compressed representation processing for use in the method of FIG. 9, in accordance with one embodiment.

While the routines described above with reference to FIGS. 13 and 14 above were not specific to a particular hardware set-up for carrying them out, hardware that includes GPUs can become faster by assigning particular kernels to perform SpMV and SpMTV on particular partitions. FIG. 15 is a routine for starting a kernel function for performing partitioned compressed representation processing for use in the method 90 of FIG. 9, in accordance with one embodiment. An array of kernel functions F is created such that F=[$f_{1T1R}$, $f_{1W1R}$, $f_{1B1R}$], including a list of the kernels described above with reference to FIG. 3, with the kernels being indexed from 0 to 2, with the $f_{1T1R}$ having index 0 and $f_{1B1R}$ having index 2 (step 171). In a further embodiment, other kernels can be a part of the array. An iterative processing loop (steps 172-176) for partitions with index k=0 to $A_p$-1 (or $A'_p$-1 for column-based partitions), all created partitions, is started (step 172). One of the kernel functions is selected for the partition k based on the value of k and the index of the kernel in the F array (step 173). For example, if k=0, the kernel with the 0-th index, $f_{1T1R}$, is selected; if k=1, the kernel with the index of 1, $f_{1W1R}$, is selected; if k=2, the kernel with the index of 2, $f_{1B1R}$, is selected. If there are more than 3 partitions, the $f_{1B1R}$ can be selected for all of the partitions with the index k greater than 2. Other indexes for the partitions and the kernels can also be used and other ways to match the kernels and partitions are possible. Launch arguments are set for each of the selected kernels, as further described with reference to FIG. 16 (step 174). The selected functions are launched for each of the arguments and are used for processing of the partitioned compressed encoding, as further described below with reference to FIGS. 17-22B (step 175). The iterative processing loop moves to the next partition (step 176), with the processing of the partitions through the loop (steps 172-176) continuing until all of the partitions have been processed. Once all of the partitions have been processed, the routine 170 ends. The routine 170 can also be represented using the following pseudocode—while the pseudocode is written for row-based partitions, the pseudocode for column-based partitions can be written mutatis mutandis:

```
for k = 0 to A_p - 1                    /* loop over A_p row-based partitions */
    args ← kernel_launch_args(F[k], A_o[k+1] - A_o[k])   /* F[k]: k-th kernel function */
    F[k]⟨⟨⟨ args ⟩⟩⟩( y, x, A_vc, A_r, A_m, A_o[k], A_o[k+1])   /* launch k-th kernel for k-th partition */
end for
```

While the pseudocode is written with reference to PSCSR, the pseudocode for other partitioned compressed representation can be expressed mutatis mutandis. Ways to select a particular kernel function for processing a particular partition other than the one described above with reference to FIG. 15 are also possible.

Figure 16:
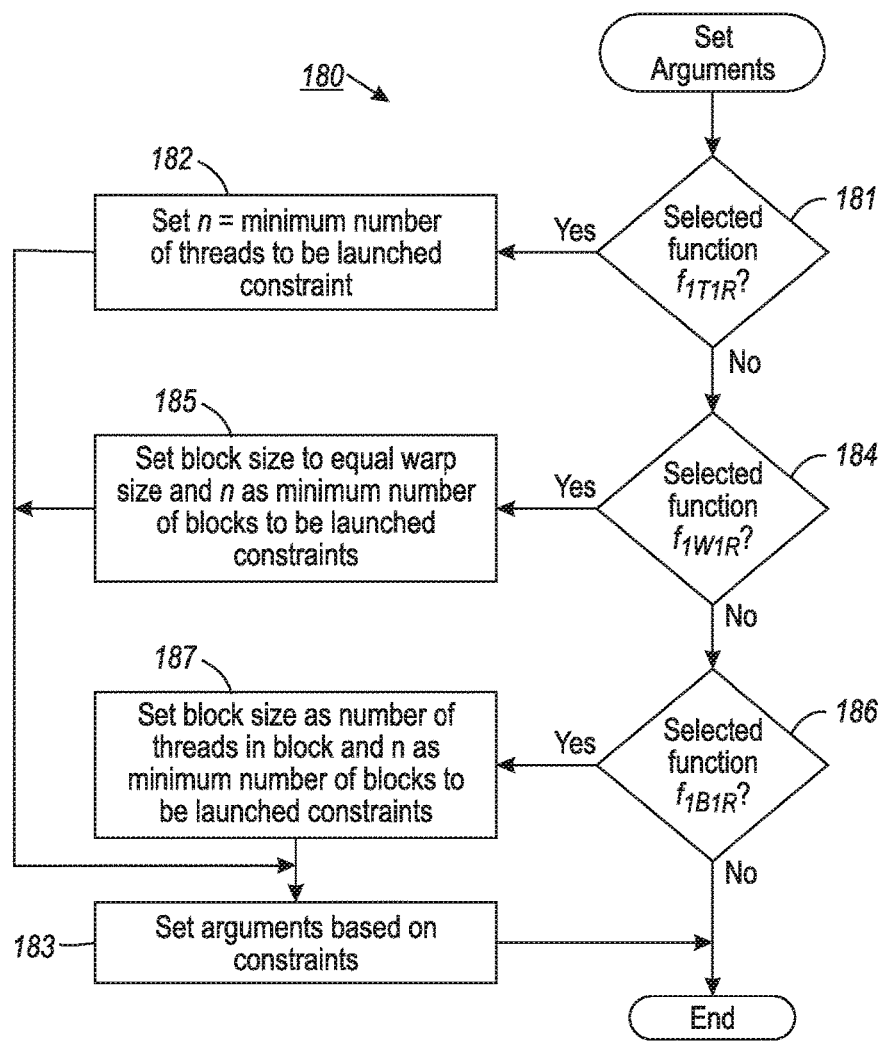
FIG. 16 is a routine for setting launch arguments for a selected kernel function for use in the routine of FIG. 15, in accordance with one embodiment.

The launch arguments set after the kernel is selected provide constraints that are entered into a runtime of the system, such as the server 33, that perform the partitioned compressed representation processing. To launch a kernel on the GPU, one must specify the launch arguments such as the dimensions of a thread block and possibly the dimensions of a grid of such thread blocks. Different GPUs from the same vendor may impose different constraints on the maximum size of a block or a grid along each dimension, and different GPU vendors may support different number of thread-block and/or grid dimensions. FIG. 16 is a routine 180 for setting launch arguments for a selected kernel function for use in the routine 170 of FIG. 15, in accordance with one embodiment. Let n be the number of portions of the matrix, rows or columns, assigned to the selected matrix. If the selected kernel function is $f_{1T1R}$ (step 181), a constraint is set that n is the minimum number of threads to be launched. The rest of the arguments are set and returned based on the constraint (step 183), ending the routine 180. If the selected function is not $f_{1T1R}$ (step 181), whether the selected function is $f_{1B1R}$ is determined (step 184). If the selected function is $f_{1W1R}$ (step 184), constraints are set that block size is set to equal warp size and n is set as the minimum number of blocks to be launched (185). The routine 180 moves to step 183 described below. If the selected function is not $f_{1W1R}$ (step 181), whether the selected function is $f_{1B1R}$ is determined (step 186). If the selected function is $f_{1B1R}$ (step 187), block size is set as a number of threads in the block and n is set as a minimum number of blocks to be launched. The routine 180 moves to step 183 described below. If the selected function is not $f_{1B1R}$ (step 186), the kernel function is unknown and the routine 180 ends. The routine 180 can also be expressed using the following pseudocode—while the pseudocode describes launching kernels for performing SpMV, the pseudocode for launching kernels for performing SpMTV can be written mutatis mutandis:

```
function kernel_launch_args(f, n)                    /* f: SpMV kernel; n: number of rows assigned to f*/
    if (f = f_1T1R) then                             /* f_1T1R: one-thread-one-row kernel */
        args.set_min_threads(n)                      /* n = minimum # of threads to be launched */
    else if (f = f_1W1R) then                        /* f_1W1R: one-warp-one-row kernel */
        args.set_block_size(WARPSIZE)                /* set BLOCKSIZE = WARPSIZE */
        args.set_min_blocks(n)                       /* n = minimum # of blocks to be launched */
    else if (f = f_1B1R) then                        /* f_1B1R: one-block-one-row kernel */
        args.set_block_size(BLOCKSIZE)               /* BLOCKSIZE: # of threads in a block */
        args.set_min_blocks(n)                       /* n = minimum # of blocks to be launched */
    else
        error "Abort: Unknown kernel function."
    end if
    args.compute_satisfy_args( )                     /* set rest of args based on constraints above */
    return args
```

Instead of using fixed thread-block and grid dimensions, the pseudocode above approaches the launch argument setting problem as constraint satisfaction by making explicit the constraints imposed by each of the three SpMV kernels. For example, the $f_{1T1R}$ kernel only requires the satisfaction of a single constraint that the total number of threads must at least equal the number of rows assigned to the kernel; whereas the $f_{1W1R}$ kernel demands the simultaneous satisfaction of two constraints: (1) the number of threads in the block must be the same as WARPSIZE, and (2) there must be at least as many thread blocks as there are rows assigned to the kernel. How to satisfy those kernel launch constraints, while respecting the constraints imposed by the hardware, can be GPU or vendor-dependent, and no specific description is provided. Typically, the best launch arguments assume values that are integer powers of 2, and thus the search space of such a constraint satisfaction problem is usually quite small and manageable. For example, the implementation on Nvidia's® Fermi GPUs uses a thread block size of 8×8 for the $f_{1T1R}$ kernel, a block size of 32×1 for the $f_{1W1R}$ kernel, and a block size of 512×1 for the $f_{1B1R}$ kernel.

Once selected, the kernel functions can process the assigned portions of the matrix. Recall the purpose of matrix partitioning is to create one partition for a single GPU kernel function such that rows in the same partition share some common characteristics, such as the number of non-zero entries, for which the kernel is optimized. While the GPU-based SpMV algorithm described above can handle an arbitrary number of partitions and kernels, experiments show that having three different kernels ($f_{1T1R}$, $f_{1W1R}$, and $f_{1B1R}$) produces the best SpMV results on Nvidia's® Fermi-class GPUs including GTX 480 and 580.

Let WARPSIZE (also referred to as "warp size" in this application) and BLOCKSIZE (also referred to as "block size" in this application) be the number of threads in a warp and in a thread block, respectively. To facilitate the distribution of matrix rows (or columns) to GPU cores, the following helper functions can be used in the routines described below with reference to FIGS. 17-22B:

- thread_id( ) returns a globally unique thread id for the current thread
- warp_id( ) returns a globally unique warp id for the current thread
- warp_thread_id( ) returns a local thread id (unique only within a warp) for the current thread
- block_thread_id( ) returns a local thread id (unique only within a block) for the current thread
- sync_warp_threads( ) synchronizes across all threads in a warp
- sync_block_threads( ) synchronizes across all threads in a block All global (or local) thread (or warp) ids are zero-based, with the index of the threads starting at zero. WARPSIZE is hardware-dependent: either 32 for Nvidia® or 64 for Advanced Micro Devices® GPUs; whereas BLOCKSIZE can be a programmable parameter that is typically an integer multiple of WARPSIZE. The shared keyword declares thread variables that are shared across all threads in the same block (or warp, if BLOCKSIZE=WARPSIZE).

Figure 17:
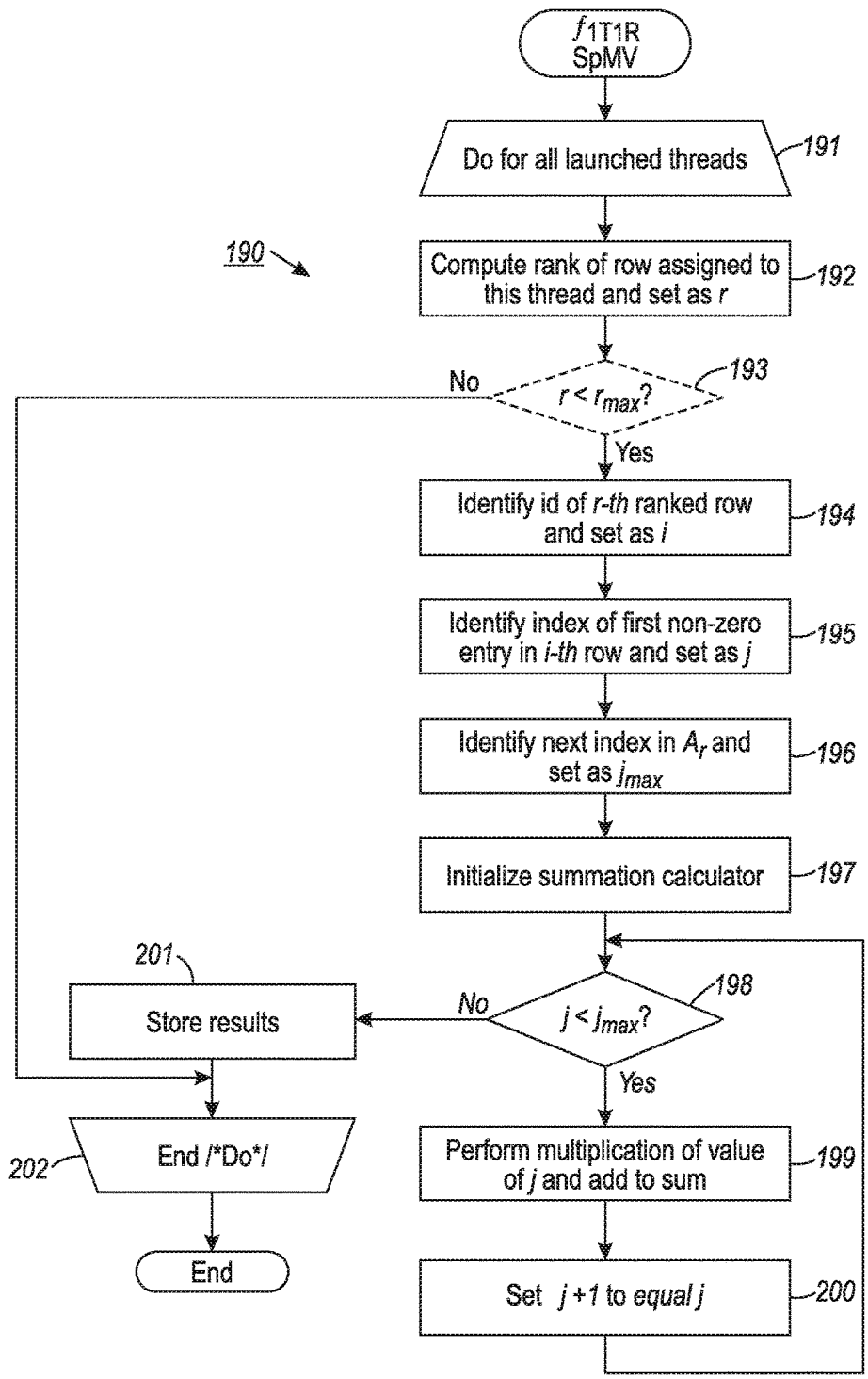
FIG. 17 is a flow diagram showing a routine for performing SpMV by an $f_{1T1R}$ kernel function for use in the routine of FIG. 15, in accordance with one embodiment.

FIG. 17 is a flow diagram showing a routine 190 for performing SpMV by an $f_{1T1R}$ kernel function for use in the routine of FIG. 15, in accordance with one embodiment. The routine 190 can be used for performing SpMV on either PSCSR or PCSR encodings. An iterative processing loop is started for all launched threads in the kernel, with the threads working in parallel, with the threads working in parallel; thus, while the steps below are described with reference to one thread, any other launch threads undergo the steps in parallel (step 191). The unique id of the thread is obtained by using the thread_id( ) function and is added to the value of variable $r_{min}$, which equals to the rank of the first row of partition k (partition to which the thread is assigned) stored in $A_o[k]$; the result of the addition is denoted by the variable r, which identifies the rank of the row assigned to that thread (192). The value of r can be compared to $r_{max}$, a variable that equals the rank of the first row of the next partition, partition k+1, given by $A_o[k+1]$; the comparison is optional when the number of threads launched equals the number of rows in the partition k ($r_{max}-r_{min}$) (193). If r is less than $r_{max}$ (step 193), the id i of the r-th ranked row is identified in the mapping array $A_m$ (step 194). If r is not less than $r_{max}$, the routine 190 moves to step 202 described below. An entry for the i-th row in the $A_r$ array is located, identifying the index in the $A_v$ or $A_{vc}$ array, depending on whether the initial compressed representation was CSR or structured CSR, of the first non-zero entry for that row in the matrix; the identified index is set as a variable j (step 195). The next (i+1) entry in the $A_r$ array is located and set as a variable $j_{max}$ (step 196). Unless the i-th row is the last row in the matrix, the next entry in the $A_r$ array is the index in the $A_{vc}$ (or $A_v$) array of the first non-zero entry in (i+1)-th row; if the i-th row is the last row in the matrix, the next entry in the $A_r$ array is the total number of entries in the $A_{vc}$ (or $A_v$) array. A summation calculator, a function for summing together results of multiplication of the values of the non-zero arrays described in step 199 below, is initialized by setting the value of the sum at zero (step 197). If j is less than $j_{max}$ (step 198), multiplication and addition computations are performed on the value of j, with the operation depending on whether the encoding on which SpMV is performed is PSCSR or PCSR (step 199). If the encoding is PSCSR, the computation is performed according to the equation:

$$\text{sum} \leftarrow \text{sum} + A_{vc}[j] \cdot v \times x[A_{vc}[j] \cdot c]$$

In the computation, the value stored in the element of the $A_{vc}$ array with the index j is multiplied by the element of x whose index is the index of the column stored in the $A_{vc}$ element with the j-th index and the result of multiplication is added to the sum of results of multiplication performed during previous iterations of the step 199. Alternatively, if the encoding is PCSR, the computation is performed according to the formula:

$$\text{sum} \leftarrow \text{sum} + A_v[j] \times x[A_c[j]],$$

where the value in the $A_v$ array with the index j is multiplied by the element of x whose index is the number in the $A_c$ array with the j-th index and the result of the result of multiplication is added to the sum of results of multiplication performed during previous iterations of the step 199. Upon the completion of the calculation based on either formula, 1 is added to the value of j and the result of the addition is set as j (step 200), moving the processing to the entry in the next column in that row. The routine 190 returns to step 198 described above, repeating steps 199-201 until of the non-zero values in the i-th row are processed. If j is not less than $j_{max}$ (step 198), the sum resulting from addition of results multiplication during the iterations in the loop 198-200 is stored in the dense vector y (step 201). The execution of the processing thread is stopped (step 202); the routine 190 ends upon the stop of processing of all launched threads. The routine 190 can also be expressed using the following pseudocode—while the pseudocode is written in relation to PSCSR encoding, a pseudocode for PCSR encoding can be written mutatis mutandis:

```
         kernel f_{1T1R}(y, x, A_{vc}, A_r, A_m, r_{min}, r_{max})  /* 1T1R: one-thread-one-row SpMV
kernel */
              r ← r_{min} + thread_id( )      /* compute rank of the vertex assigned to this
     thread */
              if (r < r_{max}) then           /* optional if exactly (r_{max} − r_{min}) threads were
     created */
                    i ← A_m[r]                /* i: id of r-th ranked row */
                    j ← A_r[i]                /* j: index in A_{vc} of first non-zero entry in i-th
row* /
                    j_{max} ← A_r[i+1]        /* j_{max} index in A_{vc} of first non-zero entry in
(i+1)-th row */
                    sum ← 0                   /* initialize the summation accumulator */
                    while (j < j_{max})       /* test if end of row has been reached */
                         sum ← sum + A_{vc}[j].v × x[A_{vc}[j].c]   /* compute y_i = Σ_j A_{i,j} × x_j */
                         j ← j + 1            /* move on to next non-zero column in i-th row
     */
                    end while
                    y[i] ← sum                /* store result y */
              end if
```

Figure 18:
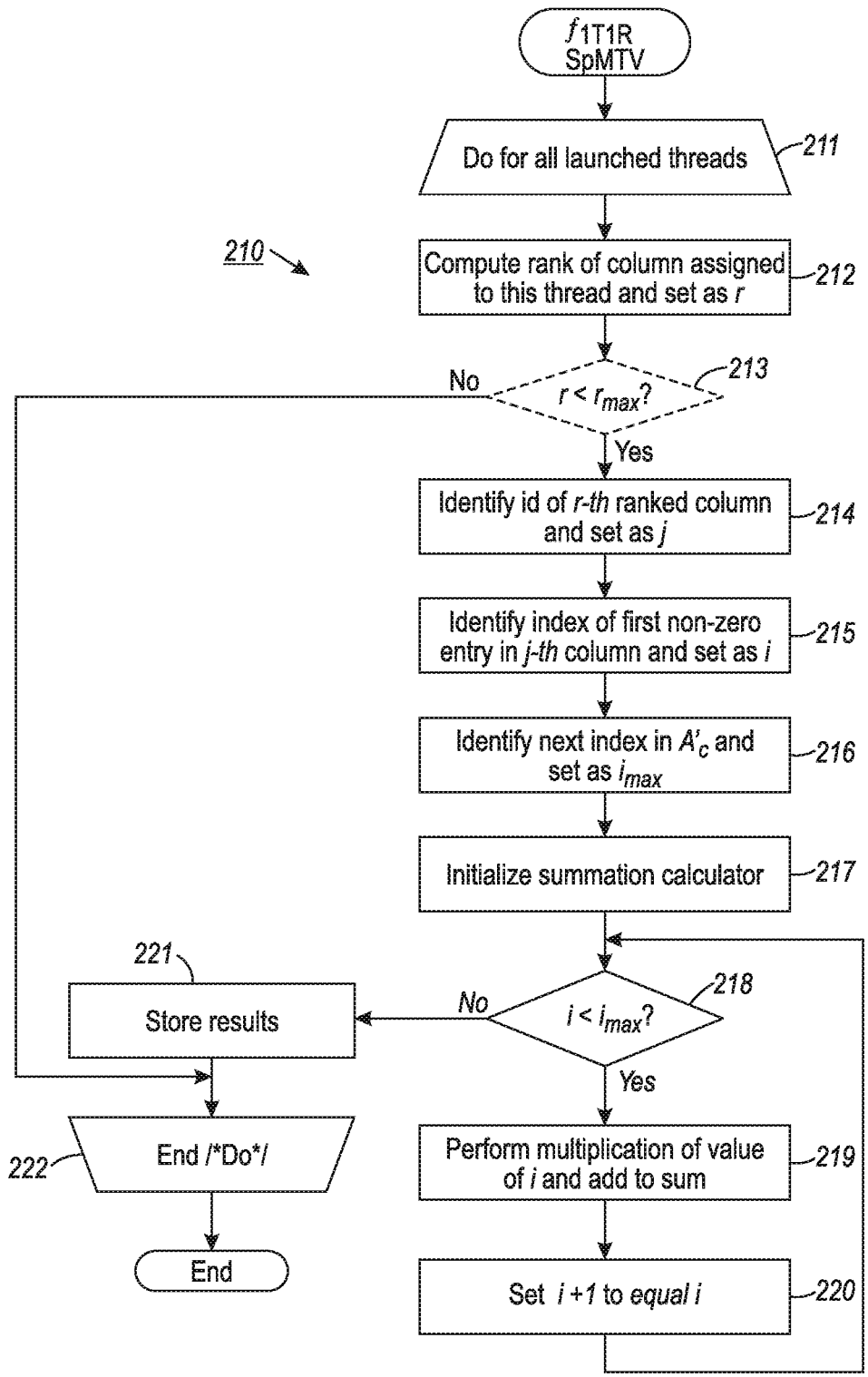
FIG. 18 is a flow diagram showing a routine for performing SpMTV by an $f_{1T1R}$ kernel function for use in the routine of FIG. 15, in accordance with one embodiment.

FIG. 18 is a flow diagram showing a routine 210 for performing SpMTV by an $f_{1T1R}$ kernel function for use in the routine 170 of FIG. 15, in accordance with one embodiment. The routine 210 can be used for performing SpMTV on either PSSCR or PCSR encodings, with all launched threads working in parallel as described above with reference to FIG. 17. An iterative processing loop is started for all launched threads in the kernel, with the threads working in parallel (step 211). The unique id of the thread is obtained by using the thread_id( ) function and is added to the value of variable $r_{min}$, which equals to the rank of the first column of partition k (partition to which the thread is assigned) stored in A'_o[k]; the result of the addition is denoted by the variable r. The value of r can be compared to $r_{max}$, a variable that equals the rank of the first column of the next partition, partition k+1, given by A'_o[k+1]; the comparison is optional when the number of threads launched equals the number of columns in the partition k ($r_{max}-r_{min}$). If r is less than $r_{max}$ (step 213), the id j of the r-th ranked column is identified in the mapping array A'_m (step 214). If r is not less than $r_{max}$, the routine 210 moves to step 222 described below. An entry for the j-th column in the A'_c array is located, identifying the index in the A'_v or A'_{vr} array, depending on whether the compressed representation was CSC or structured CSC, of the first non-zero entry for that column in the matrix; the identified index is denoted as a variable i (step 215). The next (j+1) entry in the A'_c array is located and set as a variable $i_{max}$ (step 216). Unless the j-th column is the last column in the matrix, the next entry in the A'_c array is the index in the A'_{vr} (or A'_v) array of the first non-zero entry in (j+1)-th column; if the j-th column is the last column in the matrix, the next entry in the A'_c array is the total number of entries in the A'_{vr} (or A'_v) array. A summation calculator, a function for summing together results of multiplication of the values of the non-zero arrays described in step 219 below, is initialized by setting the value of the sum at zero (step 217). If i is less than $i_{max}$ (step 218), multiplication and addition computations are performed on the value of i, with the operation depending on whether the encoding on which SpMTV is performed is PSCSC or PCSC (step 219). If the encoding is PSCSC, the computation is performed according to the equation:

$$sum \leftarrow sum + A'_{vr}[i] \cdot v \times x'[A'_{vr}[i] \cdot r],$$

where the value stored in the element of the A array with the index i is multiplied by the element of x' whose index is the index of the row stored in the A'_{vr} element with the i-th index and the result of multiplication is added to the sum of results of multiplication performed during previous iterations of the step 219. Alternatively, if the encoding is PCSR, the computation is performed according to the formula:

$$sum \leftarrow sum = A'_v[i] \times x'[A'_r[i]],$$

where the value in the A'_v array with the index i is multiplied by the element of x' whose index is the number in the A'_r array with the i-th index and the result of multiplication is added to the sum of results of multiplication performed during previous iterations of the step 219. Upon the completion of the calculation based on either formula, 1 is added to the value of i and the result of the addition is set as i (step 220), moving the processing to the entry in the next row in that column. The routine 210 returns to step 218 described above, repeating steps 218-220 until all of the non-zero values in the j-th column are processed. Once i is not less than $i_{max}$ (step 218), the sum resulting from addition of results multiplication during the iterations in the loop 218-220 is stored in the dense vector y' (step 221). The execution of the thread is stopped (step 222). The routine 210 ends once the execution of all of the launched processing threads is stopped. The pseudocode for the routine 210 can be written similarly to the pseudocode shown above with reference to FIG. 17 mutatis mutandis.

Figure 19A:
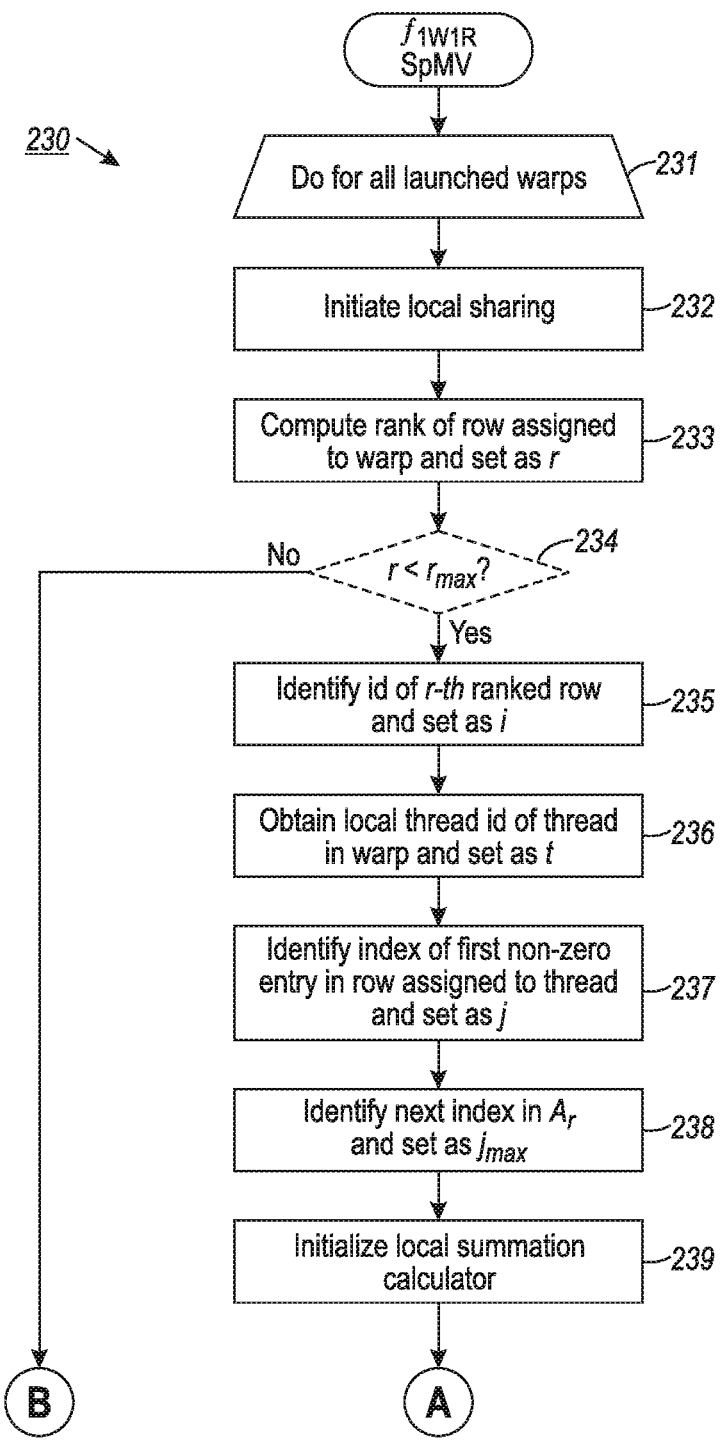
FIGS. 19A-19B are flow diagrams showing a routine for performing SpMV by an $f_{1W1R}$ kernel function for use in the routine of FIG. 15, in accordance with one embodiment.
Figure 19B:
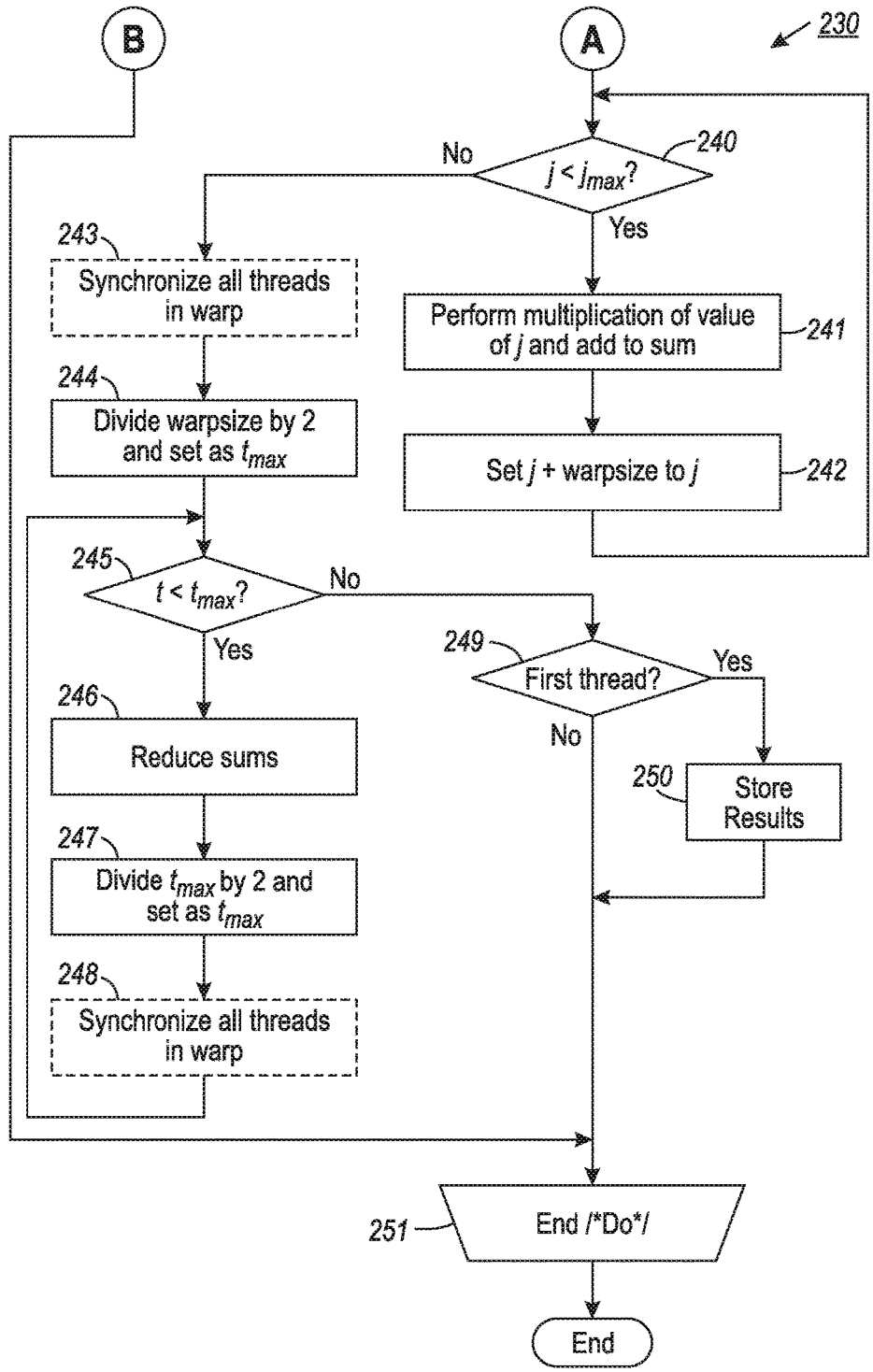

Portions of the matrix with a larger number of non-zero entries may benefit from being processed by an $f_{1W1R}$ kernel, which assigns a warp of threads to process each of the portions, such as each row. FIGS. 19A-19B are a flow diagrams showing a routine 230 for performing SpMV by an $f_{1W1R}$ kernel function for use in the routine 170 of FIG. 15, in accordance with one embodiment. The routine 230 can be used for performing SpMV on either PSSCR or PCSR encodings. An iterative processing loop is started for all launched warps in the kernel (step 231). The launched warps and the threads in the launched warps execute in parallel with each other. Thus, when the description below references one of the warps or one of the threads, all other launched warps or threads execute the same steps of the routine 230 in parallel with the referenced warp or thread until the execution of one of the threads or warps is stopped (such as in step 251 below).

Local sharing is initiated between all threads in the same warp, allowing the threads to share results of computation described below in steps 240-242 (step 232). Rank of a row assigned to one of the warps is obtained by using the function warp_id( ) to obtain the unique global id of one of the warps, and adding to the unique global id to the value of $r_{min}$, rank of first row of partition to which the rank is assigned as described above with reference to FIG. 17; the result of the addition is the rank of the row assigned to the warp and is denoted using the variable r (step 233). The value of r can be compared to $r_{max}$, a variable that equals the rank of the first row of the next partition, partition k+1, given by $A_o$[k+1]; the comparison is optional when the number of warps launched equals the number of rows in the partition k ($r_{max}-r_{min}$). If r is less than $r_{max}$ (step 234), the id i of the r-th ranked row is identified in the mapping array $A_m$ (step 235). If r is not less than $r_{max}$ (step 234), the routine 230 moves to step 251 described below. A local id (id within the warp) of one of the threads in the warp is obtained, such as by using the function warp_thread_id( ), and is denoted using the variable t (step 236). An index of first non-zero entry assigned to that thread is obtained by adding the value of an entry for the i-th row in the $A_r$ array to t; the result of the addition is denoted using the variable j (step 237). The next (i+1) entry in the $A_r$ array is located and set as a variable $j_{max}$ (step 238). A local summation calculator, a function for summing together results of multiplication of the values of the non-zero arrays described in step 241 below, is initialized by setting the value of the sum at zero (step 239). If j is less than $j_{max}$ (step 240), multiplication and addition computations are performed on the value of j, with the operation depending on whether the encoding on which SpMV is performed is PSCSR or PCSR (step 241). If the encoding is PSCSR, the computation is performed according to the equation:

sum←sum+$A_{vc}$[j]·v×x[$A_{vc}$[j]·c]

In the computation, the value stored in the element of the $A_{vc}$ array with the index j is multiplied by the element of x whose index is the index of the column stored in the $A_{vc}$ element with the j-th index and the result of multiplication is added to the sum of results of multiplication performed during previous iterations of the step 241. Alternatively, if the encoding is PCSR, the computation is performed according to the formula:

sum←sum+$A_v$[j]×x[$A_c$[j]], where the value in the $A_v$ array with the index j is multiplied by the element of x whose index is the number in the $A_c$ array with the j-th index and the result of the result of multiplication is added to the sum of results of multiplication performed during previous iterations of the step 241. Upon the completion of the calculation based on either formula, the warp size is added to the value of j and the result of the addition is set as j (step 242), moving the processing to the next entry in that row assigned to that thread. The routine 230 returns to step 240 described above, repeating steps 240-242 until of the non-zero values in the i-th row that are assigned to that thread are processed. Once j is not less than $j_{max}$ (step 240), all threads in the warp are optionally synchronized, allowing all threads in the warp to finish performing the loops of steps 240-242; while synchronization is not necessary in one embodiment due to the threads in the warp working in parallel and not getting out of synchronization, in a further embodiment, the synchronization is performed.

The size of the warp, the number of threads in the warp, is divided by 2 using integer division and the result of the division is denoted using the variable $t_{max}$ (step 244). If t, the id of the thread in the warp, is less than $t_{max}$ (step 245), the thread performs reduction, combining together, of sums resulting from computations in steps 240-242 above performed by that thread t and another thread whose thread id is t+$t_{max}$ (step 246). The step 246 reduces the number of sums in half; the combined sum is set as the sum for the thread t (the thread that performed the combining) and the sum previously associated with the thread whose thread id in the warp is t+$t_{max}$ is discarded (step 246). For example, if there are 32 threads in a warp and t for a thread is 0, the thread t would combine the sum obtained from the thread t's own performance of steps 240-242 and the sum obtained from the performance of steps 240-242 by the thread whose thread id is 16, with the combined sum being set as the sum of thread t for subsequent iterations of step 246 and thread with the id of 16 being no longer associated with a sum. Following the combining, the value of $t_{max}$ is cut in half using integer division and set as $t_{max}$ (step 247). Optionally, the threads that performed the combining of the sums are again synchronized (step 248), and the routine 230 returns to step 245 above. During each subsequent iteration of the loop of steps 245-247, the number of threads participating in the loop is reduced in half due to the reduction of the value of $t_{max}$.

If t is not less than $t_{max}$ (step 245), whether the thread is the first thread in the warp (t=0 and r<$r_{max}$) is determined (step 249). If the thread is not the first thread, the thread's execution ends (step 251). If the thread is the first thread, the grand total sum resulting from the reductions described in step 245-247 is stored in the dense vector y (step 250), and the execution of that thread ends (step 251). The routine 230 ends upon the end of execution of all threads for all launched warps. The routine 230 can also be expressed using the following pseudocode—while the pseudocode is written in relation to the PSCSR encoding, the pseudocode in relation to PCSR can be written mutatis mutandis:

```
kernel f_1W1R(y, x, A_vc, A_r, A_m, r_min, r_max)   /* 1W1R: one-warp-one-row SpMV kernel */
    shared sum[WARPSIZE]              /* sum: local sums shared by threads in a warp */
    r ← r_min + warp_id( )            /* compute rank of the vertex assigned to this warp */
    if (r < r_max) then               /* optional if exactly (r_max - r_min) warps were created */
        i ← A_m[r]                    /* i: id of r-th ranked row */
        t ← warp_thread_id( )         /* t: local thread id in a warp */
        j ← A_r[i] + t                /* j: index of first non-zero entry assigned to this thread */
        j_max ← A_r[i+1]              /* j_max: index of first non-zero entry in (i+1)-th row */
        sum[t] ← 0                    /* initialize local summation accumulator */
        while (j < j_max)             /* test if end of row has been reached */
            sum[t] ← sum[t] + A_vc[j].v × x[A_vc[j].c]   /* compute y_i = Σ_j A_i,j × x_j */
            j ← j + WARPSIZE          /* move to next non-zero entry for this thread */
```

```
                  end while
            end if
            sync_warp_threads( )         /* optional if threads in a warp are always
synchronized */
            t_max ← WARPSIZE / 2         /* t_max: number of threads adding up local sums
    */
            while (t < t_max)            /* test if this thread should participate */
                sum[t] ← sum[t] + sum[t+ t_max]   /* reduce two local sums into one */
                t_max ← t_max / 2        /* cut number of sum-adding threads in half */
                sync_warp_threads( )     /* optional if threads in a warp are always
synchronized */
            end while
            if (t = 0 and r < r_max) then   /* is this the first thread in the warp? */
                y[i] ← sum[0]            /* store grand total sum in y */
            end if
```

Figure 20A:
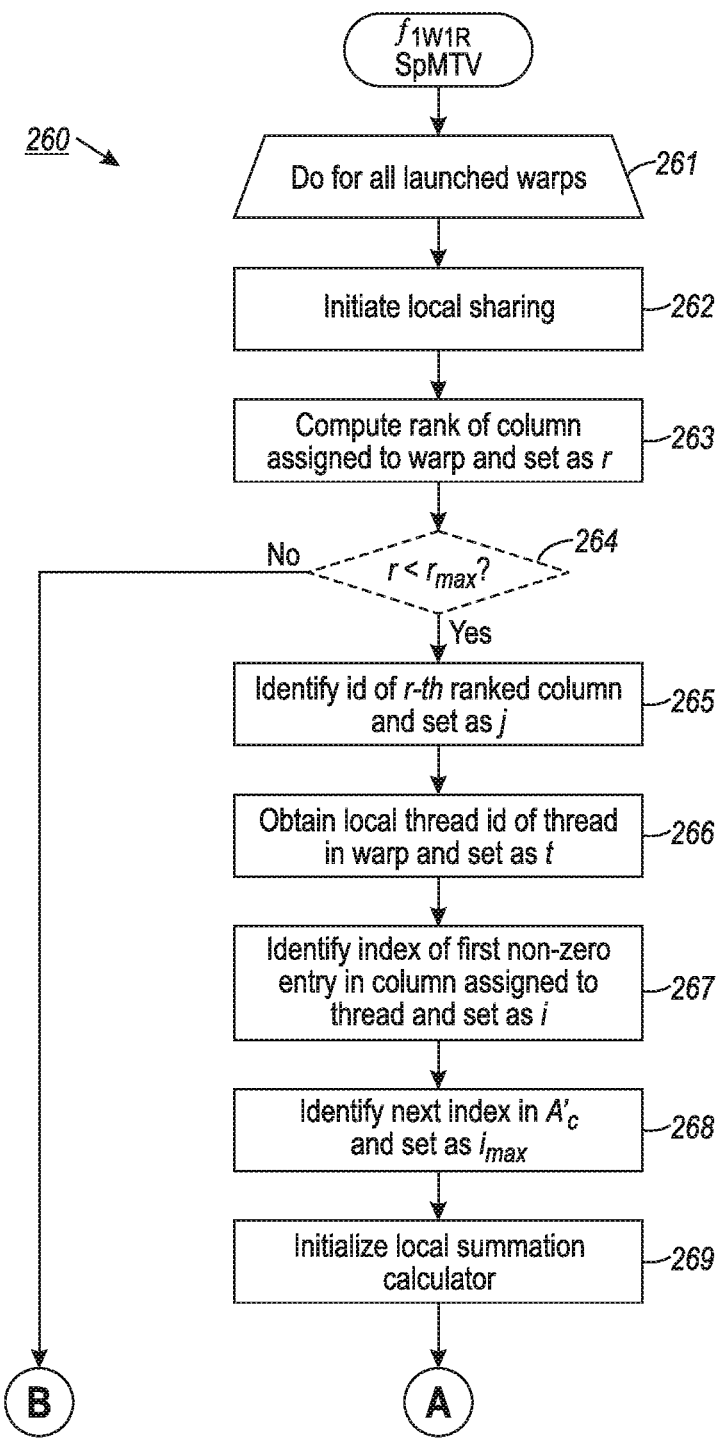
FIGS. 20A-20B are flow diagrams showing a routine for performing SpMTV by an $f_{1W1R}$ kernel for use in the routine of FIG. 15, in accordance with one embodiment.
Figure 20B:
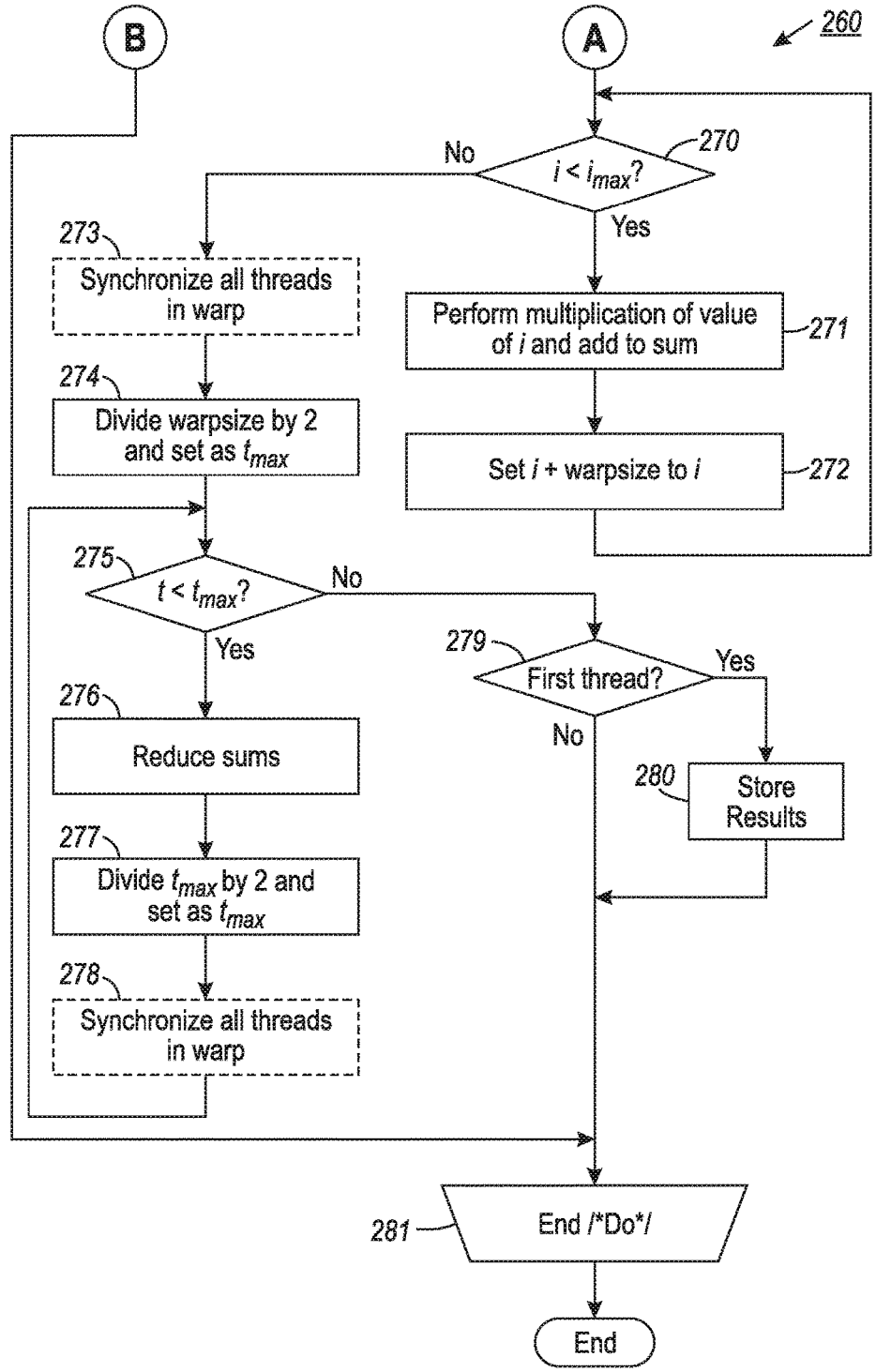

SpMTV can be similarly performed using an $f_{1W1R}$ kernel, which assigns a warp of threads to process the block. FIGS. 20A-20B are flow diagrams showing a routine 260 for performing SpMTV by an $f_{1W1R}$ kernel for use in the routine 170 of FIG. 15 in accordance with one embodiment. The routine 260 can be used for performing SpMV on either PSCCR or PCSR encodings. An iterative processing loop is started for all launched warps in the kernel (step 261). The launched warps and the threads in the launched warps execute in parallel with each other, and thus when the description below references one of the warps or one of the threads, all other launched warps or threads execute the steps of the routine 260 in parallel at the same time until the execution of one of the threads or warps is stopped (such as in step 281 below).

Local sharing is initiated between all threads in the same warp, allowing the threads to share results of computation described below in steps 270-272 (step 262). Rank of a column assigned to one of the warps is obtained by using the function warp_id( ) to obtain the unique global id of one of the warps, and adding to the unique global id to the value of $r_{min}$, rank of first column of partition to which the rank is assigned as described above with reference to FIG. 18; the result of the addition is the rank of the column assigned to the warp and is denoted using the variable r (step 263). The value of r can be compared to $r_{max}$, a variable that equals the rank of the first column of the next partition, partition k+1, given by $A'_o[k+1]$; the comparison is optional when the number of warps launched equals the number of columns in the partition k ($r_{max}-r_{min}$). If r is less than $r_{max}$ (step 264), the id j of the r-th ranked column is identified in the mapping array $A'_m$ (step 265). If r is not less than $r_{max}$ (step 264), the routine 260 moves to step 281 described below. A local id (id within the warp) of one of the threads in the warp is obtained, such as by using the function warp_thread_id( ), and is denoted using the variable t (step 266). An index of first non-zero entry assigned to that thread is obtained by adding the value of an entry for the j-th column in the $A'_c$ array to t; the result of the addition is denoted using the variable i (step 267). The next (j+1) entry in the $A'_c$ array is located and set as a variable $i_{max}$ (step 268). Unless the j-th column is the last column in the matrix, the next entry in the $A'_c$ array is the index in the $A'_{vr}$ (or $A'_v$) array of the first non-zero entry in (j+1)-th column; if the j-th column is the last column in the matrix, the next entry in the $A'_c$ array is the total number of entries in the $A'_{vr}$ (or $A'_v$) array. A local summation calculator, a function for summing together results of multiplication of the values of the non-zero arrays described in step below, is initialized by setting the value of the sum at zero (step 269). If i is less than $i_{max}$ (step 270), multiplication and addition computations are performed on the value of i, with the operation depending on whether the encoding on which SpMTV is performed is PSCSC or PCSC (step 271). If the encoding is PSCSC, the computation is performed according to the equation:

$$sum \leftarrow sum + A'_{vr}[i] \cdot v \times x'[A'_{vr}[i] \cdot r],$$

where the value stored in the element of the $A'_{vr}$ array with the index i is multiplied by the element of x' whose index is the index of the row stored in the $A'_{vr}$ element with the i-th index and the result of multiplication is added to the sum of results of multiplication performed during previous iterations of the step 271. Alternatively, if the encoding is PCSC, the computation is performed according to the formula:

$$sum \leftarrow sum + A'_v[i] \times x'[A'_r[i]],$$

where the value in the $A'_v$ array with the index i is multiplied by the element of x' whose index is the number in the $A'_r$ array with the i-th index and the result of multiplication is added to the sum of results of multiplication performed during previous iterations of the step 271. Upon the completion of the calculation based on either formula, the warp size is added to the value of i and the result of the addition is set as i (step 272), moving the processing to the next entry in the that column assigned to that thread. The routine 260 returns to step 270 described above, repeating steps 270-272 until all of the non-zero values in the j-th column are processed. Once i is not less than $i_{max}$ (step 270), all threads in the warp are optionally synchronized, allowing all threads in the warp to finish performing the loops of steps 270-272; while synchronization is not necessary in one embodiment due to the threads in the warp working in parallel and not getting out of synchronization, in a further embodiment, the synchronization is performed.

The size of the warp, the number of threads in the warp, is divided by 2 using integer division and the result of the division is denoted using the variable $t_{max}$ (step 274). If t, the id of the thread in the warp, is less than $t_{max}$, the thread performs reduction, combining together, of sums resulting from computations in steps 270-272 above performed by that thread t and another thread whose thread id is $t+t_{max}$ (step 276). The step 276 reduces the number of sums in half; the combined sum is set as the sum for the thread t (the thread that performed the combining) and the sum previously associated with the thread whose thread id in the warp is $t+t_{max}$ is discarded, similarly to the step 246 described above (step 276). Following the combining, the value of $t_{max}$ is cut in half using integer division and set as $t_{max}$ (step 277). Optionally, the threads that performed the combining of the sums are again synchronized (step 278), and the routine 260 returns to step 275 above. During each subsequent iteration of the loop of steps 275-277, the number of threads participating in the loop is reduced in half due to the reduction of the value of $t_{max}$.

If t is not less than $t_{max}$, whether the thread is the first thread in the warp (t=0 and r<$r_{max}$) is determined (step 279). If the thread is not the first thread, the thread's execution ends (step 281). If the thread is the first thread, the grand total sum resulting from the reductions described in step 275-277 is stored in the dense vector y' (step 280), and the execution of that thread ends (step 281). The routine 260 ends upon the end of execution of all threads in all of the launched warps. The pseudocode for the routine 260 is similar to the pseudocode shown above with reference to FIGS. 19A-19B mutatis mutandis.

Figure 21A:
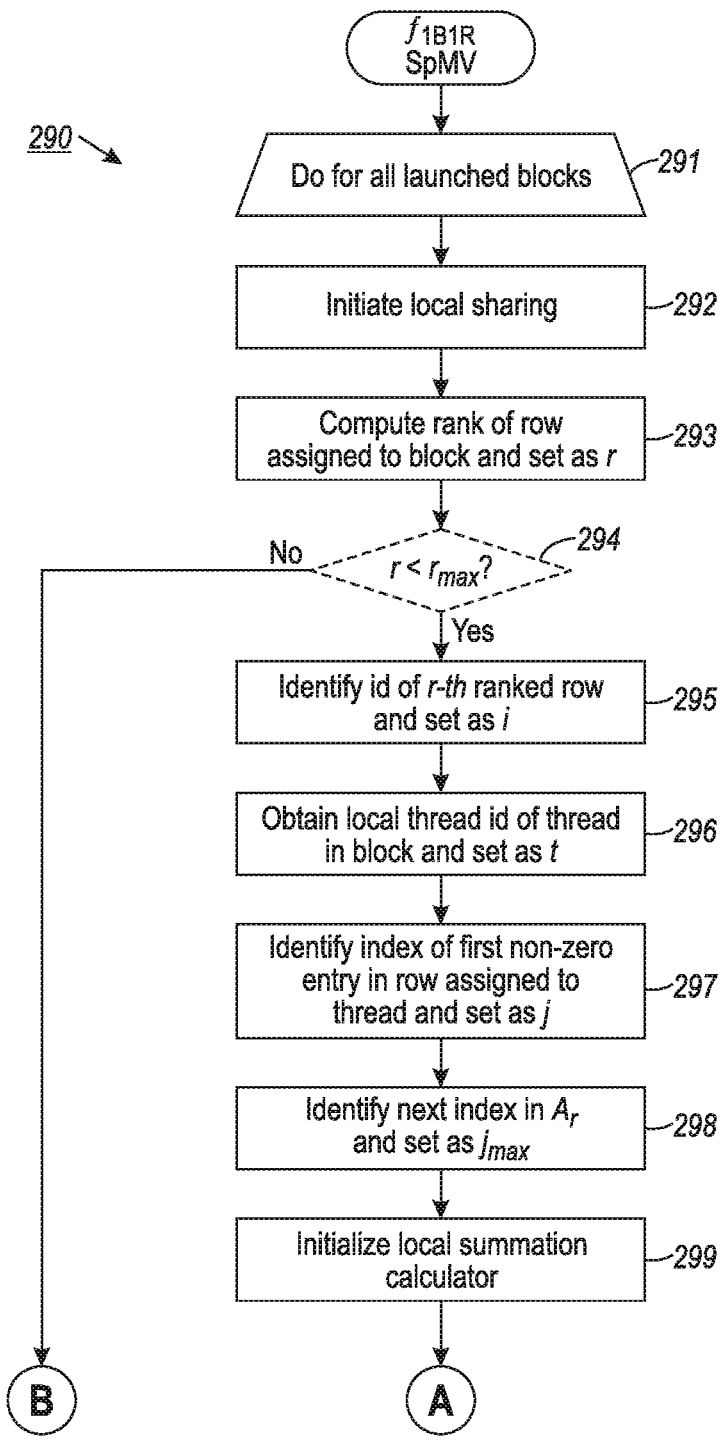
FIGS. 21A-21B are flow diagrams showing a routine for performing SpMV by an $f_{1B1R}$ kernel function for use in the routine of FIG. 15, in accordance with one embodiment.
Figure 21B:
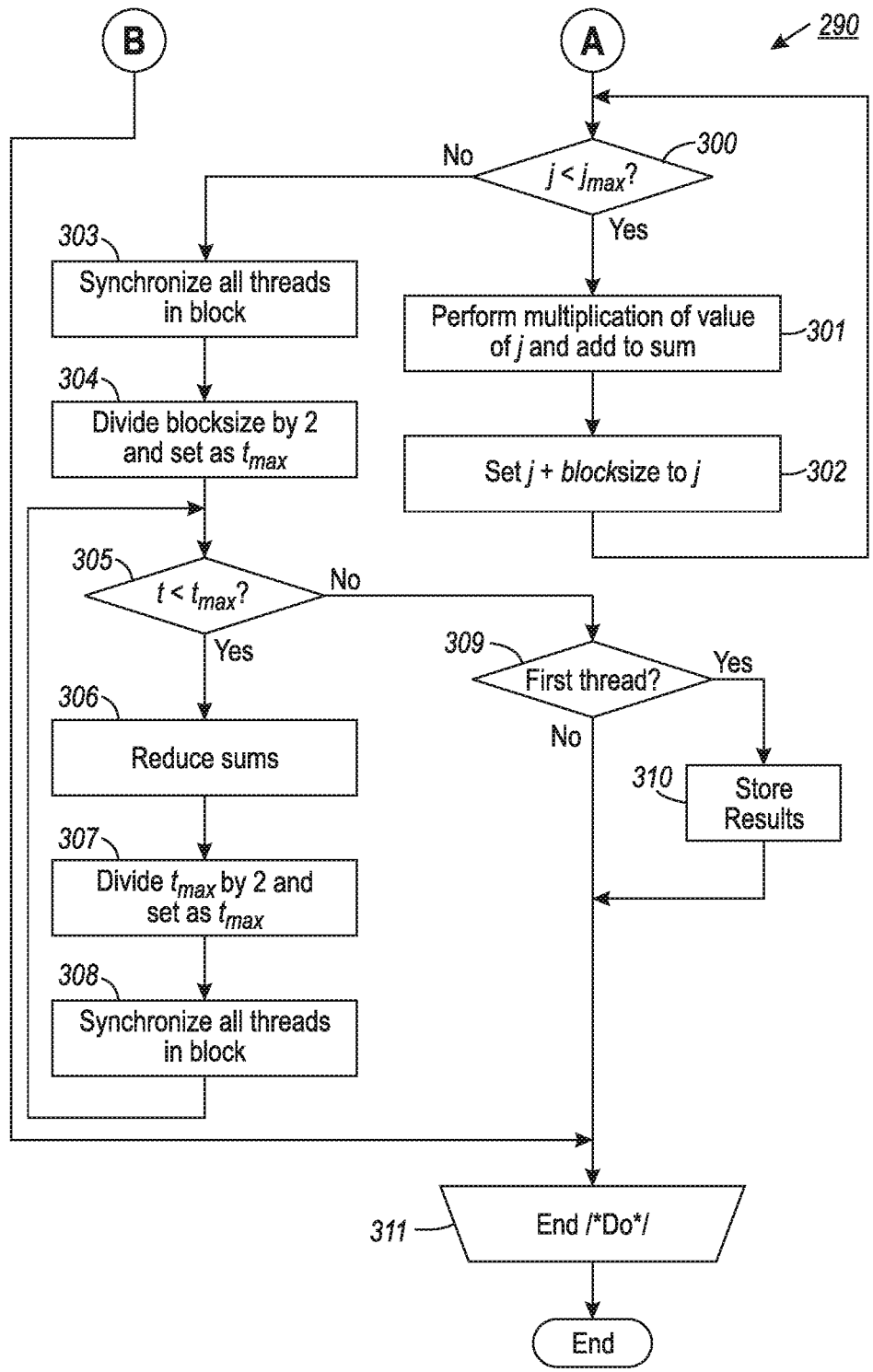

Processing of rows and columns with more than 32 or 64 non-zero entries may be processed the fastest using the $f_{1B1R}$ kernel, which assigns a block of threads to process a single row or column. FIGS. 21A-21B are flow diagrams showing a routine 290 for performing SpMV by an $f_{1B1R}$ kernel for use in the routine 170 of FIG. 15 in accordance with one embodiment. The routine 290 can be used for performing SpMV on either PSCSR or PCSR encodings. An iterative processing loop is started for all launched blocks in the kernel (step 291). The launched blocks and the threads in the launched blocks execute in parallel with each other, and thus when the description below references one of the blocks or one of the threads, all other launched blocks or threads execute the steps of the routine 290 in parallel at the same time until the execution of one of the threads or blocks is stopped (such as in step 311 below).

Local sharing is initiated between all threads in the same block, allowing the threads to share results of computation described below in steps 300-302 (step 292). Rank of a row assigned to one of the blocks is obtained by using the function block_id( ) to obtain the unique global id of one of the blocks, and adding to the unique global id to the value of $r_{min}$, rank of first row of partition to which the rank is assigned as described above with reference to FIG. 17; the result of the addition is the rank of the row assigned to the block and is denoted using the variable r (step 293). The value of r can be compared to $r_{max}$, a variable that equals the rank of the first row of the next partition, partition k−1, given by $A_o$[k+1]; the comparison is optional when the number of blocks launched equals the number of rows in the partition k ($r_{max}-r_{min}$). If r is less than $r_{max}$ (step 294), the id i of the r-th ranked row is identified in the mapping array $A_m$ (step 295). If r is not less than $r_{max}$ (step 294), the routine 290 moves to step 311 described below and processing of the thread stops. A local id (id within the block) of one of the threads in the block is obtained, such as by using the function block_thread_id( ), and is denoted using the variable t (step 296). An index of first non-zero entry assigned to that thread is obtained by adding the value of an entry for the i-th row in the $A_r$ array to t; the result of the addition is denoted using the variable j (step 297). The next (i+1) entry in the $A_r$ array is located and set as a variable $j_{max}$ (step 298). A local summation calculator, a function for summing together results of multiplication of the values of the non-zero arrays described in step 301 below, is initialized by setting the value of the sum at zero (step 299). If j is less than $j_{max}$ (step 300), multiplication and addition computations are performed on the value of j, with the operation depending on whether the encoding on which SpMV is performed is PSCSR or PCSR (step 301). If the encoding is PSCSR, the computation is performed according to the equation:

$$\text{sum} \leftarrow \text{sum} + A_{vc}[j] \cdot v \times x[A_{vc}[j] \cdot c]$$

In the computation, the value stored in the element of the $A_{vc}$ array with the index j is multiplied by the element of x whose index is the index of the column stored in the $A_{vc}$ element with the j-th index and the result of multiplication is added to the sum of results of multiplication performed during previous iterations of the step 301. Alternatively, if the encoding is PCSR, the computation is performed according to the formula:

$$\text{sum} \leftarrow \text{sum} + A_v[j] \times x[A_c[j]],$$

where the value in the $A_v$ array with the index j is multiplied by the element of x whose index is the number in the $A_c$ array with the j-th index and the result of the result of multiplication is added to the sum of results of multiplication performed during previous iterations of the step 301. Upon the completion of the calculation based on either formula, the block size is added to the value of j and the result of the addition is set as j (step 302), moving the processing to the next entry in the in that row assigned to that thread. The routine 290 returns to step 300 described above, repeating steps 300-302 until of the non-zero values in the i-th row that are assigned to that thread are processed. Once j is not less than $j_{max}$ (step 300), all threads in the block are synchronized, allowing all threads in the block to finish performing the loops of steps 300-302.

The size of the block, the number of threads in the block, is divided by 2 using integer division and the result of the division is denoted using the variable $t_{max}$ (step 304). If t, the id of the thread in the block, is less than $t_{max}$, the thread performs reduction, combining together, of sums resulting from computations in steps 300-302 above performed by that thread t and another thread whose thread id is t+$t_{max}$ (step 306). The step 306 reduces the number of sums in half; the combined sum is set as the sum for the thread t (the thread that performed the combining) and the sum previously associated with the thread whose thread id in the block is t+$t_{max}$ is discarded (step 306). Following the combining, the value of $t_{max}$ is cut in half using integer division and set as $t_{max}$ (step 307). The threads that performed the combining of the sums are again synchronized (step 308), and the routine 290 returns to step 305 above. During each subsequent iteration of the loop of steps 305-307, the number of threads participating in the loop is reduced in half due to the reduction of the value of $t_{max}$.

If t is not less than $t_{max}$, whether the thread is the first thread in the block (t=0 and r<$r_{max}$) is determined (step 309). If the thread is not the first thread, the thread's execution ends (step 311). If the thread is the first thread, the grand total sum resulting from the reductions described in step 305-307 is stored in the dense vector y (step 310), and the execution of that thread ends (step 311). The routine 290 ends upon the end of execution of all threads. The routine 290 can also be expressed using the following pseudocode—while the pseudocode is written in relation to the PSCSR encoding, the pseudocode in relation to PCSR can be written mutatis mutandis:

```
kernel f_{1B1R}(y, x, A_vc, A_r, A_m, r_min, r_max)    /* 1B1R: one-block-one-row SpMV kernel */
        shared sum[BLOCKSIZE]              /* sum: local sums shared by threads in a block */
        r ← r_min + block_id( )            /* compute rank of the vertex assigned to this block */
        if (r < r_max) then                /* optional if exactly (r_max - r_min) blocks were created */
            i ← A_m[r]                     /* i: id of r-th ranked row */
            t ← block_thread_id( )         /* t: local thread id in a block */
            j ← A_r[i] + t                 /* j: index of first non-zero entry assigned to this thread */
            j_max ← A_r[i+1]               /* j_max: index of first non-zero entry in (i+1)-th row */
            sum[t] ← 0                     /* initialize local summation accumulator */
            while (j < j_max)              /* test if end of row has been reached */
                sum[t] ← sum[t] + A_vc[j].v × x[A_vc[j].c]   /* compute y_i = Σ_j A_{i,j} × x_j */
                j ← j + BLOCKSIZE          /* move to next non-zero entry for this thread */
            end while
        end if
        sync_block_threads( )              /* synchronize all threads in a block */
        t_max ← BLOCKSIZE / 2              /* t_max: number of threads adding up local sums */
        while (t < t_max)                  /* test if this thread should participate */
            sum[t] ← sum[t] + sum[t+ t_max]   /* reduce two local sums into one */
            t_max ← t_max / 2              /* cut number of sum-adding threads in half */
            sync_block_threads( )          /* synchronize all threads in a block */
        end while
        if (t = 0 and r < r_max) then      /* is this the first thread in the block? */
            y[i] ← sum[0]                  /* store grand total sum in y */
        end if
```

Figure 22A:
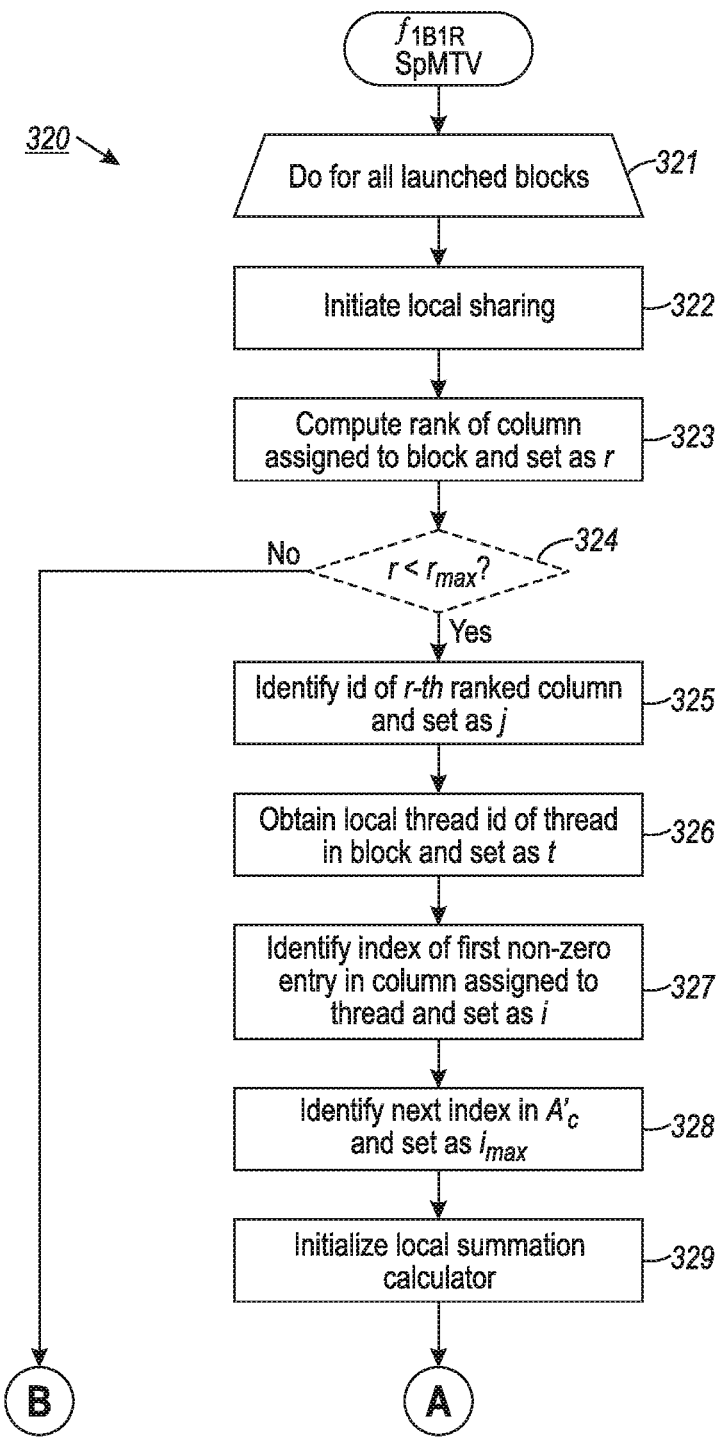
FIGS. 22A-22B are flow diagrams showing a routine for performing SpMTV by an $f_{1B1R}$ kernel function for use in the routine of FIG. 15, in accordance with one embodiment.
Figure 22B:
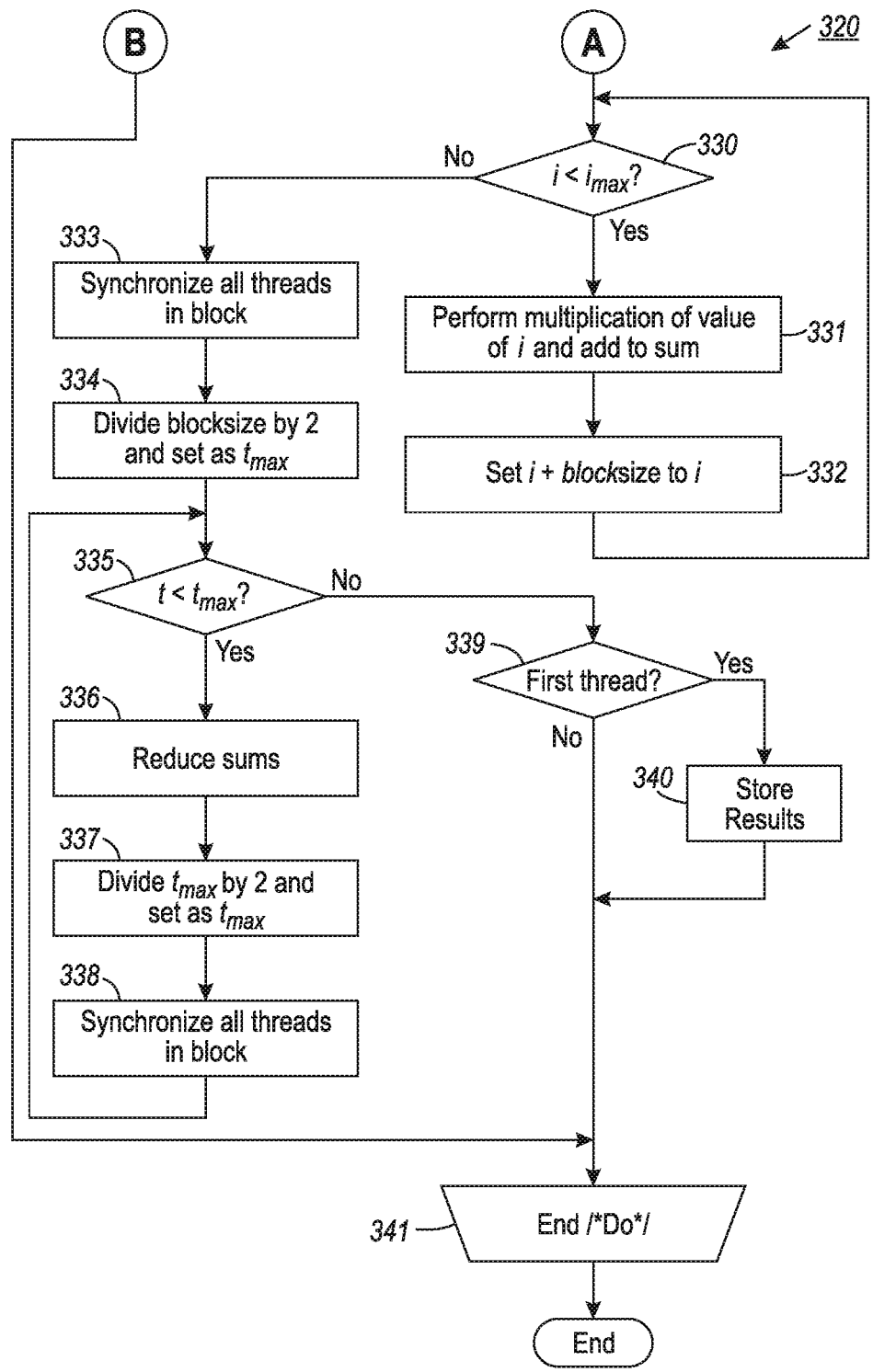

Similarly, SpMTV can be computed using the 1B1R kernel. FIGS. 22A-22B are flow diagrams showing a routine 320 for performing SpMTV by an $f_{1B1R}$ kernel for use in the routine 170 of FIG. 15 in accordance with one embodiment. The routine 320 can be used for performing SpMTV on either PSCSC or PCSC encodings. An iterative processing loop is started for all launched blocks in the kernel (step 321). The launched blocks and the threads in the launched blocks execute in parallel with each other, and thus when the description below references one of the blocks or one of the threads, all other launched blocks and threads execute the steps of the routine 320 in parallel at the same time until the execution of one of the threads or blocks is stopped (such as in step 341 below).

Local sharing is initiated between all threads in the same block, allowing the threads to share results of computation described below in steps 330-332 (step 322). Rank of a column assigned to one of the blocks is obtained by using the function block_id( ) to obtain the unique global id of one of the blocks, and adding to the unique global id to the value of $r_{min}$, rank of first column of partition to which the rank is assigned as described above with reference to FIG. 18; the result of the addition is the rank of the column assigned to the block and is denoted using the variable r (step 323). The value of r can be compared to $r_{max}$, a variable that equals the rank of the first column of the next partition, partition k+1, given by $A'_o[k+1]$; the comparison is optional when the number of blocks launched equals the number of columns in the partition k ($r_{max}-r_{min}$). If r is less than $r_{max}$ (step 324), the id j of the r-th ranked column is identified in the mapping array $A'_m$ (step 325). If r is not less than $r_{max}$ (step 324), the routine 320 moves to step 341 described below. A local id (id within the block) of one of the threads in the block is obtained, such as by using the function block_thread_id( ), and is denoted using the variable t (step 326). An index of first non-zero entry assigned to that thread is obtained by adding the value of an entry for the j-th column in the $A'_c$ array to t; the result of the addition is denoted using the variable i (step 327). The next (j+1) entry in the $A'_c$ array is located and set as a variable $i_{max}$ (step 328). Unless the j-th column is the last column in the matrix, the next entry in the $A'_c$ array is the index in the $A'_{vr}$ (or $A'_v$) array of the first non-zero entry in (j+1)-th column; if the j-th column is the last column in the matrix, the next entry in the $A'_c$ array is the total number of entries in the $A'_{vr}$ (or $A'_v$) array. A local summation calculator, a function for summing together results of multiplication of the values of the non-zero arrays described in step 331 below, is initialized by setting the value of the sum at zero (step 329). If i is less than $i_{max}$ (step 330), multiplication and addition computations are performed on the value of i, with the operation depending on whether the encoding on which SpMTV is performed is PSCSC or PCSC (step 331). If the encoding is PSCSC, the computation is performed according to the equation:

$$\text{sum} \leftarrow \text{sum} + A'_{vr}[i] \cdot v \times x'[A'_{vr}[i] \cdot r],$$

where the value stored in the element of the $A'_{vr}$ array with the index i is multiplied by the element of x' whose index is the index of the row stored in the $A'_{vr}$ element with the i-th index and the result of multiplication is added to the sum of results of multiplication performed during previous iterations of the step 331. Alternatively, if the encoding is PCSR, the computation is performed according to the formula:

$$\text{sum} \leftarrow \text{sum} + A'_v[i] \times x'[A'_r[i]],$$

where the value in the $A'_v$ array with the index i is multiplied by the element of x' whose index is the number in the $A'_r$ array with the i-th index and the result of multiplication is added to the sum of results of multiplication performed during previous iterations of the step 331. Upon the completion of the calculation based on either formula, the block size is added to the value of i and the result of the addition is set as i (step 332), moving the processing to the entry in the next row in that column. The routine 320 returns to step 330 described above, repeating steps 330-332 until all of the non-zero values in the j-th column are processed. Once i is not less than $i_{max}$ (step 330), all threads in the block are synchronized, allowing all threads in the block to finish performing the loops of steps 330-332.

The size of the block, the number of threads in the block, is divided by 2 using integer division and the result of the division is denoted using the variable $t_{max}$ (step 334). If t, the id of the thread in the block, is less than $t_{max}$, the thread performs reduction, combining together, of sums resulting from computations in steps 330-332 above performed by that thread t and another thread whose thread id is $t+t_{max}$ (step 336). The step 336 reduces the number of sums in half; the combined sum is set as the sum for the thread t (the thread that performed the combining) and the sum previously associated with the thread whose thread id in the block is $t+t_{max}$ is discarded, similarly to the step 246 described above (step 336). Following the combining, the value of $t_{max}$ is cut in half using integer division and set as $t_{max}$ (step 337). The threads that performed the combining of the sums are again synchronized (step 338), and the routine 320 returns to step 335 above. During each subsequent iteration of the loop of steps 335-337, the number of threads participating in the loop is reduced in half due to the reduction of the value of $t_{max}$.

If t is not less than $t_{max}$, whether the thread is the first thread in the block ($t=0$ and $r<r_{max}$) is determined (step 339). If the thread is not the first thread, the thread's processing ends (step 341). If the thread is the first thread, the grand total sum resulting from the reductions described in step 335-337 is stored in the dense vector y' (step 340), and the execution of that thread ends (step 341). The routine 320 ends upon the end of execution of all threads. The pseudocode for the routine 320 is similar to the pseudocode shown above with reference to FIGS. 21A-21B mutatis mutandis.

Figure 23:
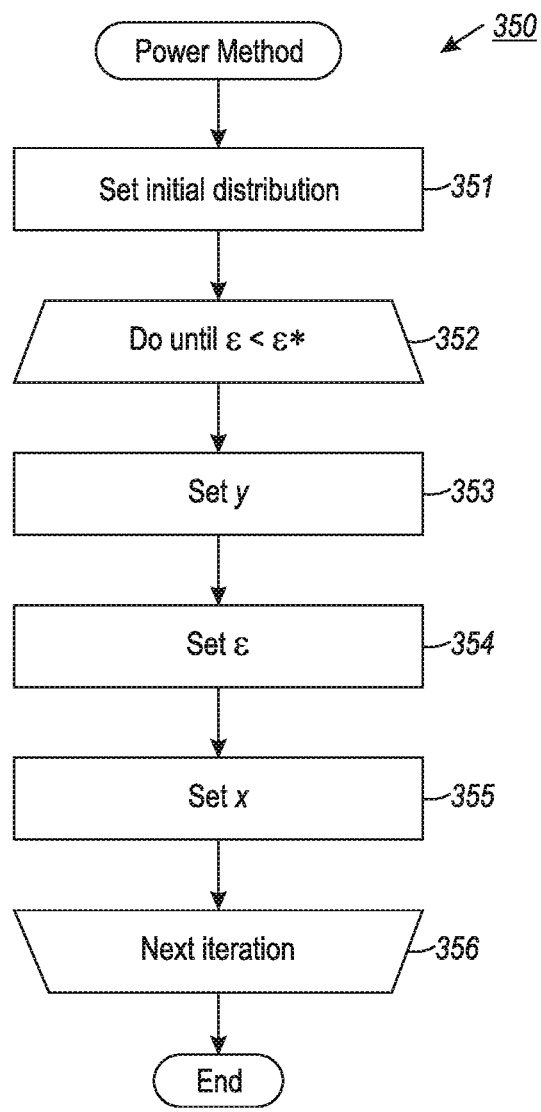
FIG. 23 is a flow diagram showing a routine for performing the power method for use in the methods and of FIGS. 6 and 9, in accordance with one embodiment.

As mentioned above with reference to FIGS. 3 and 4, one of the common uses of the results of SpMV and SpMTV is ranking algorithms such as the PageRank® algorithm, which can be performed using the power method. FIG. 23 is a flow diagram showing a routine 350 for performing the power method for use in the methods 60 and 90 of FIGS. 6 and 9, in accordance with one embodiment. The routine 350 can be used to apply to the results of all variations of SpMV and SpMTV described above with reference to routines used in the methods of FIGS. 6 and 9. Let $d \in (0,1)$ be a damping factor, and let n be the number of webpages. Let P be a n×n square matrix $$P_{i,j} = \begin{cases} \frac{1}{L_j}, & \text{if there is a link from page } j \text{ to page } i \\ 0, & \text{otherwise} \end{cases}$$

where $L_j$ is the number of out-going links from page j. Let x and y be two dense vectors of size n, and let $\varepsilon^*$ be a stopping threshold. An initial PageRank probability distribution is set for the vector x (step 351). An iterative processing loop (steps 352-356) is performed while the value of $\varepsilon$ is less than the value of $\varepsilon^*$ (step 352). The value of y is set based on the equation:

$$y \leftarrow dPx + \frac{1-d}{n}1,$$

where 1 is an (n×1) column vector (step 353). The value of $\varepsilon$ is determined according to the formula:

$$\varepsilon \leftarrow |y-x|,$$

where the value of $\varepsilon$ equals on the difference between y and x (step 53). Finally, x is set to equal the value of y. The routine 350 moves to the next iteration of the loop (step 356), with the processing through the loop (352-356) continuing until $\varepsilon$ is less than the value of $\varepsilon^*$, after which the routine ends 350. The routine 350 can also be represented using the following pseudocode:

$x \leftarrow x_0$  /* initial PageRank probability distribution */
loop
$\quad y \leftarrow dPx + \frac{1-d}{n}1$
$\quad \varepsilon \leftarrow |y - x|$
$\quad x \leftarrow y$
until $\varepsilon < \varepsilon^*$ The system 30 and methods 60, 90 described above are superior to conventional technology, utilizing advantages of six new encodings for sparse matrices, namely SCSR, SCSC, PCSR, PCSC, PSCSR, and PSCSC. Of the six, SCSR and SCSC have exactly the same space complexity as their unstructured counterparts CSR and CSC; whereas the remaining four new encodings have a slightly higher space requirement. For PCSR and PSCSR, the extra space overhead is linear in the number of non-zero rows (i.e., rows with at least one non-zero entry); for PCSC and PSCSC, the overhead is linear in the number of non-zero columns (i.e., columns with at least one non-zero entry). To evaluate the effectiveness of the PSCSR encoding, experiments of running SpMV on various sparse matrices found in the University of Florida sparse matrix collection were conducted. To create the matrix partitions, $A_s = [1, 32, 1024, \infty]$ for all datasets in the experiments were used. As a result, the first partition of PSCSR contained rows with at least one non-zero and less than 32 non-zero entries; the second partition contained rows with 32 or more but less than 1024 non-zero entries; and the third partition contained rows with 1024 or more non-zero entries.

Table 1 shows the statistics of the sparse matrices used in the experiments, including the number of rows (labeled as '#rows'), the number of non-zero rows ('#non-zero rows'), the total number of non-zero entries of the matrix ('#non-zeros'), the average number of non-zero entries per row ('Avg. #non-zeros/row'), the size of the CSR encoding (which is the same as SCSR), the size of the PSCSR encoding, and the extra space overhead of PSCSR as a percentage of the original CSR encoding. As can be observed, the extra space overhead of PSCSR decreases as the average number of non-zero entries of a row increases. The overhead is the highest for matrix 'wiki-Talk' (19.06%), which has only 2.1 non-zero entries per row; whereas the overhead drops to 2.19% for matrix 'eu-2005' with an average of 22.3 non-zero entries per row. The extra space overhead of PSCSR, averaged over all matrices in Table 1, is 5.45%.

TABLE 1

Statistics of test sparse matrices and their encoding sizes in megabytes (MB)

| Matrix | #rows | #non-zero rows | #non-zeros | Avg. #non-zeros/row | (S)CSR size MB | PSCSR size MB | PSCSR extra % |
|---|---|---|---|---|---|---|---|
| Stanford | 281,903 | 281,731 | 2,312,497 | 8.20 | 18.72 | 19.79 | 5.72% |
| amazon0601 | 403,394 | 403,312 | 3,387,388 | 8.40 | 27.38 | 28.92 | 5.62% |
| wiki-Talk | 2,394,385 | 2,369,181 | 5,021,410 | 2.10 | 47.44 | 56.48 | 19.06% |
| web-Google | 916,428 | 714,545 | 5,105,039 | 5.57 | 42.44 | 45.17 | 6.43% |
| amazon-2008 | 735,323 | 735,323 | 5,158,388 | 7.02 | 42.16 | 44.97 | 6.67% |
| Stanford_Berkeley | 683,446 | 678,711 | 7,583,376 | 11.10 | 60.46 | 63.05 | 4.28% |
| cit-Patents | 3,774,768 | 3,258,983 | 16,518,948 | 4.38 | 140.36 | 152.80 | 8.86% |
| in-200 | 1,382,908 | 1,382,822 | 16,917,053 | 12.23 | 134.34 | 139.62 | 3.93% |
| eu-2005 | 862,664 | 862,664 | 19,235,140 | 22.30 | 150.04 | 153.33 | 2.19% |
| wikipedia-20051105 | 1,634,989 | 1,170,854 | 19,753,078 | 12.08 | 156.94 | 161.41 | 2.85% |
| wikipedia-20060925 | 2,983,494 | 2,109,860 | 37,269,096 | 12.49 | 295.72 | 303.77 | 2.72% |
| wikipedia-20061104 | 3,148,440 | 2,215,534 | 39,383,235 | 12.51 | 312.48 | 320.93 | 2.70% |
| wikipedia-20070206 | 3,566,907 | 2,488,225 | 45,030,389 | 12.62 | 357.16 | 366.65 | 2.66% |
| wb-edu | 9,845,725 | 9,128,020 | 57,156,537 | 5.81 | 473.63 | 508.45 | 7.35% |
| soc-LiveJournal1 | 4,847,571 | 4,489,240 | 68,993,773 | 14.23 | 544.87 | 562.00 | 3.14% |
| ljournal-2008 | 5,363,260 | 4,994,216 | 79,023,142 | 14.73 | 623.36 | 642.41 | 3.06% |

Let $\lambda$ be the ratio of the size of an element in $A_{vc}$ (or $A'_{vr}$) over the size of an element in $A_r$ (or $A'_c$) of PSCSR (or PSCSC), which is usually an implementation-dependent constant. Let b be the ratio of the number of non-zero entries over the number of rows (or columns) in PSCSR (or PSCSC), and let $\gamma$ be the ratio of the number of non-zero rows (or columns) over the total number of rows (or columns) in PSCSR (or PSCSC). Let $\delta$ be the extra space overhead of PSCSR/PCSR (or PSCSC/PCSC) over regular CSR (or CSC). That $\delta$ is given by $$\delta = \frac{\gamma}{\lambda b + 1}$$

can be shown. In one of the embodiments, an element in $A_{vc}$ is twice as large as an element in $A_r$ and thus $\lambda=2$. For matrix 'wiki-Talk', we have $\gamma=2,369,181/2,394,385=0.9895$ and $b=5,021,410/2,394,385=2.097$. Thus, the extra space overhead $\delta=\gamma(\lambda b+1)^{-1}=0.9895\times(2\times2.097+1)^{-1}=19.05\%$, which is close to the actual overhead observed in the experiments. For matrix 'eu-2005', $\gamma=862,664/862,664=1$, and $b=19,235,140/862,664=22.30$. Thus, $\delta=\gamma(\lambda b+1)^{-1}=1\times(2\times22.30+1)^{-1}=2.19\%$ (same as the empirical number). That the analytical formula of $\delta=\gamma(\lambda b+1)^{-1}$ matches very well (often without detectable errors) with the actual extra overhead of PSCSR recorded in Table 1 can be verified. This formula makes possible to accurately predict the size of a PSCSR/PCSR (or PSCSC/PCSC) encoding as the size of a regular CSR (or CSC) encoding multiplied by a factor of $(1+\delta)$. The predicted extra space overhead can be used to determine whether creating the PSCSR/PCSR encodings is useful for a particular hardware set-up, or whether insufficient hardware resources make the creation or use of such encodings impracticable.

The performance of the GPU-based SpMV routines described starting with reference to FIG. 13 was tested on all the matrices of Table 1. For comparison, the results of a CPU-based SpMV implementation are included in Table 3. The test machine used has two Intel Xeon X5690 processors, each having 6 cores running at 3.46 GHz. The cache size of a single X5690 processor is 12. MB, which is significantly larger than the L2 cache size of Nvidia's® GTX 580 CPU in the same box. To measure the speedup of GPU on SpMV against a single CPU core, the CPU implementation uses a single thread.

TABLE 2

Single-iteration performance of CPU-based SpMV systems on Twitter ® follower network

| PageRank System | Runtime | #rows | #non-zeros | nodes × cores |
|---|---|---|---|---|
| Hadoop | 198 s | — | 1.1B | 50 × 8 |
| Spark | 97.4 s | 440M | 1.5B | 50 × 2 |
| Twister | 36 s | 550M | 1.4B | 64 × 4 |
| PowerGraph | 3.6 s | 440M | 1.5B | 64 × 8 |
| HiperGraph (1 core) | 36 s | 442M | 1.5B | 1 × 1 |

A word about the CPU-based implementation is that the implementation is among the state-of-the-art for SpMV on large-scale graphs. Using a single core of the test machine, the CPU performs an iteration of SpMV in 36 seconds on a Twitter® follower network of some 41.7 million users (i.e., rows) and 1.47 billion connections (i.e., non-zeros) introduced by Kwak et al., "What is Twitter, a Social Network or a News Media?," Proceedings of the 19th international conference on World Wide Web, 2010, pp. 591-600, the disclosure of which is incorporated by reference. The same Twitter® follower network has been used by various SpMV implementations as a benchmark dataset. Table 2 compares the runtime performance of some of the best CPU-based large-scale SpMV systems found in the literature. The numbers for the first four systems were reported by Gonzalez et al., PowerGraph: Distributed Graph-Parallel Computation on Natural Graphs, OSDI, 2012, Vol. 12, No. 1, p. 2, the disclosure of which is incorporated by reference, whose PowerGraph system can perform an iteration of SpMV in 3.6 seconds on a 64 node cluster of Amazon EC2 cc1.4xlarge Linux instances, each having two quad-core Intel Xeon X5570 processors with 23 GB of RAM, connected via 10 Gig Ethernet. The single-node system, called HiperGraph, can also finish an iteration of SpMV in 3.6 seconds if all 12 cores were used. To measure per-core speedup, HiperGraph was run in single-threaded mode, which took 36 seconds to finish a full pass on the same Twitter® follower network. In other words, PowerGraph uses 512 cores @2.93 GHz to get a 10× speedup over HiperGraph with a single core $\sqrt[4]{3.46}$ GHz. The HiperGraph's single-core performance on SpMV is competitive, and thus was used as a baseline for the experiments described below.

Table 3 shows the performance of CPU (i.e., HiperGraph with 1 core) and GPU-based SpMV on various sparse matrices. The runtime of the GPU-based SpMV is broken down into three parts: (a) partition, Which produces the partitions needed by the PSCSR encoding, (b) load, which transfers the partitioned matrix from the CPU to the GPU, and (c) SpMV, which performs a single iteration of SpMV on the GPU. Both parts (a) and (b) are one-time operations whose cost can be amortized over multiple iterations of SpMV. The last column of Table 3 shows the speedups of GPU-based against sequential CPU-based SpMV, accumulated over 100 iterations. Note that if the matrix is already encoded in PSCSR format, then the partition time should simply be zero in Table 3. The speedup ranges from 23.5× to 38.3×, with the average being 31× faster.

TABLE 3

Performance of CPU and GPU-based SpMV in milliseconds (ms)

| Matrix | CPU SpMV | GPU partition | GPU Load | GPU SpMV | Speedup of 100 SpMVs |
|---|---|---|---|---|---|
| amazon0601 | 46.19 | 4.81 | 10.77 | 1.38 | 30.12x |
| amazon-2008 | 66.40 | 6.92 | 15.86 | 1.51 | 38.30x |
| cit-Patents | 474.20 | 29.81 | 47.95 | 12.42 | 35.92x |
| eu-2005 | 157.20 | 7.84 | 52.02 | 4.05 | 33.82x |
| in-2004 | 146.13 | 11.74 | 46.13 | 3.37 | 36.97x |
| ljournal-2008 | 1,074.36 | 45.20 | 209.75 | 34.34 | 29.12x |
| soc-LiveJournal1 | 1,267.19 | 41.86 | 183.13 | 38.38 | 31.19x |
| Stanford_Berkeley | 65.49 | 6.26 | 21.28 | 2.36 | 24.86x |
| Stanford | 30.16 | 3.46 | 7.40 | 1.17 | 23.52x |
| wb-edu | 627.56 | 78.34 | 168.57 | 16.64 | 32.84x |
| web-Google | 101.29 | 8.93 | 16.05 | 3.79 | 25.07x |
| wikipedia-20051105 | 372.65 | 14.85 | 54.31 | 11.94 | 29.51x |
| wikipedia-20060925 | 760.01 | 25.32 | 99.77 | 24.98 | 28.97x |
| wikipedia-20061104 | 807.45 | 26.79 | 105.97 | 26.64 | 28.87x |
| wikipedia-20070206 | 948.76 | 32.31 | 120.63 | 30.80 | 29.35x |
| wiki-Talk | 106.38 | 20.24 | 17.63 | 2.45 | 37.63x |

The experiment further illustrate additional advantages of the encodings that GPU-based hardware implementing the methods described above can achieve over conventional technology described above. Not only significantly faster, GPUs are also much cheaper than CPUs: the cost of GTX 580 GPU is currently less than $400, but a single Xeon X5690 processor costs around $1800. Assuming a linear speed up of our sequential CPU SpMV if all 6 cores of X5690 were used, the GPU would be 31/6=5.2× faster than a perfectly parallelized CPU implementation on an X5690 processor. From a performance-per-dollar perspective, the GPU-based SpMV is about 23× more cost-effective on the test machine used above.

A GPU-based solution is also more extensible, since adding or upgrading GPUs of an existing system is far easier than adding or upgrading the CPUs in the same box. For commodity hardware, the maximum number of CPUs is typically 2 or 4; whereas a single commodity GPU server can hold up to 8 GPUs, each of which can have up to a few thousand cores (e.g., Nvidia's® Tesla K40 GPU has 2,880 cores). Thus, GPUs excel CPUs not only in performance per dollar or FLOPS per watt, but also in performance per 1 U rack space, which is particularly important for data centers.

While the invention has been particularly shown and described as referenced to the embodiments thereof, those skilled in the art will understand that the foregoing and other changes in form and detail may be made therein without departing from the spirit and scope of the invention.

What is claimed is:

1. A system for efficient sparse matrix processing, comprising:
   at least one server comprising one or more streaming multiprocessors, each of the streaming multiprocessors comprising a plurality of graphics processing unit (GPU) processor cores, the at least one server configured to:
   access a compressed representation of a sparse matrix, the sparse matrix comprising non-zero entries in a plurality of portions of the matrix;
   assign each of the portions into one of a plurality of partitions based on a number of the non-zero entries in that portion; and
   for each of the partitions, assign by the at least one server a predefined number of the GPU processor cores in one or more of the streaming multiprocessors for processing each of the portions assigned to that partition based on the numbers of the non-zero entries in the portions assigned to that partition; and
   process with the assigned predefined number of the GPU processor cores each of the portions associated with that partition.

2. A system according to claim 1, wherein the predefined number of the GPU processing cores execute one or more warps of processing threads to process one of the partitions, the at least one server further configured to:
   associate each of the warps with an identifier;
   rank each of the portions in that partition;
   assign each of the warps to process one of the portions based on the identifier of that warp and the rank of that portion.

3. A system according to claim 2, wherein a number of the threads in the warp is one of 32 and 64.

4. A system according to claim 2, the at least one server further configured to:
   associate each of the threads within that warp with a further identifier;
   associate each of the non-zero entries within that portion with an index based on a position of that non-zero entry within the portion; and
   assign each of the threads in the warp to process one of the non-zero entries based on the further identifier of that thread and the index of that non-zero entry.

5. A system according to claim 4, the at least one server further configured to:
   perform a local sharing of results of the processing performed by all processing threads in the warp.

6. A system according to claim 1, wherein the predefined number of the GPU processing cores execute one or more blocks of processing threads to process one of the partitions, the at least one server further configured to:
   associate each of the blocks with an identifier;
   rank each of the portions in that partition;
   assign each of the blocks to process one of the portions based on the identifier of that block and the rank of that portion.

7. A system according to claim 6, the at least one server further configured to:
   associate each of the threads within that block with a further identifier;
   associate each of the non-zero entries within that portion with an index based on a position of that non-zero entry within the portion; and
   assign each of the threads in the block to process one of the non-zero entries based on the further identifier of that thread and the index of that non-zero entry.

8. A system according to claim 6, the at least one server further configured to:
   perform a local sharing of results of the processing performed by all processing threads in the block.

9. A system according to claim 1, wherein the processing comprises at least one of matrix-vector multiplication and sparse matrix transpose vector multiplication.

10. A system according to claim 1, wherein the portions that comprise between 1 and 31 of the non-zero entries are assigned to one of the partitions, the portions that comprise more than 31 and less than 1024 of the non-zero entries are assigned to a second one of the partitions, and the portions that comprise a number of the non-zero entries that is equal to or more than 1024 are assigned to a third one of the partitions.

11. A method for efficient sparse matrix processing, comprising:
   accessing by at least one server comprising one or more streaming multiprocessors, each of the streaming multiprocessors comprising a plurality of graphics processing unit (GPU) processor cores, a compressed representation of a sparse matrix, the sparse matrix comprising non-zero entries in a plurality of portions of the matrix;
   assigning by the at least one server each of the portions into one of a plurality of partitions based on a number of the non-zero entries in that portion;
   for each of the partitions, assigning by the at least one server a predefined number of the GPU processor cores in one or more of the streaming multiprocessors for processing each of the portions assigned to that partition based on the numbers of the non-zero entries in the portions assigned to that partition; and
   for each of the partitions, processing by the assigned predefined number of the GPU processor cores each of the portions associated with that partition.

12. A method according to claim 11, wherein the predefined number of the GPU processing cores execute one or more warps of processing threads to process one of the partitions, further comprising:
   associating by the at least one server each of the warps with an identifier;
   ranking by the at least one server each of the portions in that partition;
   assigning by the at least one server each of the warps to process one of the portions based on the identifier of that warp and the rank of that portion.

13. A method according to claim 12, wherein a number of the threads in the warp is one of 32 and 64.

14. A method according to claim 12, further comprising:
   associating by the at least one server each of the threads within that warp with a further identifier;
   associating by the at least one server each of the non-zero entries within that portion with an index based on a position of that non-zero entry within the portion; and
   assigning by the at least one server each of the threads in the warp to process one of the non-zero entries based on the further identifier of that thread and the index of that non-zero entry.

15. A method according to claim 14, further comprising:
   performing by the at least one server a local sharing of results of the processing performed by all processing threads in the warp.

16. A method according to claim 11, wherein the predefined number of the GPU processing cores execute one or more blocks of processing threads to process one of the partitions, further comprising:
   associating by the at least one server each of the blocks with an identifier;
   ranking by the at least one server each of the portions in that partition;
   assigning by the at least one server each of the blocks to process one of the portions based on the identifier of that block and the rank of that portion.

17. A method according to claim 16, further comprising:
   associating by the at least one server each of the threads within that block with a further identifier;
   associating by the at least one server each of the non-zero entries within that portion with an index based on a position of that non-zero entry within the portion; and
   assigning by the at least one server each of the threads in the block to process one of the non-zero entries based on the further identifier of that thread and the index of that non-zero entry.

18. A method according to claim 16, further comprising:
   performing by the at least one server a local sharing of results of the processing performed by all processing threads in the block.

19. A method according to claim 11, wherein the processing comprises at least one of matrix-vector multiplication and sparse matrix transpose vector multiplication.

20. A method according to claim 11, wherein the portions that comprise between 1 and 31 of the non-zero entries are assigned to one of the partitions, the portions that comprise more than 31 and less than 1024 of the non-zero entries are assigned to a second one of the partitions, and the portions that comprise a number of the non-zero entries that is equal to or more than 1024 are assigned to a third one of the partitions.

* * * * *